United States Patent
Edge et al.

(10) Patent No.: US 11,696,106 B2
(45) Date of Patent: Jul. 4, 2023

(54) CONFIGURATION OF FIXED TRACKING AREAS AND FIXED CELLS FOR A 5G SATELLITE RAT

(71) Applicant: QUALCOMM Incorporated, San Diego, CA (US)

(72) Inventors: Stephen William Edge, Escondido, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 17/090,816

(22) Filed: Nov. 5, 2020

(65) Prior Publication Data

US 2021/0144539 A1    May 13, 2021

Related U.S. Application Data

(60) Provisional application No. 63/081,307, filed on Sep. 21, 2020, provisional application No. 63/028,539, (Continued)

(51) Int. Cl.
*H04B 7/185* (2006.01)
*H04W 4/90* (2018.01)
(Continued)

(52) U.S. Cl.
CPC ......... *H04W 4/90* (2018.02); *H04B 7/18513* (2013.01); *H04W 56/0045* (2013.01); *H04W 84/042* (2013.01); *H04W 88/16* (2013.01)

(58) Field of Classification Search
None
See application file for complete search history.

(56) References Cited

U.S. PATENT DOCUMENTS

| 10,985,835 B2 | 4/2021 | Zheng et al. |
| 11,284,310 B2 | 3/2022 | Shan |

(Continued)

FOREIGN PATENT DOCUMENTS

| CA | 2813271 A1 | 5/2012 |
| EP | 1987691 A1 | 11/2008 |

(Continued)

OTHER PUBLICATIONS

Lin et al, 5G New Radio Evolution Meets Satellite Communications: Opportunities, Challenges, and Solutions, arXiv, Mar. 27, 2019 (Year: 2019).*

(Continued)

*Primary Examiner* — German Viana Di Prisco
(74) *Attorney, Agent, or Firm* — Thien T. Nguyen

(57) ABSTRACT

User equipment (UE) access to a non-terrestrial network (NTN) via a satellite to a Fifth Generation (5G) public land mobile network (PLMN) is supported using fixed tracking areas (TAs) and fixed cells. The fixed TAs and fixed cells are defined in the NTN independently of NTN radio cells. Network elements in the NTN are provided with configuration information for the fixed TAs and fixed cells from a server (e.g., an Operations and Maintenance (O&M) server). The configuration information includes location related information for the fixed TAs and fixed cells, which may not be standardized. The network entities perform one or more services for the UE based on the location related information for the fixed TAs and fixed cells, such as determining a fixed TA or fixed serving cell for a UE, locating the UE, routing emergency calls, and supporting wireless emergency alerting (WEA).

30 Claims, 13 Drawing Sheets

Related U.S. Application Data filed on May 21, 2020, provisional application No. 63/010,564, filed on Apr. 15, 2020, provisional application No. 62/989,572, filed on Mar. 13, 2020, provisional application No. 62/932,486, filed on Nov. 7, 2019.

(51) Int. Cl.
    *H04W 88/16*     (2009.01)
    *H04W 56/00*     (2009.01)
    *H04W 84/04*     (2009.01)

(56) References Cited

U.S. PATENT DOCUMENTS

| | | | |
|---|---|---|---|
| 11,303,352 B2 * | 4/2022 | Ravishankar | H04W 60/00 |
| 2008/0102896 A1 | 5/2008 | Wang et al. | |
| 2009/0016274 A1 | 1/2009 | Nylander et al. | |
| 2012/0002646 A1 | 1/2012 | Zabawskyj et al. | |
| 2015/0341846 A1 | 11/2015 | Shi et al. | |
| 2017/0353827 A1 | 12/2017 | D'Alberto et al. | |
| 2018/0241464 A1 | 8/2018 | Michaels | |
| 2019/0090289 A1 | 3/2019 | Huang-Fu et al. | |
| 2019/0207676 A1 * | 7/2019 | Noerpel | H04B 7/2041 |
| 2019/0246260 A1 | 8/2019 | Edge et al. | |
| 2019/0335517 A1 | 10/2019 | Reial et al. | |
| 2020/0077358 A1 * | 3/2020 | Kovacs | H04W 64/006 |
| 2020/0236731 A1 | 7/2020 | Jung et al. | |
| 2021/0068065 A1 | 3/2021 | Wigard et al. | |
| 2021/0092640 A1 | 3/2021 | Ravishankar et al. | |
| 2021/0105693 A1 | 4/2021 | Tripathi et al. | |
| 2021/0136666 A1 | 5/2021 | Srivastava et al. | |
| 2021/0143897 A1 | 5/2021 | Edge | |
| 2021/0143898 A1 | 5/2021 | Edge | |
| 2021/0143900 A1 | 5/2021 | Edge | |
| 2021/0144669 A1 | 5/2021 | Edge | |
| 2021/0144670 A1 | 5/2021 | Shrestha | |
| 2021/0211191 A1 | 7/2021 | Zheng et al. | |
| 2021/0212014 A1 * | 7/2021 | Gao | H04W 64/00 |
| 2021/0218467 A1 | 7/2021 | Jin et al. | |
| 2021/0242933 A1 | 8/2021 | Edge | |
| 2021/0250781 A1 * | 8/2021 | Dang | H04B 7/0408 |
| 2021/0289339 A1 * | 9/2021 | Yu | H04W 24/02 |
| 2021/0314060 A1 | 10/2021 | Shi et al. | |
| 2021/0385675 A1 | 12/2021 | Määttänen et al. | |
| 2021/0399797 A1 | 12/2021 | Khan et al. | |
| 2022/0007267 A1 * | 1/2022 | Maattanen | H04W 16/12 |
| 2022/0007328 A1 * | 1/2022 | Sun | H04B 7/18558 |
| 2022/0022155 A1 | 1/2022 | Wang et al. | |
| 2022/0078746 A1 * | 3/2022 | Lee | H04W 36/08 |
| 2022/0086671 A1 | 3/2022 | Hong | |
| 2022/0086713 A1 | 3/2022 | Maattanen et al. | |
| 2022/0095260 A1 | 3/2022 | Shan | |
| 2022/0217561 A1 * | 7/2022 | Geng | H04W 24/08 |
| 2022/0225208 A1 * | 7/2022 | Wang | H04W 40/24 |

FOREIGN PATENT DOCUMENTS

| | | | |
|---|---|---|---|
| EP | 2014111 A2 | 1/2009 | |
| EP | 2603998 A2 | 6/2013 | |
| EP | 2966903 A1 | 1/2016 | |
| WO | WO-0021216 A2 | 4/2000 | |
| WO | WO-2008054668 A2 | 5/2008 | |
| WO | WO-2012171128 A1 | 12/2012 | |
| WO | WO-2019080056 A1 | 5/2019 | |

OTHER PUBLICATIONS

Sakshi, P., et al., "A Survey on Energy Efficient Narrowband Internet of Things (NBIoT): Architecture, Application and Challenges", IEEE Access, vol. 7, 2018, (Current Version Feb. 14, 2019) pp. 16739-16776.

"3rd Generation Partnership Project; Technical Specification Group Radio Access Network; Solutions for NR to support non-terrestrial networks (NTN) (Release 16)", 3GPP Standard; Technical Report; 3GPP TR 38.821, 3rd Generation Partnership Project (3GPP), Mobile Competence Centre ; 650, Route Des Lucioles; F-06921 Sophia-Antipolis Cedex; France, No. V0.4.0, Apr. 11, 2019 (Apr. 11, 2019), pp. 1-46, XP051723405, [retrieved on Apr. 11, 2019], Paragraph [04.2], Paragraph [08.1], Paragraph [08.3].

Hughes: "NR-NTN: Paging in NGSO Satellite Systems", 3GPP TSG RAN WG3 Meeting #101, 3GPP Draft, R3-184403, 3rd Generation Partnership Project (3GPP), Mobile Competence Centre, 650, Route Des Lucioles, F-06921 Sophia-Antipolis Cedex, France, vol. RAN WG3, No. Gothernburg, Sweden; Aug. 20, 2018-Aug. 24, 2018, Aug. 10, 2018 (Aug. 10, 2018), 5 Pages, XP051527768, Retrieved from the Internet: URL: http://www.3gpp.org/ftp/tsg%5Fran/WG3%5Flu/TSGR3%5F101/Docs/R3%2D184403%2Ezip [retrieved on Aug. 10, 2018] Chapters 2, 3, the whole document.

International Search Report and Written Opinion—PCT/US2020/059545—ISA/EPO—dated Feb. 25, 2021.

LG Electronics Inc: "Considerations on Fixed on Earth Tracking Area Management in NTN", 3GPP TSG-RAN WG2 Meeting #105, 3GPP Draft; R2-1905122 Considerations on Fixed on Earth Tracking Area Management in NTN, 3rd Generation Partnership Project (3GPP), Mobile Competence Centre; 650, Route Des Lucioles; F-06921 Sophia-, vol. RAN WG2, No. Xi'an, China; Apr. 8, 2019-Apr. 12, 2019 Apr. 6, 2019 (Apr. 6, 2019), 3 Pages, XP051702398, Retrieved from the Internet: URL: http://www.3gpp.org/ftp/Meetings%5F3GPP%5FSYNC/RAN2/Docs/R2%2D1905122%2Ezip [retrieved on Apr. 6, 2019], The Whole Document.

LG Electronics Inc: "Report on Email Discussion [107#64] [NTN] Cell Selection & Reselection", 3GPP TSG-RAN WG2Meeting #107bis, 3GPP Draft; R2-1914070 Report of Email Discussion [107#64][NTN] Cell Selection&Reselection, 3rd Generation Partnership Project (3GPP), Mobile Competence Centre; 650, Route Des Lucioles; F-06921 Soph, vol. RAN WG2, No. Chongqing, China; Oct. 14, 2019-Oct. 18, 2019, Oct. 18, 2019 (Oct. 18, 2019), 22 Pages XP051797900, Retrieved from the Internet: URL: https://ftp.3gpp.org/tsg_ran/WG2_RL2/TSGR2_107bis/Docs/R2-1914070.zip R2-1914070 Report of email discussion [107#64] [NTN] Cell selection&reselection.doc [retrieved on Oct. 18, 2019] ZTE Contribution, "Approach 2"; p. 17.

Nokia, et al., "Analysis on Tracking Area Design," 3GPP Draft, 3GPP TSG-WG3 Meeting #104, R3-193191_WAS_R3-192802 TA REVTHALES2, 3rd Generation Partnership Project (3GPP), Mobile Competence Centre, 650, Route Des Lucioles, F-06921, Sophia-Antipolis Cedex, France, vol. RAN WG3, No. Reno, NV, USA; May 13, 2019-May 17, 2019, May 21, 2019 (May 21, 2019), XP051740754, 5 pages ,Retrieved from the Internet: URL: http://www.3gpp.org/ftp/tsg%5Fran/WG3%5Flu/TSGR3%5F104/Docs/R3%2D193191%2Ezip [retrieved on May 21, 2019] the whole document.

Nomor Research GMBH, et al., "Multiple PLMN Identities in NTN", 3GPP Draft, 3GPP TSG-RAN WG2 Meeting #107-Bis, R2-1912696_MULTIPLE_PLMN_NTN 3rd Generation Partnership Project (3GPP), Mobile Competence Centre, 650, Route Des Lucioles, F-06921, Sophia-Antipolis Cedex, France, vol. RAN WG2, No. Chongqing, China; Oct. 14, 2019-Oct. 18, 2019, Oct. 2, 2019 (Oct. 2, 2019), XP051803661, 6 pages, Retrieved from the Internet: URL: https://ftp.3gpp.org/tsg_ran/WG2_RL2/TSGR2_107bis/Docs/R2-1912696.zip R2-1912696 Multiple PLMN NTN. docx [retrieved-on Oct. 2, 2019T the whole document.

Nomor Research GMBH, et al., "UE Positioning Information for NTN Mobility", 3GPP Draft, 3GPP TSG RAN WG2 Meeting #105bis, R2-1904407_NTN_MobilityEnhancements, 3rd Generation Partnership Project (3GPP), Mobile Competence Centre, 650, Route Des Lucioles, F-06921 Sophia-Antipolis Cedex, France, vol. RAN WG2, No. Xi'an, China, Apr. 8, 2019-Apr. 12, 2019, Apr. 6, 2019 (Apr. 6, 2019), XP051701709, 4 Pages, Retrieved from the Internet: URL:http://www.3gpp.org/ftp/Meetings%5F3GPP%5FSYNC/RAN2/Docs/R2%2D1904407%2Ezip, [retrieved on Apr. 6, 2019] the Whole Document.

Qualcomm Incorporated: "Virtual Cell Solution for Mobility and Regulatory Support for Satellite Access in 5G", 3GPP Draft, SA WG2 Meeting #136, S2-1911058, 3rd Generation Partnership Proj-

(56) References Cited

OTHER PUBLICATIONS ect (3GPP), Mobile Competence Centre, 650, Route Des Lucioles, F-06921, Sophia-Antipolis Cedex, France, vol. SA WG2, No. Reno, Nevada, USA, Nov. 18, 2019-Nov. 22, 2019, Nov. 8, 2019 (Nov. 8, 2019), 9 Pages, XP051821168, Retrieved from the Internet: URL: https://ftp.3gpp.org/tsg_sa/WG2_Arch/TSGS2_136_Reno/Docs/S2-1911858.zip S2-1911058-TR 23.737-Virtual Cell solution.doc [retrieved on Nov. 8, 2019] the whole document.

Thales: "NTN TR 38.821 Chap 8 Corrections", 3GPP TSG RAN WG3 Meeting #104, 3GPP Draft; R3-192760 NTN TR 38.821 CHAP 8 Corrections V2, 3rd Generation Partnership Project (3GPP), Mobile Competence Centre; 650, Route Des Lucioles; F-06921 Sophia-Antipolis Cedex; France, vol. RAN WG3, No. Reno; May 13, 2019-May 17, 2019, May 3, 2019 (May 3, 2019), 26 Pages, XP051712953, Retrieved from the Internet: URL: http://www.3gpp.org/ftp/tsg%5Fran/WG3%5Flu/TSGR3%5F104/Docs/R3%2D192760%2Ezip [retrieved on May 3, 2019] paragraph [08.3].

Zte, et al., "Tracking Area Management and Paging Handling in NTN", 3GPP Draft, R3-190139, 3GPP TSG RAN WG3#103, Tracking Area Management and Paging Handling in NTN V5, 3rd Generation Partnership Project (3GPP), Mobile Competence Centre, 650, Route Des Lucioles, F-06921 Sophia-Antipolis C, vol. RAN WG3, No. Athens, Greece; Feb. 25, 2019-Mar. 1, 2019, Feb. 16, 2019 (Feb. 16, 2019), 13 Pages, XP051604086, Retrieved from the Internet: URL: http://www.3gpp.org/ftp/tsg%5Fran/WG3%5Flu/TSGR3%5F103/Docs/R3%2D190139%2Ezip [retrieved on Feb. 16, 2019] title, Chapters 1, 2, 8.3, the whole document.

Thales., et al., "NR-NTN: TP for Chap 7.3 NR Modifications to Support NTN", 3GPP TSG RAN Meeting #80, RP-180658, La Jolla, USA, Jun. 11-Jun. 14, 2018, 37 Pages.

Huawei: "Support of Location Reporting Function in NG-RAN", 3GPP Draft, 3GPP TSG-RAN3 Meeting #99bis, R3-182029, 3rd Generation Partnership Project (3GPP), Mobile Competence Centre, 650, Route Des Lucioles, F-06921 Sophia-Antipolis Cedex, France, vol. RAN WG3. No. Sanya, China, Apr. 16, 2018-Apr. 20, 2018 Apr. 15, 2018 (Apr. 15, 2018), XP051430187, 4 Pages, Retrieved from the Internet: URL:http://www.3gpp.org/ftp/Meetings%5F3GPP%5FSYNC/RAN3/Docs/ [retrieved on Apr. 15, 2018] Proposal 4.

\* cited by examiner

CONFIGURATION OF FIXED TRACKING AREAS AND FIXED CELLS FOR A 5G SATELLITE RAT

CLAIM OF PRIORITY UNDER 35 U.S.C. §119

This application claims under 35 U.S.C. § 119 the benefit of and priority to U.S. Provisional Application No. 62/932,486, filed Nov. 7, 2019, and entitled "SYSTEMS AND METHODS FOR SUPPORT OF A 5G SATELLITE RADIO ACCESS TECHNOLOGY," U.S. Provisional Application No. 62/989,572, filed Mar. 13, 2020, and entitled "Methods Performed In User Equipment, Satellite Vehicles, Or Earth Stations For Enabling Third Generation Partnership Project (3GPP) Protocol Communications, Via Satellite Relay," U.S. Provisional Application No. 63/010,564, filed Apr. 15, 2020, and entitled "SYSTEMS AND METHODS FOR: SUPPORTING FIXED TRACKING AREAS AND FIXED CELLS FOR MOBILE SATELLITE WIRELESS ACCESS; HANDOVER OF MOBILE DEVICES, RADIO CELLS AND SPACE VEHICLES FOR MOBILE SATELLITE WIRELESS ACCESS; SUPPORTING SATELLITE ACCESS FROM MOBILE DEVICES TO PUBLIC LAND MOBILE NETWORKS; ASSISTING RADIO CELL ACQUISITION BY A MOBILE DEVICE FOR SATELLITE WIRELESS ACCESS," U.S. Provisional Application No. 63/028,539, filed May 21, 2020, and entitled "SYSTEMS AND METHODS FOR: SUPPORTING FIXED TRACKING AREAS AND FIXED CELLS FOR MOBILE SATELLITE WIRELESS ACCESS; HANDOVER OF MOBILE DEVICES, RADIO CELLS AND SPACE VEHICLES FOR MOBILE SATELLITE WIRELESS ACCESS; SUPPORTING SATELLITE ACCESS FROM MOBILE DEVICES TO PUBLIC LAND MOBILE NETWORKS; ASSISTING RADIO CELL ACQUISITION BY A MOBILE DEVICE FOR SATELLITE WIRELESS ACCESS," and U.S. Provisional Application No. 63/081,307, filed Sep. 21, 2020, and entitled "CONFIGURATION OF FIXED TRACKING AREAS AND FIXED CELLS FOR A 5G SATELLITE RAT," all of which are assigned to the assignee hereof and are incorporated herein by reference in their entireties.

BACKGROUND

Field of the Disclosure

Various aspects described herein generally relate to wireless communication systems, and more particularly, to accessing a wireless network using communication satellites.

Description of Related Technology

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Standardization is ongoing to combine satellite-based communication systems with terrestrial wireless communications systems, such as 5G New Radio (NR) networks. In such a system, a user equipment (UE) would access a satellite, also referred to as a space vehicle (SV), instead of a base station, which would connect to an earth station, also referred to as a ground station or non-terrestrial (NTN) gateway, which in turn would connect to a 5G network (e.g. directly or via a base station). A 5G network could treat the satellite system as another type of Radio Access Technology (RAT) distinct from, but also similar to, terrestrial 5G NR.

Since satellites typically differ from terrestrial base stations in terms of the size of their coverage areas, movement of coverage areas, longer propagation delays and different carrier frequencies, a 5G satellite RAT may need different implementation and support than a 5G terrestrial RAT for providing common services to end users. It may then be preferable to both optimize, and to minimize the impact for, such different implementation and support.

SUMMARY

User equipment (UE) access to a non-terrestrial network (NTN), such as via satellite access to a Fifth Generation (5G) public land mobile network (PLMN), is supported using fixed tracking areas (TAs) and fixed cells. The fixed TAs and fixed cells are defined in the NTN independently of NTN radio cells. Network elements in the NTN are provided with configuration information for the fixed TAs and fixed cells from a server (e.g., an Operations and Maintenance (O&M) server). The configuration information includes location related information for the fixed TA and fixed cells, which may not be standardized. The network entities perform one or more services for the UE based on the location related information for the fixed TAs and fixed cells, such as determining a fixed TA or fixed serving cell for a UE, locating the UE, routing emergency calls, and supporting wireless emergency alerting (WEA).

In one implementation, a method for supporting satellite wireless access by a user equipment (UE) to a serving public land mobile network (PLMN), performed by a network element (NE) of the serving PLMN, includes receiving configuration information for a plurality of fixed tracking areas (TAs) and fixed cells from a server, wherein the plurality of fixed TAs and fixed cells are independent of satellite radio cells for the serving PLMN, wherein the configuration information includes location related information for the plurality of fixed TAs and fixed cells, wherein the location related information is not standardized; and performing at least one service for the UE based on the location related information for the plurality of fixed TAs and fixed cells.

In one implementation, a network element (NE) configured for supporting satellite wireless access by a user equipment (UE) to a serving public land mobile network (PLMN), the NE being in the serving PLMN, includes an external interface configured to communicate with network entities; at least one memory; at least one processor coupled to the external interface and the at least one memory, wherein the at least one processor is configured to: receive, via the external interface, configuration information for a plurality of fixed tracking areas (TAs) and fixed cells from a server, wherein the plurality of fixed TAs and fixed cells are independent of satellite radio cells for the serving PLMN, wherein the configuration information includes location related information for the plurality of fixed TAs and fixed cells, wherein the location related information is not standardized; and perform at least one service for the UE based on the location related information for the plurality of fixed TAs and fixed cells.

In one implementation, a non-transitory storage medium including program code stored thereon, the program code is operable to configure at least one processor in a network element (NE) for supporting satellite wireless access by a user equipment (UE) to a serving public land mobile network (PLMN), the network element (NE) being in the serving PLMN, includes program code to receive configuration information for a plurality of fixed tracking areas (TAs) and fixed cells from a server, wherein the plurality of fixed TAs and fixed cells are independent of satellite radio cells for the serving PLMN, wherein the configuration information includes location related information for the plurality of fixed TAs and fixed cells, wherein the location related information is not standardized; and program code to perform at least one service for the UE based on the location related information for the plurality of fixed TAs and fixed cells.

In one implementation, a network element (NE) configured for supporting satellite wireless access by a user equipment (UE) to a serving public land mobile network (PLMN), the network element (NE) being in the serving PLMN, includes means for receiving configuration information for a plurality of fixed tracking areas (TAs) and fixed cells from a server, wherein the plurality of fixed TAs and fixed cells are independent of satellite radio cells for the serving PLMN, wherein the configuration information includes location related information for the plurality of fixed TAs and fixed cells, wherein the location related information is not standardized; and means for performing at least one service for the UE based on the location related information for the plurality of fixed TAs and fixed cells.

Figure 1:
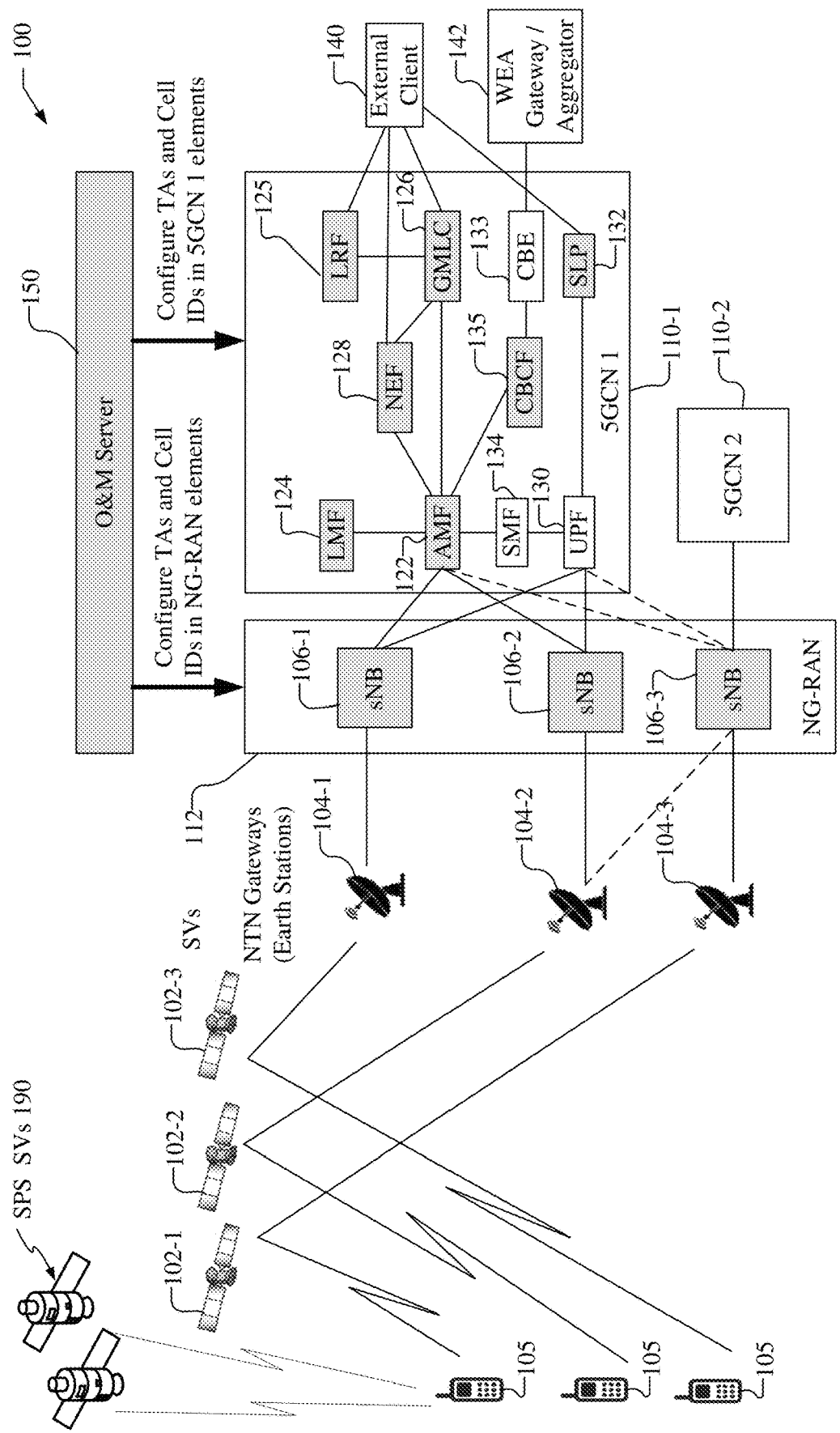
FIG. 1 shows a diagram of a communication system with a network architecture having transparent space vehicles (SVs) that is capable of supporting satellite access to a wireless network.

Like reference symbols in the various drawings indicate like elements, in accordance with certain example implementations. In addition, multiple instances of an element may be indicated by following a first number for the element with a letter or a hyphen and a second number. For example, multiple instances of an element 102 may be indicated as 102-1, 102-2, 102-3 etc. When referring to such an element using only the first number, any instance of the element is to be understood (e.g. element 102 in the previous example would refer to elements 102-1, 102-2, 102-3).

DETAILED DESCRIPTION

Satellites, also referred to as space vehicles (SVs) or communication satellites, may be used in communication systems, for example, using gateways and one or more satellites to relay communication signals between the gateways and one or more UEs. A UE, for example, may access a satellite (instead of a terrestrial base station) which may be connected to an earth station (ES), which is also referred to as a ground station or Non-Terrestrial Network (NTN) Gateway. The earth station in turn would connect to an element in a 5G Network such as a modified base station (without a terrestrial antenna) or a network node in a 5G Core Network (5GCN). This element would in turn provide access to other elements in the 5G Network and ultimately to entities external to the 5G Network such as Internet web servers and other user devices.

A rationale for 5G (or other cellular network) satellite access for UEs may include ubiquitous outdoor coverage for both users and Mobile Network Operators (MNOs). For example, in many countries, including the United States, unavailable or poor cellular coverage is a common problem. Moreover, cellular access is not always possible even when there is normally good cellular coverage. For example, cellular access may be hampered due to congestion, physical obstacles, a local cellular outage caused by weather (e.g. a hurricane or tornado), or a local power outage. Satellite access to cellular networks could provide a new independent access potentially available everywhere outdoors. Current satellite capable phones for low Earth orbit (LEO) SVs may be of similar size to a cellular smartphone and, thus, mobile NR support with satellite capable phones need not produce a significant increase in the size of phones. Moreover, satellite capable smartphones may help drive handset sales, and may add revenue for carriers. Potential users, for example, may include anyone with limited or no cellular access, anyone wanting a backup to a lack of cellular access, and anyone involved in public safety or who otherwise needs (nearly) 100% reliable mobile communication. Additionally, some users may desire an improved or more reliable E911 service, e.g., for a medical emergency or vehicle trouble in remote areas.

The use of 5G satellite access may provide other benefits. For example, 5G satellite access may reduce Mobile Network Operator (MNO) infrastructure cost. For example, an MNO may use satellite access to reduce terrestrial base stations, such as NR NodeBs, also referred to as gNBs, and backhaul deployment in sparsely populated areas. Further, 5G satellite access may be used to overcome internet blockage, e.g., in certain countries. Additionally, 5G satellite access may provide diversification to Space Vehicle Operators (SVOs). For example, 5G NR satellite access could provide another revenue stream to SVOs who would otherwise provide fixed Internet access.

Terrestrial networks (TNs) using terrestrial cellular base stations can support relatively small fixed radio cells (e.g. 100 meters to 10 kms from one side to another) which can have accurately known geographic coverage areas. This allows an operator of a TN to subdivide their overall service area into fixed tracking areas (TAs) which are each composed of a number of fixed radio cells. Tracking areas allow an operator to control access by users (e.g. define certain geographic areas which can only be accessed by a subset of users) and to charge users based on their general location. Radio cells allow an operator a fine level of access control and fine level of charging discrimination and can be used for routing purposes and to support wireless emergency alerting (WEA). For example, a request to set up an emergency call sent by a UE to a TN can include the current serving radio cell of the UE which can be used by the TN to route the emergency call to a Public Safety Answering Point (PSAP), which serves the area of the serving radio cell. In addition, when a WEA message needs to be broadcast in a predefined target area to all UEs currently located in the target area, the TN may direct the WEA message to be broadcast only within radio cells whose coverage areas are within or partly within the target area.

It would be preferable to reuse fixed TAs and fixed radio cells in a Non Terrestrial Network (NTN) in which one or more space vehicles (SV) provide 5G New Radio (NR) access. However, in an NTN, a radio cell may be very large (e.g. 1000 kms from one side to another) and may be moving, either continuously or in discrete jumps or hops. This would make it difficult to control radio cell coverage (e.g. project a radio cell onto a specific target geographic area with minimal radio leakage outside the geographic area) and to determine the precise coverage area for a radio cell. As a consequence, fixed TAs and fixed radio cells analogous to those used in a TN cannot generally be used in an NTN, which means that the various services supported by fixed TAs and fixed cells in a TN may not be possible, or may be more difficult to support, in an NTN.

Accordingly, as discussed herein, in one implementation, fixed TAs and fixed cells are defined in an NTN independently of NTN radio cells such that network elements in the NTN are able to use the fixed cells and fixed TAs to derive the various benefits described above for a TN. The definition and support of fixed TAs and fixed cells in an NTN can also avoid impacts for 5G NR standards and implementations. Fixed cells may be referred to as virtual cells or earth fixed cells. Fixed TAs may similarly be referred to as virtual TAs, earth fixed TAs or simply as TAs.

For example, as illustrated in FIG. 1, discussed below, suitable fixed TAs and fixed cells for an NTN are defined for one PLMN by an operator of the PLMN using Operations and Maintenance (O&M). For example, a fixed cell or fixed TA may be defined as a polygon by providing coordinates (e.g. latitude, longitude and optionally altitude) for each vertex of the polygon. Alternatively, a fixed cell or fixed TA may be defined using a regular array of grid points in which each grid point defines a fixed cell or fixed TA as comprising all locations closer to that grid point than to any other grid point (e.g. which may result in rectangular or hexagonal fixed cells or fixed TAs). These definitions may be stored in an O&M server.

The O&M server may configure the defined fixed TAs and fixed cells in various network entities in the NTN. Possible entities for which fixed TAs and fixed cells may be configured by the O&M server are shown in FIG. 1 using shading. For example, each satellite NodeB (sNB) in an NG-RAN may be assigned a set of fixed TAs and fixed cells, which may or may not overlap with the fixed TAs and fixed cells assigned to another sNB. The fixed TAs and fixed cells assigned to an sNB may correspond to (or define) a coverage area for the sNB. The O&M server may then send configuration information for the fixed TAs and fixed cells assigned to any sNB to the sNB. For example, for each assigned fixed TA and fixed cell, the configuration information may include an identity (of the fixed cell or fixed cell) that may include an identity of the sNB (e.g. in leftmost bits of the identity of the fixed TA or fixed cell). The configuration information may further include a geographic definition of the fixed TA or fixed cell (e.g. as provided by the operator to the O&M server or as derived from an operator provided definition by the O&M server).

Similar configuration of fixed TAs and fixed cells may occur in other entities in a 5GCN, such as an Location Management Function (LMF), Secure User Plane Location (SUPL) Location Platform (SLP), Network Exposure Function (NEF) and/or Cell Broadcast Center Function (CBCF). An O&M server may provide to various entities in the NTN the configuration information for the fixed TAs and fixed cells that need to be supported by the each entity (e.g. such as an LMF, SLP, NEF or CBCF). The configuration information may be the same as or similar to that described above for an sNB—e.g. may include an identity and geographic definition for each configured fixed TA and fixed cell.

Other entities that may be configured with fixed TAs and fixed cells in an NTN include a Gateway Mobile Location Center (GMLC) and Location Retrieval Function (LRF). Configuration information for a fixed TA or fixed cell in this case may include an identity of the fixed TA or fixed cell and information related to the routing of an emergency call from a UE located in the fixed TA or fixed cell. For example, the routing information may indicate the identity of a PSAP or the identity of some entity connected to a PSAP to which a request to set up an emergency call (e.g. a SIP INVITE message) from a UE located in the fixed TA or fixed cell should be routed.

The configuration described above and illustrated in FIG. 1, and as described below, may not require a standard definition of a fixed TA or fixed cell. For example, while an operator could define a fixed TA or fixed cell using a polygon or a regular array of grid points, the exact information and/or implementation used for this (e.g. including a definition of coordinates for grids points or vertices of a polygon and their formatting and encoding) can be defined by the operator or as part of the implementation of the O&M server. Other definitions of a fixed TA or fixed cell could also be used such as a definition based on a map, a civic location, a TN radio cell or TN tracking area. In addition, there may be no requirement to transfer configuration information for a fixed TA or fixed cell between different network elements of an NTN. The only transfer of configuration information that may be performed may be from an O&M server to a network element of a NTN, which may use protocols that are proprietary to the NTN. This may simplify implementation and deployment of fixed TAs and fixed cells and may avoid the need to standardize fixed TAs and fixed cells.

The fixed TAs and fixed cells configured as above may be used within an NTN in various manners. For example, in one implementation, within an sNB, a radio cell may be mapped to one or more fixed TAs. The mapping, for example, may be to some or all fixed TAs which at a particular point in time partly overlap with the coverage area of the radio cell. The sNB may broadcast within the radio cell (e.g. in a System Information Block type 1 (SIB1)), the identities of one or more PLMNs supported by the radio cell and, for each supported PLMN, may broadcast the identities of the TAs for this PLMN to which the radio cell maps. A UE which is able to receive the radio cell may then know which TAs are supported for any PLMN supported by the radio cell. When a UE enters a CONNECTED state with a PLMN and sends a first Non-Access Stratum (NAS) message (e.g. a NAS Registration Request or NAS Service Request) to the PLMN (e.g. to an Access and Mobility Management Function (AMF)), the serving sNB may obtain a location for the UE and map the location to a particular fixed TA and fixed cell for the PLMN. The sNB may provide the identities of this fixed TA and fixed cell to the PLMN (e.g. to an AMF) along with the first NAS message. The PLMN (e.g. AMF) may use the identities of the fixed TA and fixed cell for various location related purposes similarly to usage in a terrestrial network (TN) PLMN. For example, the PLMN may use the identities of this fixed TA and fixed cell to decide whether the UE is allowed to access the PLMN, to determine charges to be applied, to assist location of the UE (e.g., as information which can be sent to an external client or to an LMF to assist the LMF to locate the UE), and to page the UE at a later time, e.g., where the last fixed TA or last fixed cell used by the UE is provided by the PLMN (e.g., the AMF) to an sNB to indicate a location area in which to page the UE. All of these usages are well known in a TN and are reused in an NTN based on the fixed TAs and fixed cells defined and configured by O&M.

Fixed TAs and fixed cells configured by an O&M server in a location server, such as an LMF or SLP, may be used to help locate the UE. For example, the configured geographic definition of a fixed TA or fixed cell may serve as an initial approximate location for the UE and may enable a more accurate location to be obtained based on measurements of downlink (DL) signals from SVs or Global Navigation Satellite Systems (GNSS) SVs by the UE or measurements of uplink (UL) signals from the UE by sNBs or SVs, where the approximate initial location information enables the LMF or SLP to provide assistance data for the measurements and/or determine which DL signals the UE should measure or which sNBs or SVs should measure UL signals from the UE.

Fixed TAs and fixed cells configured by an O&M server in a CBCF may enable the CBCF to determine fixed TAs and/or fixed cells in which any WEA message should be broadcast. The WEA message may have a target geographic area received by the CBCF from a Cell Broadcast Entity (CBE) also referred to as a cellular mobile service provider (CMSP) gateway. The CBE may have received this information from a WEA gateway or WEA aggregator which may be external to the PLMN and owned and operated by a government agency for the purpose of providing WEA messages (e.g., concerning an impending hurricane, tornado, wildfire, severe storm or other public danger) to users in an affected area. The CBCF may determine the fixed cells and/or fixed TAs that are within or overlap with the target area (e.g. by using the geographic definitions of the fixed cells and/or fixed TAs configured in the CBCF by the O&M server) and may forward the WEA message together with the determined fixed cells and/or fixed TAs to an AMF which can further forward the WEA message to each sNB that supports one or more of the determined fixed cells and/or fixed TAs. Each sNB may broadcast the WEA message in each radio cell controlled by the sNB whose coverage includes at least one fixed TA or one fixed cell. This process avoids the need for the CBCF and AMF to know details of moving radio cells and aligns with a process used to support WEA in a TN, which may reduce implementation impacts for supporting WEA in an NTN.

Fixed TAs and fixed cells, which are configured by an O&M server in an LRF or GMLC, may be used to support routing of an emergency call as described above. In this case, configuration information for a fixed cell or fixed TA may include an identity of the fixed TA or fixed cell and an identification of one or more PSAPs or intermediate entities to which an emergency call from a UE located in the fixed cell or fixed TA should be routed.

To enable a UE to know in which fixed cell and/or fixed TA it is located, an sNB or AMF could provide the fixed TA or fixed cell to the UE. For example, when a UE is in an IDLE state and then accesses an sNB supporting a PLMN and enters a CONNECTED state, the sNB might obtain a location for the UE, map the location to a fixed TA and fixed cell and provide the identities of the fixed TA and fixed cell to an AMF for the PLMN (e.g., along with an initial NAS message sent by the UE). The AMF may return the identities of the fixed TA and fixed cell to the UE—e.g., in a NAS response message. Alternatively, the sNB may provide the identities of the fixed TA and fixed cell to the UE directly—e.g., in an Radio Resource Control (RRC) message conveying a NAS response message from the AMF. Alternatively, the AMF or an LMF may locate the UE, map the location of the UE to a fixed TA and fixed cell and return the identities of these to the UE.

The UE may use the identity of a fixed TA (e.g., received as described above) to support mobility—e.g., where the UE may camp on a radio cell indicating support for the fixed TA and only performs a registration to a new TA if the UE is unable to find a radio cell supporting the fixed TA. The UE may further use the identity of a fixed cell (e.g., received as described above) to establish an emergency call by including the identity of the fixed cell in a request to establish the emergency call (e.g. a Session Initiation Protocol (SIP) INVITE message) which is then used, as described above, by a GMLC or LMF to route the emergency call to an appropriate PSAP or intermediate entity.

In some implementations, if it is preferred for UEs to remain aware of a current TA and current fixed cell while in an IDLE state (e.g. in order to know ahead of time whether the UE is an area where access is or is not allowed), an AMF may be configured with the identities of fixed TAs and fixed cells and their associated geographic definitions and may provide this information to a UE when the UE registers with the AMF (e.g., may provide the information in a NAS Registration Accept message). With this implementation, an AMF may not need to interpret the configuration information and may instead just provide the information to UEs (e.g. following a registration of any UE) which may reduce impacts to AMF implementation, but the information may need to be standardized in order to allow a UE to interpret the information.

FIG. 1 illustrates an example network architecture 100 capable of supporting satellite access using 5G New Radio (NR) and using fixed cells and fixed TAs, which are defined independently of the network, as discussed herein. For example, fixed cells and fixed TAs may be used by the network to (i) decide whether to allow UE access, (ii) determine charging, (iii) assist location of the UE, (iv) assist in broadcast of alert messages, (v) route emergency calls, etc. FIG. 1 illustrates a network architecture with transparent space vehicles (SVs). A transparent SV may implement frequency conversion and a radio frequency (RF) amplifier in both uplink (UL) and downlink (DL) directions and may correspond to an analog RF repeater. A transparent SV, for example, may receive uplink (UL) signals from all served UEs and may redirect the combined signals DL to an earth station without demodulating or decoding the signals Similarly, a transparent SV may receive an UL signal from an earth station and redirect the signal DL to served UEs without demodulating or decoding the signal. However, the SV may frequency convert received signals and may amplify and/or filter received signals before transmitting the signals.

The network architecture 100 comprises a number of UEs 105, a number of SVs 102-1 to 102-3 (collectively referred to herein as SVs 102), a number of Non-Terrestrial Network (NTN) gateways 104-1 to 104-3 (collectively referred to herein as NTN gateways 104) (sometimes referred to herein simply as gateways 104, earth stations 104, or ground stations 104), a number of NR NodeBs (gNBs) capable of communication with UEs via SVs 102 referred to herein as satellite NodeBs (sNBs) 106-1 to 106-3 (collectively referred to herein as sNBs 106) that are part of a Next Generation (NG) Radio Access Network (RAN) (NG-RAN) 112. It is noted that the term sNB refers in general to an enhanced gNB with support for SVs and may be referred to as a gNB (e.g. in 3GPP). The network architecture 100 is illustrated as further including components of a number of Fifth Generation (5G) networks including 5G Core Networks (5GCNs) 110-1 and 110-2 (collectively referred to herein as 5GCNs 110). The 5GCNs 110 may be public land mobile networks (PLMN) that may be located in the same or in different countries. FIG. 1 illustrates various components within 5GCN1 110-1 that may operate with the NG-RAN 112. It should be understood that 5GCN2 110-2 and other 5GCNs may include identical, similar or different components and associated NG-RANs, which are not illustrated in FIG. 1 in order to avoid unnecessary obfuscation. A 5G network may also be referred to as a New Radio (NR) network; NG-RAN 112 may be referred to as a 5G RAN or as an NR RAN; and SGCN 110 may be referred to as an NG Core network (NGC).

The network architecture 100 may further utilize information from space vehicles (SVs) 190 for Satellite Positioning System (SPS) including Global Navigation Satellite Systems (GNSS) like Global Positioning System (GPS), GLObal NAvigation Satellite System (GLONASS), Galileo or Beidou or some other local or regional SPS, such as Indian Regional Navigation Satellite System (IRNSS), European Geostationary Navigation Overlay Service (EGNOS), or Wide Area Augmentation System (WAAS), all of which are sometimes referred to herein as GNSS. It is noted that SVs 190 act as navigation SVs and are separate and distinct from SVs 102, which act as communication SVs. However, it is not precluded that some of SVs 190 may also act as some of SVs 102 and/or that some of SVs 102 may also act as some of SVs 190. In some implementations, for example, the SVs 102 may be used for both communication and positioning. Additional components of the network architecture 100 are described below. The network architecture 100 may include additional or alternative components.

Permitted connections in the network architecture 100 having the network architecture with transparent SVs illustrated in FIG. 1, allow an sNB 106 to access multiple Earth stations 104 and/or multiple SVs 102. An sNB 106, e.g., illustrated by sNB 106-3, may also be shared by multiple PLMNs (5GCNs 110), which may all be in the same country or possibly in different countries, and an Earth station 104, e.g., illustrated by Earth station 104-2, may be shared by more than one sNB 106.

It should be noted that FIG. 1 provides only a generalized illustration of various components, any or all of which may be utilized as appropriate, and each of which may be duplicated or omitted, as necessary. Specifically, although only three UEs 105 are illustrated, it will be understood that many UEs (e.g., hundreds, thousands, millions, etc.) may utilize the network architecture 100. Similarly, the network architecture 100 may include a larger (or smaller) number of SVs 190, SVs 102, earth stations 104, sNBs 106, NG-RAN 112, 5GCNs 110, external clients 140, and/or other components. The illustrated connections that connect the various components in the network architecture 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, 4G Long Term Evolution (LTE), etc.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 112 and SGCN 140), etc. The UE 105 may also support wireless communication using a Wireless Local Area Network (WLAN) which may connect to other networks (e.g. the Internet) using a Digital Subscriber Line (DSL) or packet cable for example. The UE 105 further supports wireless communications using space vehicles, such as SVs 102. The use of one or more of these RATs may allow the UE 105 to communicate with an external client 140 (via elements of SGCN 110 not shown in FIG. 1, or possibly via a Gateway Mobile Location Center (GMLC) 126).

The UE 105 may include a single entity or may include multiple entities such as in a personal area network where a user may employ audio, video and/or data I/O devices and/or body sensors and a separate wireline or wireless modem.

The UE 105 may support position determination, e.g., using signals and information from space vehicles 190 in an SPS, such as GPS, GLONASS, Galileo or Beidou or some other local or regional SPS such as IRNSS, EGNOS or WAAS, all of which may be generally referred to herein as GNSS. Position measurements using SPS are based on measurements of propagation delay times of SPS signals broadcast from a number of orbiting satellites to a SPS receiver in the UE 105. Once the SPS receiver has measured the signal propagation delays for each satellite, the range to each satellite can be determined and precise navigation information including 3-dimensional position, velocity and time of day of the SPS receiver can then be determined using the measured ranges and the known locations of the satellites. Positioning methods which may be supported using SVs 190 may include Assisted GNSS (A-GNSS), Real Time Kinematic (RTK), Precise Point Positioning (PPP) and Differential GNSS (DGNSS). Information and signals from SVs 102 may also be used to support positioning. The UE 105 may further support positioning using terrestrial positioning methods, such as Observed Time Difference of Arrival (OTDOA), Enhanced Cell ID (ECID), Round Trip signal propagation Time (RTT), multi-cell RTT, angle of arrival (AOA), angle of departure (AOD), time of arrival (TOA), receive-transmit transmission-time difference (Rx-Tx) and/or other positioning methods.

An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

The UEs 105 are configured to communicate with 5GCNs 110 via the SVs 102, earth stations 104, and sNBs 106. As illustrated by NG-RAN 112, the NG-RANs associated with the 5GCNs 110 may include one or more sNBs 106. The NG-RAN 112 may further include a number of terrestrial base stations, e.g., gNBs (not shown) that are not capable of communication with UEs via SVs 102 (not shown). Pairs of terrestrial and/or satellite base stations, e.g., gNBs and sNB 106-1 in NG-RAN 112 may be connected to one another using terrestrial links—e.g. directly or indirectly via other gNBs or sNBs 106 and communicate using an Xn interface. Access to the 5G network is provided to UEs 105 via wireless communication between each UE 105 and a serving sNB 106, via an SV 102 and an earth station 104. The sNBs 106 may provide wireless communications access to the SGCN 110 on behalf of each UE 105 using 5G NR. 5G NR radio access may also be referred to as NR radio access or as 5G radio access and may be as defined by the Third Generation Partnership Project (3GPP).

Base stations (BSs) in the NG-RAN 112 shown in FIG. 1 may also or instead include a next generation evolved Node B, also referred to as an ng-eNB. An ng-eNB may be connected to one or more sNBs 106 and/or gNBs in NG-RAN 112—e.g. directly or indirectly via other sNBs 106, gNBs and/or other ng-eNBs. An ng-eNB may provide LTE wireless access and/or evolved LTE (eLTE) wireless access to a UE 105.

An sNB 106 may be referred to by other names such as a gNB or a "satellite node" or "satellite access node." The sNBs 106 are not the same as terrestrial gNBs, but may be based on a terrestrial gNB with additional capability. For example, an sNB 106 may terminate the radio interface and associated radio interface protocols to UEs 105 and may transmit DL signals to UEs 105 and receive UL signals from UEs 105 via SVs 102 and earth stations (ESs) 104. An sNB 106 may also support signaling connections and voice and data bearers to UEs 105 and may support handover of UEs 105 between different radio cells for the same SV 102, between different SVs 102 and/or between different sNBs 106. In some systems, an sNB 106 may be referred to as a gNB or as an enhanced gNB. SNBs 106 may be configured to manage moving radio beams (for LEO SVs) and associated mobility of UEs 105. The sNBs 106 may assist in the handover (or transfer) of SVs 102 between different Earth stations 104, different sNBs 106, and between different countries. The sNBs 106 may hide or obscure specific aspects of connected SVs 102 from the SGCN 110, e.g. by interfacing to a SGCN 110 in the same way or in a similar way to a gNB, and may avoid a 5GCN 110 from having to maintain configuration information for SVs 102 or perform mobility management related to SVs 102. The sNBs 106 may further assist in sharing of SVs 102 over multiple countries. The sNBs 106 may communicate with one or more earth stations 104, e.g., as illustrated by sNB 106-2 communicating with earth stations 104-2 and 104-1. The sNBs 106 may be separate from earth stations 104, e.g., as illustrated by sNBs 106-1 and 106-2, and earth stations 104-1 and 104-2. The sNBs 106 may include or may be combined with one or more earth stations 104, e.g., using a split architecture. For example, with a split architecture, an sNB 106 may include a Central Unit and an earth station may act as Distributed Unit (DU). An sNB 106 may typically be fixed on the ground with transparent SV operation. In one implementation, one sNB 106 may be physically combined with, or physically connected to, one earth station 104 to reduce complexity and cost.

The earth stations 104 may be shared by more than one sNB 106 and may communicate with UE 105 via the SVs 102. An earth station 104 may be dedicated to just one SVO and to one associated constellation of SV 102 and hence may be owned and managed by the SVO. Earth stations 104 may be included within an sNB 106, e.g., as an sNB-DU within an sNB 106, which may occur when the same SVO or the same MNO owns both the sNB 106 and the included earth stations 104. Earth stations 104 may communicate with SVs 102 using control and user plane protocols that may be proprietary to an SVO. The control and user plane protocols between earth stations 104 and SVs 102 may: (i) establish and release Earth Station 104 to SV 102 communication links, including authentication and ciphering; (ii) update SV software and firmware; (iii) perform SV Operations and Maintenance (O&M); (iv) control radio beams (e.g., direction, power, on/off status) and mapping between radio beams and earth station uplink (UL) and downlink (DL) payload; and (v) assist with handoff of an SV 102 or radio cell to another Earth station 104.

As noted, while FIG. 1 depicts nodes configured to communicate according to 5G NR and LTE communication protocols for an NG-RAN 112, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 105, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 112 and the EPC corresponds to SGCN 110 in FIG. 1. The methods and techniques described herein for support of a RAN location server function may be applicable to such other networks.

The sNBs 106 and gNBs (if present in the NG-RAN 112) may communicate with an Access and Mobility Management Function (AMF) 122 in a SGCN 110, which, for positioning functionality, may communicate with a Location Management Function (LMF) 124. For example, the sNBs 106 may provide an N2 interface to the AMF 122. An N2 interface between an sNB 106 and a SGCN 110 may be the same as an N2 interface supported between a gNB and a SGCN 110 for terrestrial NR access by a UE 105 and may use the Next Generation Application Protocol (NGAP) defined in 3GPP Technical Specification (TS) 38.413 between an sNB 106 and the AMF 122. The AMF 122 may support mobility of the UE 105, including radio cell change and handover and may participate in supporting a signaling connection to the UE 105 and possibly data and voice bearers for the UE 105. The LMF 124 may support positioning of the UE 105 when UE accesses the NG-RAN 112 and may support position procedures/methods such as A-GNSS, OTDOA, RTK, PPP, DGNSS, ECID, AOA, AOD, multi-cell RTT and/or other positioning procedures including positioning procedures based on communication signals from one or more SVs 102. The LMF 124 may also process location services requests for the UE 105, e.g., received from the AMF 122 or from a Gateway Mobile Location Center (GMLC) 126. The LMF 124 may be connected to AMF 122 and/or to GMLC 126. In some embodiments, a node/system that implements the LMF 124 may additionally or alternatively implement other types of location-support modules, such as an Enhanced Serving Mobile Location Center (E-SMLC). It is noted that in some embodiments, at least part of the positioning functionality (including derivation of a UE 105's location) may be performed at the UE 105 (e.g., using signal measurements obtained by UE 105 for signals transmitted by SVs 102, SVs 190, gNBs and assistance data provided to the UE 105, e.g. by LMF 124).

The GMLC 126 may support a location request for the UE 105 received from an external client 140 and may forward such a location request to the AMF 122 for forwarding by the AMF 122 to the LMF 124. A location response from the LMF 124 (e.g. containing a location estimate for the UE 105) may be similarly returned to the GMLC 126 via the AMF 122, and the GMLC 126 may then return the location response (e.g., containing the location estimate) to the external client 140. The GMLC 126 is shown connected to only the AMF 122 in FIG. 1 though in some implementations may be connected to both the AMF 122 and the LMF 124 and may support direct communication between the GMLC 126 and LMF 124 or indirection communications, e.g. via the AMF 122.

A Network Exposure Function (NEF) 128 may be included in SGCN 110, e.g., connected to the GMLC 126 and the AMF 122. In some implementations, the NEF 128 may be connected to communicate directly with the external client 140. The NEF 128 may support secure exposure of capabilities and events concerning SGCN 110 and UE 105 to an external client 140 and may enable secure provision of information from external client 140 to SGCN 110.

A User Plane Function (UPF) 130 may support voice and data bearers for UE 105 and may enable UE 105 voice and data access to other networks such as the Internet. The UPF 130 may be connected to sNBs 106 and gNBs. UPF 130 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 130 may be connected to a Secure User Plane Location (SUPL) Location Platform (SLP) 132 to enable support of positioning of UE 105 using SUPL. SLP 132 may be further connected to or accessible from external client 140.

As illustrated, a Session Management Function (SMF) 134 connects to the AMF 122 and the UPF 130. The SMF 134 may have the capability to control both a local and a central UPF within a PDU session. SMF 134 may manage the establishment, modification and release of PDU sessions for UE 105, perform IP address allocation and management for UE 105, act as a Dynamic Host Configuration Protocol (DHCP) server for UE 105, and select and control a UPF 130 on behalf of UE 105.

The external client 140 may be connected to the core network 110 via the GMLC 126 and/or the SLP 132, and in some implementations, the NEF 128. The external client 140 may optionally be connected to the core network 110 and/or to a location server, which may be, e.g., an SLP, that is external to SGCN 110, via the Internet. The external client 140 may be connected to the UPF 130 directly (not shown in FIG. 1) or through the Internet. The external client 140 may be a server, a web server, or a user device, such as a personal computer, a UE, etc.

A Location Retrieval Function (LRF) 125 may be connected to the GMLC 126, as illustrated, and in some implementations, to the SLP 132, as defined in 3GPP Technical Specifications (TSs) 23.271 and 23.167. LRF 125 may perform the same or similar functions to GMLC 126, with respect to receiving and responding to a location request from an external client 140 that corresponds to a Public Safety Answering Point (PSAP) supporting an emergency call from UE 105. One or more of the GMLC 126, LRF 125, and SLP 132 may be connected to the external client 140, e.g., through another network, such as the Internet.

Additionally, alert messages originating from various sources (e.g., federal agencies, local emergency operations centers (EOCs), and state EOCs) are provided to an alert aggregator 142 for dissemination to network providers. In an example, the alert aggregator 142 may provide the alerts to a federal alert gateway configured to authenticate the alert messages to prevent fraudulent alerts from being broadcast by a WEA system.

The 5GCN 110 may further include a cellular mobile service provider (CMSP) gateway 133 configured to receive alerts including impact area information from the WEA gateway/aggregator 142 and verify and reformat incoming messages and distribute the messages to one or more cell broadcast center functions (CBCFs) 135. CMSP gateway 133 may also be referred to as Cell Broadcast Entity (CBE) 133. The CBCF 135 is configured to retain information to identify fixed tracking areas, emergency areas, and/or fixed cell ID lists for an alert until the alert is canceled or the alert expires. The CBCFs 135 may determine the network elements for a WEA alert to include in a broadcast. The CBCFs 135 may pass alert messages to the AMF 122 using a service based interface. In a variant, an alert message may be transferred by CBCF 135 to a Public Warning System interworking function (PWS IWF) using an SBc interface; the PWS IWF may then perform protocol translation and transfer the alert message to AMF 122 using a service based interface.

In general, the role of the CBCF 135 is to decide in which fixed cells (or in which fixed tracking areas or emergency areas which may map to cells) an alert message needs to be broadcast based on the impact area. The CBCFs 135 receive a description or definition of the impact area along with the alert message and a required frequency and duration of transmission for the alert message from the CMSP gateway 133 which in turn receives at least the description or definition of the impact area and the alert message from WEA gateway /aggregator 142. The impact area may be defined as a polygon, ellipse, circle or some other 2-dimensional (or 3-dimensional) shape. One role of the CBCFs 135 may be to determine the fixed cells (or possibly the fixed tracking areas or emergency areas), for radio access networks (RANs) attached to SGCN 110, which are within or at least partly within the impact area. The CBCF 135 determines a list of identifiers for fixed cells (and/or fixed tracking areas and/or emergency areas), and sends the alert message to one or more AMFs 122 along with the list of the identifiers for the fixed cells (and/or fixed tracking areas and/or emergency areas).

The AMF 122 may normally support network access and registration by UEs 105, mobility of UEs 105, including radio cell change and handover and may participate in supporting a signaling connection to a UE 105 and possibly data and voice bearers for a UE 105. The role of an AMF 122 may be to transfer an alert message along with a list of identifiers for fixed cells to one or more sNBs 106 (and possibly gNBs) in the NG-RAN 112, e.g. as determined using the identifiers for fixed tracking areas provided by CBCF 135. Here, and for normal operation, sNBs 106 (and gNBs) may support wireless access using NR by UEs 105. The base stations, comprising the sNBs 106 (and gNBs) broadcast the alert message (e.g. using a SIB12), and including possibly the target area shape, to UEs 105 in their respective coverage areas. The broadcast may occur in each fixed cell that is indicated to a base station in association with the alert message by an AMF 122. An sNB 106 may map the fixed cells to radio cells controlled by the sNB 106 in which the alert message is broadcast (e.g. using a SIB12).

Network architecture 100 may be associated with or have access to space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. UEs 105 may obtain location measurements for signals transmitted by SVs 190 and/or by base stations and access points such as eNBs, ng-eNB, gNB, and/or SVs 102 which may enable a UE 105 to determine a location estimate for UE 105 or to obtain a location estimate for UE 105 from a location server in SGCN 110, e.g., LMF 124. For example, UE 105 may transfer location measurements to the location server to compute and return the location estimate. UEs 105 (or the LMF 124) may obtain a location estimate for UE 105 using position methods such as GPS, Assisted GPS (A-GPS), Assisted GNSS (A-GNSS), Observed Time Difference of Arrival (OTDOA), Enhanced Cell ID (ECID), multi-cell RTT, Wireless Local Area Network (WLAN) positioning (e.g. using signals transmitted by IEEE 802.11 WiFi access points), sensors (e.g. inertial sensors) in UE 105, or some (hybrid) combination of these. A UE 105 may use a location estimate for the UE 105 to determine or help determine whether the UE 105 is in an impact area for a broadcast alert message.

As noted, while the network architecture 100 is described in relation to 5G technology, the network architecture 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the SGCN 110 may be configured to control different air interfaces. For example, in some embodiments, SGCN 110 may be connected to a WLAN, either directly or using a Non-3GPP InterWorking Function (N3IWF, not shown FIG. 1) in the SGCN 110. For example, the WLAN may support IEEE 802.11 WiFi access for UE 105 and may comprise one or more WiFi APs. Here, the N3IWF may connect to the WLAN and to other elements in the SGCN 110 such as AMF 122.

Support of transparent SVs with the network architecture shown in FIG. 1 may impact the communication system as follows. The SGCN 110 may treat a satellite RAT as a new type of terrestrial RAT with longer delay, reduced bandwidth and higher error rate. Consequently, while there may be some impact to Protocol Data Unit (PDU) session establishment and mobility management (MM) and connection management (CM) procedures. Impacts to an AMF 122 (or LMF 124) may be small—e.g. such as providing pre-configured data for fixed tracking areas (TAs) and cells to a UE 105 during Registration. There may be no impact to the SVs 102. The SVs 102 may be shared with other services (e.g. satellite TV, fixed Internet access) with 5G NR mobile access for UEs added in a transparent manner This may enable legacy SVs 102 to be used and may avoid the need to deploy a new type of SV 102. Further, the sNBs 106 may be fixed and may be configured to support one country and one or more PLMNs in that country. The sNBs 106 may need to assist assignment and transfer of SVs 102 and radio cells between sNBs 106 and earth stations 104 and support handover of UEs 105 between radio cells, SVs 102 and other sNBs 106. Thus, the sNB 106 may differ from a terrestrial gNB. Additionally, a coverage area of an sNB 106 may be much larger than the coverage area of a gNB.

In some implementations, the radio beam coverage of an SV 102 may be large, e.g., up to or greater than 1000 kms across, and may provide access to more than one country. An earth station 104 may be shared by multiple sNBs (e.g., earth station 104-1 may be shared by sNBs 106-1 and 106-2), and an sNB 106 may be shared by multiple core networks in separate PLMNs located in the same country or in different countries (e.g., sNB 106-2 may be shared by 5GCN1 110-1 and 5GCN2 110-1, which may be in different PLMNs in the same country or in different countries).

An O&M server 150 may be external to the SGCN 110. The O&M server 150, for example, may store definitions for fixed TAs and fixed cells for the SGCN 110 that may be defined for the PLMN by an operator of the PLMN using Operations and Maintenance (O&M). For example, a fixed cell or fixed TA may be defined as a polygon by providing coordinates (e.g. latitude, longitude and optionally altitude) for each vertex of the polygon. Alternatively, a fixed cell or fixed TA may be defined using a regular array of grid points in which each grid point defines a fixed cell or fixed TA as comprising all locations closing to that grid point than to any other grid point (e.g. which may result in rectangular or hexagonal fixed cells or fixed TAs). The O&M server 150 may configures the defined fixed TAs and fixed cells in various network entities in the SGCN 110 and NG-RAN 112. Possible entities in the SGCN 110 and the NG-RAN 112 for which fixed TAs and fixed cells may be configured by the O&M server 150 are illustrated in FIG. 1 with shading. For example, each sNB 106 in the NG-RAN 112 may be assigned a set of fixed TAs and fixed cells which may or may not overlap with the fixed TAs and fixed cells assigned to another sNB 106. The fixed TAs and fixed cells assigned to an sNB 106 may correspond to (or define) a coverage area for the sNB 106. The O&M server 150 may send configuration information for the fixed TAs and fixed cells assigned to an sNB 106 to the sNB 106. For example, for each assigned fixed TA and fixed cell, the configuration information may include an identity (of the fixed cell or fixed cell) which may include an identity of the sNB 106 (e.g. in leftmost bits of the identity of the fixed TA or fixed cell). The configuration information may further include a geographic definition of the fixed TA or fixed cell (e.g. as provided by the operator to the O&M server 150).

The O&M server 150 may similarly configure fixed TAs and fixed cells for other entities in the SGCN 110 such as LMF 124, SLP 132, NEF 128, and/or CBCF 135. The O&M server 150 may then provide configuration information for the fixed TAs and fixed cells (e.g. fixed TAs and fixed cells which are supported) to LMF 124, SLP 132, NEF 128, and/or CBCF 135. The configuration information may be the same as or similar to that described above for an sNB 106, e.g. may include an identity and geographic definition for each configured fixed TA and fixed cell.

Other entities in the SGCN 110 that may be configured with fixed TAs and fixed cells in the SGCN 110 include the GMLC 126 and LRF 125. Configuration information for a fixed TA or fixed cell in this case may include an identity of the fixed TA or fixed cell and information related to the routing of an emergency call from a UE located in the fixed TA or fixed cell. For example, the routing information may indicate the identity of a PSAP or the identity of some entity connected to a PSAP to which a request to set up an emergency call (e.g. a SIP INVITE message) from a UE 105 located in the fixed TA or fixed cell should be routed.

The configuration of fixed TAs and fixed cells, as described above, may not require a standard definition of a fixed TA or fixed cell. For example, while the operator of the O&M server 150 may define a fixed TA or fixed cell using a polygon or a regular array of grid points, the exact information used for this (e.g. including a definition of coordinates for grids points or vertices of a polygon and their formatting and encoding) can be defined by the operator or as part of the implementation of the O&M server. Other definitions of a fixed TA or fixed cell could also be used such as a definition based on a map, a civic location, a TN radio cell or TN TA. In addition, there may be no requirement to transfer configuration information for a fixed TA or fixed cell between different network elements of the SGCN 110. The transfer of configuration information may be only from the O&M server 150 to a network element of the NG-RAN 112 or SGCN 110, which may use protocols propriety to the NG-RAN 112 or SGCN 110. This may simplify implementation and deployment of fixed TAs and fixed cells and may avoid the need to standardize fixed TAs and fixed cells.

Figure 2:
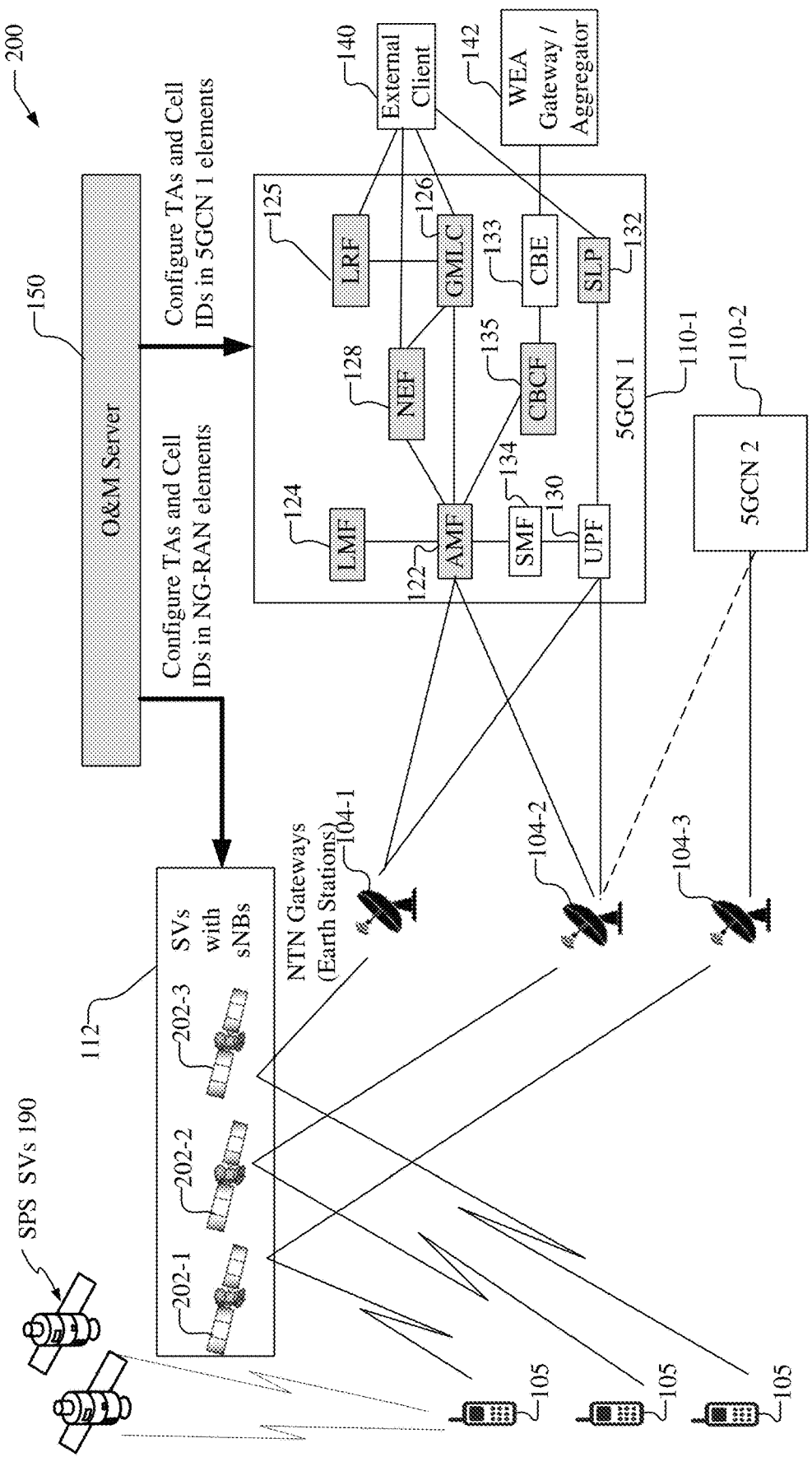
FIG. 2 shows a diagram of a communication system with a network architecture having regenerative SVs that is capable of supporting satellite access to a wireless network.

FIG. 2 shows a diagram of a network architecture 200 capable of supporting satellite access using 5G New Radio (NR) and using fixed cells and fixed TAs, which are defined independently of the network, as discussed herein. The network architecture shown in FIG. 2 is similar to that shown in FIG. 1, like designated elements being similar or the same. FIG. 2, however, illustrates a network architecture with regenerative SVs 202-1, 202-2, and 202-3 (collectively SVs 202), as opposed to transparent SVs 102 shown in FIG. 1. A regenerative SV 202, unlike a transparent SV 102, includes an on-board sNB 202 (e.g. includes the functional capability of an sNB), and is sometimes referred to herein as an SV/sNB 202. The NG-RAN 112 is illustrated as including the SV/sNBs 202. Reference to an sNB 202 is used herein when referring to SV/sNB 202 functions related to communication with UEs 105 and 5GCNs 110, whereas reference to an SV 202 is used when referring to SV/sNB 202 functions related to communication with earth stations 104 and with UEs 105 at a physical radio frequency level. However, there may be no precise delimitation of an SV 202 versus an sNB 202.

An onboard sNB 202 may perform many of the same functions as an sNB 106 as described previously. For example, an sNB 202 may terminate the radio interface and associated radio interface protocols to UEs 105 and may transmit DL signals to UEs 105 and receive UL signals from UEs 105, which may include encoding and modulation of transmitted signals and demodulation and decoding of received signals. An sNB 202 may also support signaling connections and voice and data bearers to UEs 105 and may support handover of UEs 105 between different radio cells for the same sNB 202 and between different sNBs 202. The sNBs 202 may assist in the handover (or transfer) of SVs 202 between different Earth stations 104, different 5GCNs 110, and between different countries. The sNBs 202 may hide or obscure specific aspects of SVs 202 from the SGCN 110, e.g. by interfacing to a SGCN 110 in the same way or in a similar way to a gNB. The sNBs 202 may further assist in sharing of SVs 202 over multiple countries. The sNBs 202 may communicate with one or more earth stations 104 and with one or more 5GCNs 110 via the earth stations 104. In some implementations, sNBs 202 may communicate directly with other sNBs 202 using Inter-Satellite Links (ISLs) (not shown in FIG. 2), which may support an Xn interface between any pair of sNBs 202.

With LEO SVs, an SV/sNB 202 needs to manage moving radio cells with coverage in different countries at different times. Earth stations 104 may be connected directly to the SGCN 110, as illustrated. For example, as illustrated, earth station 104-1 may be connected to AMF 122 and UPF 130 of 5GCN1 110-1, while earth station 104-2 may be similarly connected to 5GCN1 110-1 and 5GNC2 110-2, and earth station 104-3 is connected to 5GCN2 110-2. The earth stations 104 may be shared by multiple 5GCNs 110, for example, if Earth stations 104 are limited. For example, in some implementations (illustrated with dotted lines), earth station 104-2 may be connected to both 5GCN1 110-1 and 5GCN2 110-2. The SGCN 110 may need to be aware of SV 202 coverage areas in order to page UEs 105 and to manage handover. Thus, as can be seen, the network architecture with regenerative SVs may have more impact and complexity with respect to both sNBs 202 and 5GCNs 110 than the network architecture with transparent SVs 102 shown in FIG. 1.

Support of regenerative SVs with the network architecture shown in FIG. 2 may impact the network architecture 200 as follows. The SGCN 110 may be impacted if fixed TAs and fixed cells are not supported, since core components of mobility management and regulatory services, which are typically based on fixed cells and fixed TAs for terrestrial PLMNs, would have to be replaced by a new system (e.g. based on UE 105 location). If fixed TAs and fixed cells are supported, an entity in the SGCN 110 (e.g. the AMF 122) may need to map any fixed TA to one or SVs 202 with current radio coverage of the fixed TA when performing paging of a UE 105 that is located in this fixed TA. This could require configuration in the SGCN 110 of long term orbital data for SVs 202 (e.g. obtained from an SVO for SVs 202) and could add significant new impact to a SGCN 110.

Legacy SVs could need a substantial software (SW) update to support sNB 202 functions, which may not be feasible. An SV 202 would also need to fully support all UEs 105 accessing the SV 202, which could be problematic with a legacy SV due to limited processing and storage capability. Hence, an SV 202 would probably need to comprise new hardware (HW) and SW rather than being based on a SW upgrade to an existing SV. A new SV/sNB 202 may need to support regulatory and other requirements for multiple countries. A GEO SV 202 coverage area would typically include several or many countries, whereas a LEO or medium earth orbit (MEO) SV 202 would typically orbit over many countries. Support of fixed TAs and fixed cells may then require that a SV/sNB 202 be configured with fixed TAs and fixed cells for an entire worldwide coverage area. Alternatively, AMFs 122 (or LMFs 124) in individual 5GCNs 110 could support fixed TAs and fixed cells for the associated PLMN to reduce SV/sNB 202 complexity and at the expense of more SGCN 110 complexity. Additionally, SV/sNB 202 to SV/sNB 202 ISLs would typically change dynamically as relative SV/sNB 202 positions change, making Xn related procedures more complex.

As illustrated, the O&M server 150 assigned to any sNB 202 in the NG-RAN 112 to the sNB 202. In FIG. 2, the O&M server 150 may communicate directly with the SVs 202 via an NTN Gateway 104 (and may not communicate through the AMF 122). The configuration information for the sNB 202 may be sent via an earth station 104 and may not be seen by entities in the SGCN 110. The configuration information for the sNB 202 may be sent via an earth station in a different location and country not shown in FIG. 2, e.g., if it is sent at an earlier time. In some implementations, the configuration information for the sNB 202 may be sent through an entity in the SGCN 110, e.g., the AMF 122. The O&M server 150 may send configuration information for fixed TAs and fixed cells to entities in a SGCN 110 as described for FIG. 1.

Figure 3:
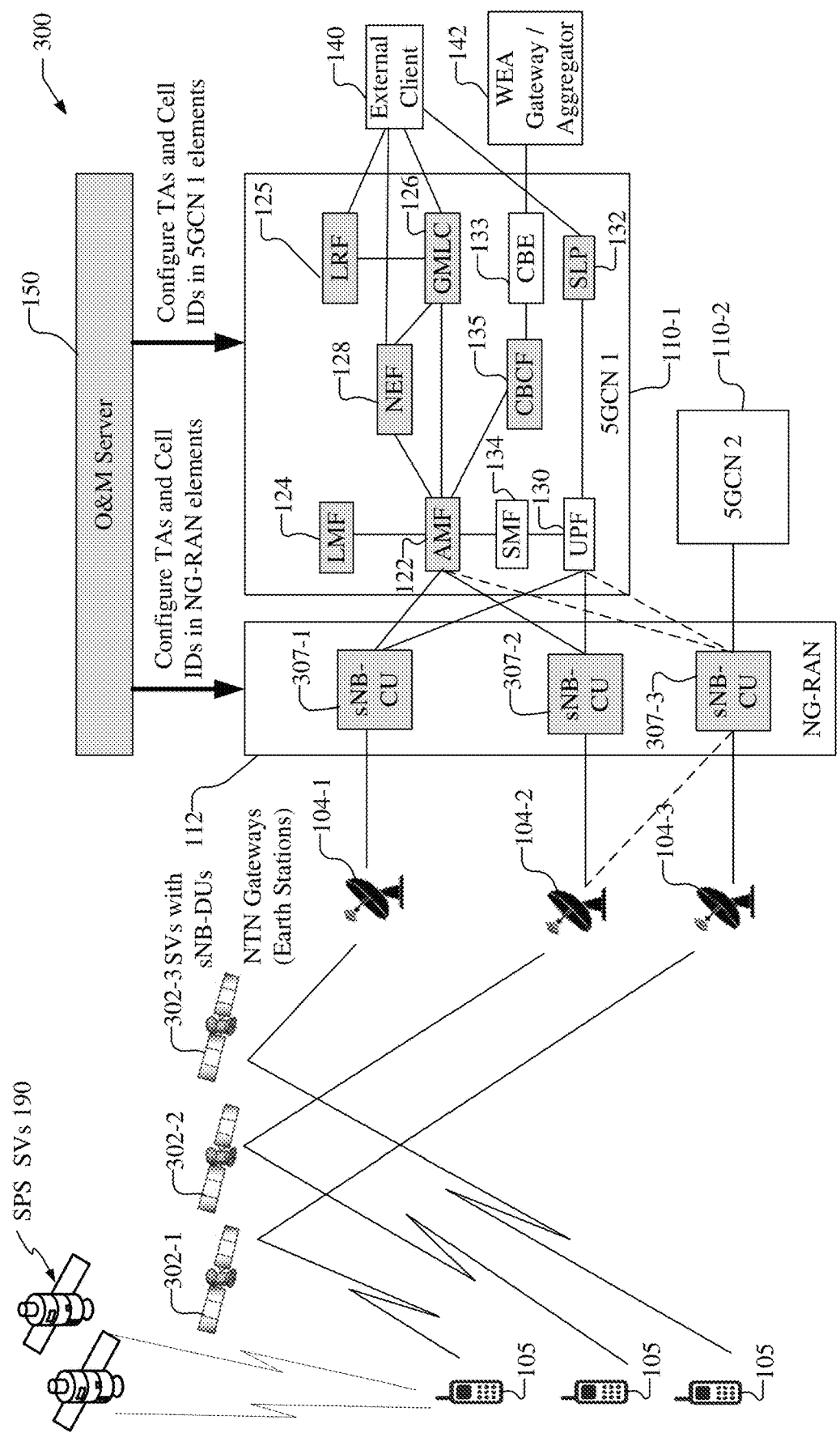
FIG. 3 shows a diagram of a communication system with a network architecture having regenerative SVs and a split satellite Node B (sNB) architecture that is capable of supporting satellite access to a wireless network.

FIG. 3 shows a diagram of a network architecture 300 capable of supporting satellite access using 5G New Radio (NR) and using fixed cells and fixed TAs, which are defined independently of the network, as discussed herein. The network architecture shown in FIG. 3 is similar to that shown in FIGS. 1 and 2, like designated elements being similar or the same. FIG. 3, however, illustrates a network architecture with regenerative SVs 302-1, 302-2, and 302-3 (collectively referred to as SVs 302), as opposed to transparent SVs 102 shown in FIG. 1, and with a split architecture for the sNBs. The sNBs 307 include a central unit and may sometimes be referred as sNB-CU 307, and a regenerative SV 302, unlike a transparent SV 102, includes an on-board sNB Distributed Unit (sNB-DU) 302, and is sometimes referred to herein as an SV/sNB-DU 302. Reference to an sNB-DU 302 is used herein when referring to SV/sNB 302 functions related to communication with UEs 105 and sNB-CUs 307, whereas reference to an SV 302 is used when referring to SV/sNB-DU 302 functions related to communication with earth stations 104 and with UEs 105 at a physical radio frequency level. However, there may be no precise delimitation of an SV 302 versus an sNB-DU 302.

Each sNB-DU 302 communicates with one ground based sNB-CU 307 via one or more earth stations 104. One sNB-CU 307 together with the one or more sNB-DUs 302 which are in communication with the sNB-CU 307 performs functions, and may use internal communication protocols, which are similar to or the same as a gNB with a split architecture as described in 3GPP TS 38.401. Here an sNB-DU 302 corresponds to and performs functions similar to or the same as a gNB Distributed Unit (gNB-DU) defined in TS 38.401, while an sNB-CU 307 corresponds to and performs functions similar to or the same as a gNB Central Unit (gNB-CU) defined in TS 38.401. For example, an sNB-DU 302 and an sNB-CU 307 may communicate with one another using an F1 Application Protocol (F1AP) as defined in 3GPP TS 38.473 and together may perform some or all of the same functions as an sNB 106 or sNB 202 as described previously. To simplify references to different types of sNB is the description below, an sNB-DU 302 may sometimes be referred to an sNB 302 (without the "DU" label), and an sNB-CU 307 may sometimes be referred to an sNB 307 (without the "CU" label).

An sNB-DU 302 may terminate the radio interface and associated lower level radio interface protocols to UEs 105 and may transmit DL signals to UEs 105 and receive UL signals from UEs 105, which may include encoding and modulation of transmitted signals and demodulation and decoding of received signals. An sNB-DU 302 may support and terminate Radio Link Control (RLC), Medium Access Control (MAC) and Physical (PHY) protocol layers for the NR Radio Frequency (RF) interface to UEs 105, as defined in 3GPP TSs 38.201, 38.202, 38.211, 38.212, 38.213, 38.214, 38.215, 38.321 and 38.322. The operation of an sNB-DU 302 is partly controlled by the associated sNB-CU 307. One sNB-DU 307 may support one or more NR radio cells for UEs 105. An sNB-CU 307 may support and terminate a Radio Resource Control (RRC) protocol, Packet Data Convergence Protocol (PDCP) and Service Data Protocol (SDAP) for the NR RF interface to UEs 105, as defined in 3GPP TSs 38.331, 38.323, and 37.324, respectively. An sNB-CU 307 may also be split into separate control plane (sNB-CU-CP) and user plane (sNB-CU-UP) portions, where an sNB-CU-CP communicates with one or more AMFs 122 in one more 5GCNs 110 using the NGAP protocol and where an sNB-CU-UP communicates with one or more UPFs 130 in one more 5GCNs 110 using a General Packet Radio System (GPRS) tunneling protocol (GTP) user plane protocol (GTP-U) as defined in 3GPP TS 29.281. An sNB-DU 302 and sNB-CU 307 may communicate over an F1 interface to (a) support control plane signaling for a UE 105 using Internet Protocol (IP), Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

An sNB-CU 307 may communicate with one or more other sNB-CUs 307 and/or with one more other gNBs using terrestrial links to support an Xn interface between any pair of sNB-CUs 302 and/or between any sNB-CU 307 and any gNB.

An sNB-DU 302 together with an sNB-CU 307 may: (i) support signaling connections and voice and data bearers to UEs 105; (ii) support handover of UEs 105 between different radio cells for the same sNB-DU 302 and between different sNB-DUs 302; and (iii) assist in the handover (or transfer) of SVs 302 between different Earth stations 104, different 5GCNs 110, and between different countries. An sNB-CU 307 may hide or obscure specific aspects of SVs 302 from a SGCN 110, e.g. by interfacing to a SGCN 110 in the same way or in a similar way to a gNB. The sNB-CUs 307 may further assist in sharing of SVs 302 over multiple countries.

In network architecture 300, the sNB-DUs 302 that communicate with and are accessible from any sNB-CU 307 will change over time with LEO SVs 302. With the split sNB architecture, a SGCN 110 may connect to fixed sNB-CUs 307 which do not change over time and which may reduce difficulty with paging of a UE 105. For example, a SGCN 110 may not need to know which SV/sNB-DUs 302 are needed for paging a UE 105. The network architecture with regenerative SVs 302 with a split sNB architecture may thereby reduce SGCN 110 impact at the expense of additional impact to an sNB-CU 307.

The O&M server 150 may send configuration information for fixed TAs and fixed cells to entities in a SGCN 110 and NG-RAN 112 as described for FIG. 1.

Support of regenerative SVs 302 with a split sNB architecture as shown in FIG. 3 may impact the network architecture 300 as follows. The impact to SGCN 110 may be limited as for transparent SVs 102 discussed above. For example, the SGCN 110 may treat a satellite RAT in network architecture 300 as a new type of terrestrial RAT with longer delay, reduced bandwidth and higher error rate. Consequently, while there may be some impact to PDU session establishment and Mobility Management (MM) and Connection Management (CM) procedures, impacts to an AMF 122 (or LMF 124) may be small—e.g. such as providing pre-configured data for fixed TA and fixed cells to a UE 105 during Registration. The impact on SV/sNB-DUs 302 may be less than the impact on SV/sNBs 202 (with non-split architecture), as discussed above in reference to FIG. 2. The SV/sNB-DU 302 may need to manage changing association with different (fixed) sNB-CUs 307. Further, an SV/sNB-DU 302 may need to manage radio beams and radio cells. The sNB-CU 307 impacts may be similar to sNB 106 impacts for a network architecture with transparent SVs 102, as discussed above, except for extra impacts to manage changing associations with different sNB-DUs 302 and reduced impacts to support radio cells and radio beams which may be transferred to sNB-DUs 302.

There are several SVOs currently operating and several additional SVOs that are preparing to begin operations that may be capable of supporting satellite access using 5G NR or some other wireless access type such as CDMA. Various SVOs may employ different numbers of LEO SVs and Earth gateways and may use different technologies. For example, currently operating SVOs include SVOs using transparent ("bent pipe") LEO SVs with CDMA, and regenerative LEO SVs capable of ISL. New SVOs have been recently announced with plans for large constellations of LEO SVs to support fixed Internet access. These various SVOs are widely known to the industry.

While supporting satellite access to a wireless network, an SV 102/202/302 may transmit radio beams (also referred to just as "beams") over multiple countries. For example, a beam transmitted by an SV 102/202/302 may overlap two or more countries. Sharing a beam over two or more countries, however, may raise complications. For example, if a beam is shared by two or more countries, earth stations 104 and sNBs 106/202/302/307 in one country may need to support UE 105 access from other countries. Sharing a beam over multiple countries may raise security issues for privacy of both data and voice. Further, sharing an SV beam over multiple countries may raise regulatory conflicts. For example, regulatory services including WEA, LI, and EM calls in a first country may need support from sNBs 106/202/307 and earth stations 104 in a second country that shares the same SV beam.

A first solution to complications raised by beam sharing amongst multiple countries may be to assign one beam to one country. The assignment of a beam to a single country additionally implies assigning each radio cell to one country. This solution may not preclude or prevent beam and radio cell coverage of additional countries, but can restrict UE access to a beam and associated radio cell to just UEs 105 in the country to which the beam and associated radio cell are assigned. A second solution for beam sharing over multiple countries could be to allow a SGCN 110 in one country to support UEs 105 located in other countries where regulatory approval for this was obtained from the other countries. A third solution could be to share an sNB 106/202/307 among 5GCNs 110 located in different countries (e.g. as could be the case for sNB 106-3, sNB 202-2 and sNB 307-3 shown in FIGS. 1-3), and to verify that each UE 105 accessing the sNB 106/202/307 is registered in and connected to a SGCN 110 that is in the same country as the UE 105 or permitted to serve the country in which the UE 105 is located.

Figure 4:
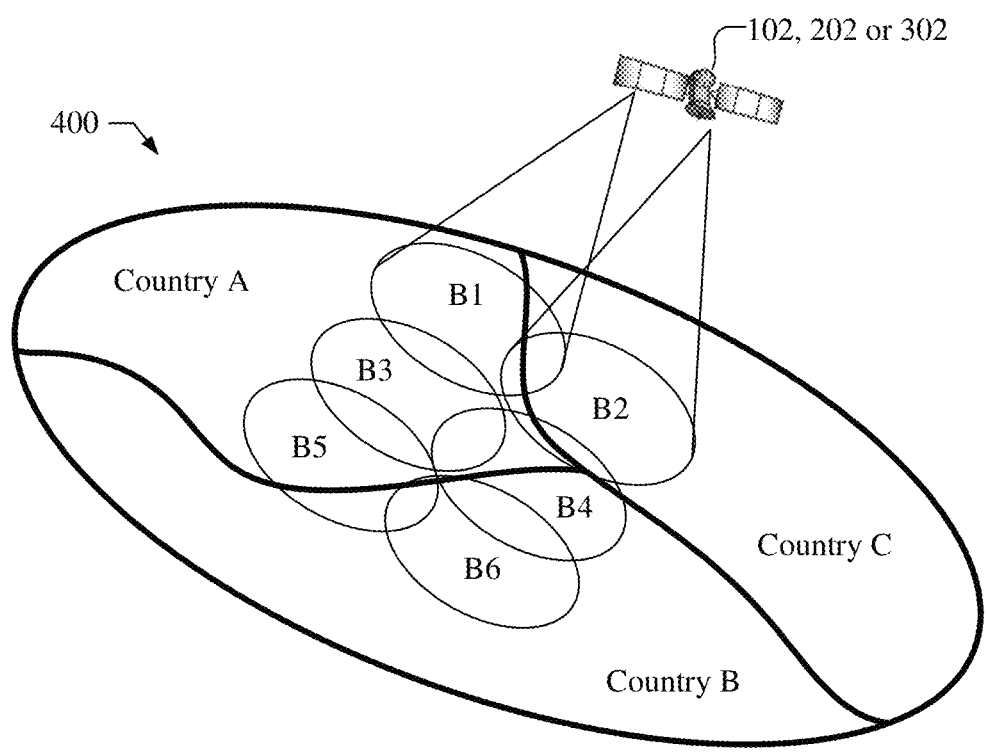
FIG. 4 illustrates a SV generating multiple beams over an area that includes multiple countries.

FIG. 4, by way of example, illustrates an SV 102, 202, 302 generating multiple beams identified as beams B1, B2, B3, B4, B5, and B6 over an area 400 that includes portions of multiple countries, e.g., country A, country B, and country C. With the assignment of each beam to just one country as for the first solution above, beams B 1, B3, B5 are assigned to country A, beams B4 and B6 are assigned to country B, and beam B2 is assigned to country C.

In one implementation, an individual beam may be assigned to a single country by controlling or steering the beam. While a Non-Geostationary Earth Orbiting (NGEO) SV has a moving coverage area, a relative beam direction may be moved via a controllable antenna array to stay. or mostly stay, within one country, which is sometimes referred to as a "steerable beam". For example, beam coverage may move slowly within one country and then hop to a new country, e.g., after an SV 102, 202, 302 has transferred to a new earth station 104 or new sNB 106 or 307.

Figure 5:
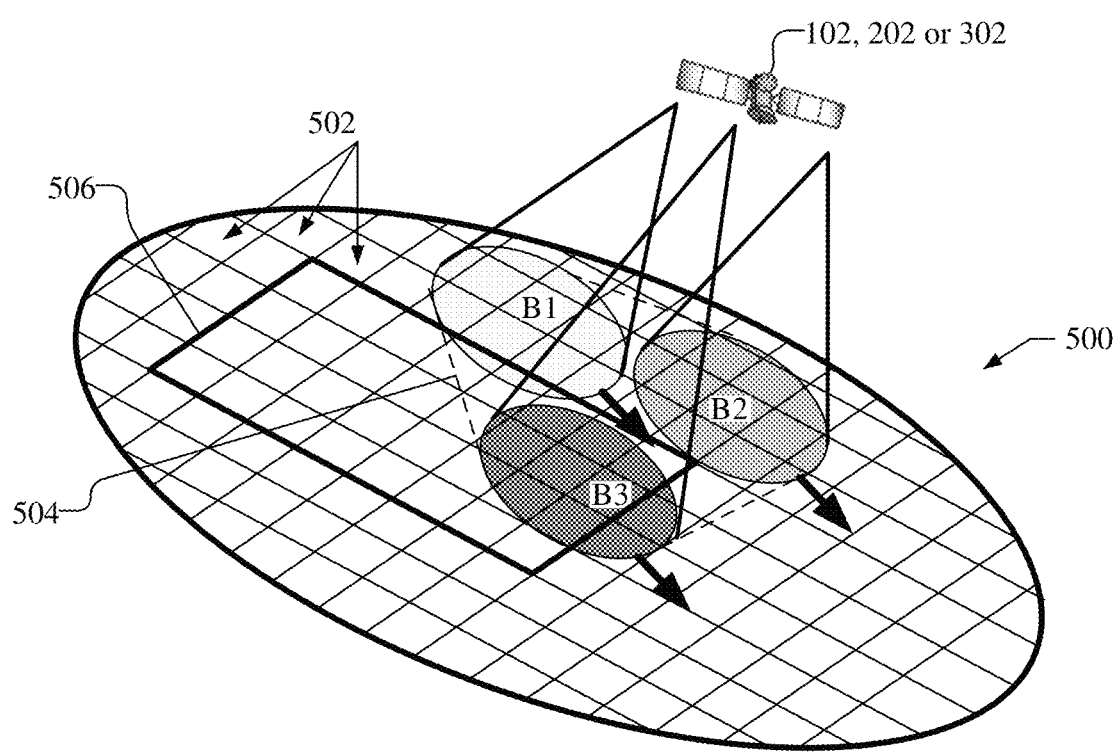
FIG. 5 illustrates radio cells produced by an SV over an area that includes a number of fixed cells.

FIG. 5 illustrates radio cells produced by an SV 102, 202, 302 over an area 500 that includes a number of Earth fixed cells 502. A radio cell may comprise a single beam or multiple beams, e.g., all beams in a radio cell may use the same frequency or a radio cell may comprise one beam for each frequency in a set of different frequencies. For example, beams B1, B2 and B3 may support three separate radio cells (one beam per radio cell) or may collectively support a single radio cell (e.g., radio cell 504 shown with dotted lines). Preferably, a radio cell covers a contiguous area.

Radio beams and radio cells produced by an SV 102, 202, 302 may not align with cells used by terrestrial wireless networks, e.g., SGCN 110 terrestrial cells or LTE terrestrial cells. For example, in an urban area, a radio beam or radio cell produced by an SV 102, 202. 302 may overlap with many SGCN terrestrial cells. When supporting satellite access to a wireless network, radio beams and radio cells produced by an SV 102, 202, 302 may be hidden from a SGCN 110.

As illustrated in FIG. 5, an area 500 may include a number of Earth fixed cells 502, as well as fixed tracking areas (TAs) such as TA 506. Fixed cells are not "real cells," e.g., used for terrestrial NR and LTE access, and may be referred to as "virtual cells" or "geographic cells." A fixed cell, such as fixed cells 502, has a fixed geographic coverage area, which may be defined by a PLMN operator. For example, the coverage area of a fixed cell or a fixed TA may comprise the interior of a circle, ellipse or a polygon. The coverage area is fixed relative to the surface of the Earth and does not change with time, unlike the coverage area of a radio cell which typically changes with time for a LEO or MEO SV. A fixed cell 502 may be treated by a SGCN 110 the same as a real cell that supports terrestrial NR access. Groups of fixed cells 502 may define a fixed TA 506, which may be treated by a SGCN the same as TAs that are defined for terrestrial NR access. Fixed cells and fixed TAs used for 5G satellite wireless access may be used by a SGCN 110 to support mobility management and regulatory services for UEs 105 with minimal new impact.

With regenerative SVs 202 with a non-split architecture as in network architectures 200, each radio cell may remain with the same SV 202 and may have a moving coverage area supporting different SGCNs 110 at different times.

With transparent SVs 102 and regenerative SVs 302 for a split architecture as in network architecture 300, each radio cell may be assigned to and controlled by one sNB 106 or 307 on behalf of one or more PLMNs in one country. For a GEO SV 102/302, the assignment to an sNB 106/307 may be permanent or temporary. For example, the assignment may change on a daily basis to allow for peak traffic occurrence at different times in different parts of the SV 102/302 radio footprint and/or may change over a longer period to accommodate changing regional traffic demands. For a non-geostationary (NGEO) SV 102/302, the assignment might last for a short time, e.g., only 5-15 minutes. A non-permanent radio cell may then be transferred to a new sNB 106/307 as necessary (e.g. when access to the NGEO SV 102/302 is transferred to the new sNB 106/307). Each sNB 106/307, for example, may have a fixed geographic coverage area, e.g., comprising a plurality of fixed cells 502 and fixed TAs. A radio cell for a first NGEO SV 102/302 may be transferred from a first sNB 106/307 to a second sNB 106/307 when (or after) moving into the fixed coverage area of the second sNB 106/307. Prior to this transfer, UEs 105 accessing the radio cell in a connected state may be moved to a new radio cell for the first sNB 106/307 or could be handed off to the second sNB 106/307 as part of transferring the radio cell. An SV 102/302 may be accessed from only one sNB 106/307 or from multiple sNBs 106/307, possibly in different countries. In one implementation, an SV 102/302 may be assigned to multiple sNBs 106/307 by partitioning radio cells produced by the SV 102/302 among the different sNBs 106/307. Radio cells may then be transferred to new sNBs 106/307 (and to new countries) as the SV 102/302 moves or as traffic demands change. Such an implementation would be a form of a soft handoff in which SV 102/302 transfer from one sNB 106/307 to another sNB 106/307 occurs in increments of radio cells and not all at once.

Figure 6:
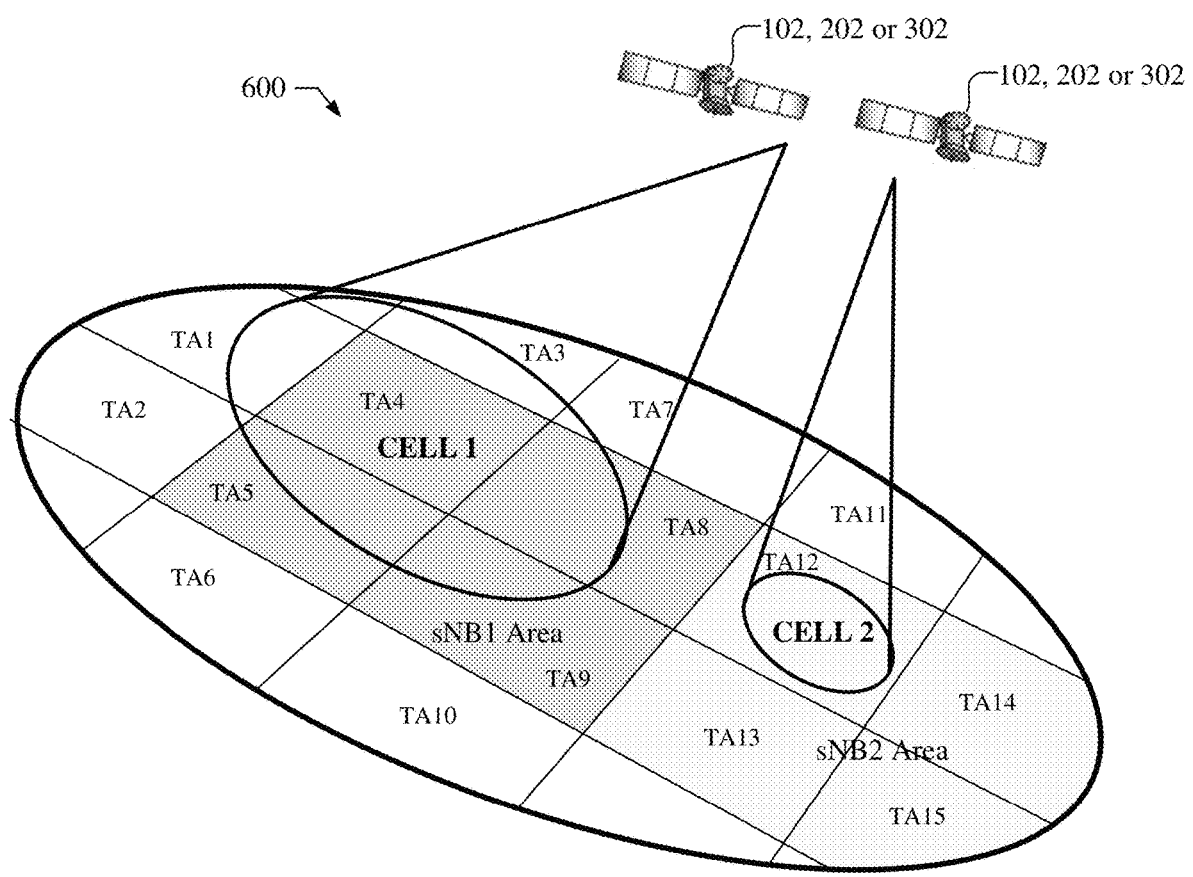
FIG. 6 illustrates an assignment of radio cells produced by an SV to fixed tracking areas (TAs).

FIG. 6 shows an example of assignment of radio cells, e.g., cell 1 and cell 2, produced by one or more SVs 102, 202, 302 over an area 600. As illustrated, the area 600 includes a number of fixed TAs, e.g., TA1-TA15, wherein TA4, TA5, TA8, and TA9 are assigned to an sNB1 (which may be an sNB 106, sNB 202 or an sNB 307), and TA12, TA13, TA14, and TA15 are assigned to an sNB2 (which may be another sNB 106, 202 or 307). In one implementation, a radio cell may be considered to support a fixed TA if the radio cell is wholly within the TA (e.g., Cell 2 within TA 12); if the TA is wholly within the radio cell (e.g., TA4 within Cell 1); or if the overlap of the area of a radio cell and a TA exceeds a predetermined threshold fraction of the total area of the radio cell or the total area of the TA (e.g., cell 1 overlap with TA1, TA3, TA5, TA8 or TA9). An SV 102, 202, 302 may broadcast, e.g., in a System Information Block type 1 (SIB1) or SIB type 2 (SIB2), the identities (IDs) of supported PLMNs (e.g., where a PLMN ID comprises a Mobile Country Code (MCC) and Mobile Network Code (MNC)) and, for each supported PLMN, the IDs of supported TAs (e.g. where the ID of TA comprises a Tracking Area Code (TAC)). For an NGEO SV, the supported PLMNs and TAs may change as radio cell coverage areas change. An sNB 106/202/307 may determine PLMN and TA support (and thus the PLMN IDs and TACs which are broadcast in a SIB for each radio cell) from known ephemeris data for each SV 102/202/302 and a known directionality and angular range for component radio beams for each radio cell (e.g. Cell 1 and Cell 2). An sNB 106/202/307 may then update SIB broadcasting.

Thus, as illustrated in FIG. 6, an SV 102/202/302 may broadcast for cell 1 a SIB that includes TACs for TA4 and possibly TA1, TA3, TA5, TA8 and/or TA9. Similarly, the SV 102/202/302 or another SV 102/202/302 may broadcast for Cell 2 a SIB that includes a TAC for TA12 only. The Cell 1 may be assigned to sNB1 (which has coverage of TA4, TA5, TA8, and TA9) and Cell 2 may be assigned to sNB2 (which has coverage of TA12, TA13, TA14, and TA15. Cell 1 and Cell 2 may be transferred from sNB1 to sNB2 or from sNB2 to sNB1 if the cell coverage area moves from one sNB area to another.

The coverage area for a fixed TA may be defined in a manner that is simple, precise, flexible and requires minimal signaling for conveyance to a UE 105, an sNB 106/202/307, or an entity in a SGCN 110. A fixed TA area may be small enough to allow efficient paging by comprising an area supported by just a few radio cells (e.g. less than 20) and may also be large enough to avoid excessive UE registration (e.g. may extend at least several kilometers in any direction). The shape of a fixed TA area may be arbitrary, e.g., the shape may be defined by a PLMN operator, or may have one or more restrictions. For example, one restriction for the shape of the fixed TA area may be that a fixed TA along the border of a country precisely aligns with the border to avoid serving UEs 105 in another country. Additionally, a fixed TA may be restricted to align with an area of interest, e.g., a PSAP serving area, the area of a large campus, etc. Additionally, a fixed TA may be restricted so that parts of the fixed TA align with a physical obstacle, such as the bank of a river or lake.

The coverage area for fixed cells may likewise be defined in a manner that is simple, precise, flexible and requires minimal signaling for conveyance to a UE 105 or sNB 106/202/307. A fixed cell coverage area may allow for simple and precise association with a fixed TA, e.g., one fixed cell may belong unambiguously to one TA.

Fixed cells may be used by a wireless core network, such as a SGCN 110, for support of regulatory services such as emergency (EM) call routing based on a current fixed serving cell for a UE 105, use of a fixed cell to approximate a UE 105 location, use of a fixed cell association to direct a Wireless Emergency Alerting (WEA) alert over a small defined area to a recipient UE 105, or use of a fixed cell as an approximate location or a trigger event for Lawful Interception (LI) for a UE 105. Such usage of fixed cells implies that fixed cells should be capable of being defined with a size and shape similar to that of cells that are defined and used for terrestrial wireless access, including allowing for very small (e.g., pico) cells and large (e.g., rural) cells.

FIGS. 4-6 illustrate how a radio cell may have a coverage area which spans two or more countries. In such cases, an sNB 106, sNB 202 or sNB-CU 307 which controls such as radio cell may provide UE 105 access to a PLMN or PLMNs (e.g. with 5GCNs 110) in just one country or to PLMNs (e.g. with 5GCNs 110) in two or more countries. For either scenario, a particularly critical problem can be enabling a PLMN to determine or verify the country in which a UE 105 is located during 5G satellite access to ensure that the UE 105 is located in the same country as the PLMN that the UE 105 is accessing. For example, in consideration of regulatory services, such as lawful interception (LI), as well as considerations for emergency situations, e.g., emergency calls and wireless emergency alerting, a UE 105 may be required to always access a PLMN (e.g. an sNB 106, sNB 202, sNB-CU 307 and/or a SGCN 110) in the same country as the UE 105. It may not be appropriate to permit a UE 105 to determine or verify the country in which the UE 105 is located, as a user may manipulate this information in the UE 105 to avoid regulatory services, such as LI, and non-malicious errors may impede emergency services. Accordingly, it is desirable for the network (e.g. an sNB 106, sNB 202, sNB-CU 307 and/or a SGCN 110), rather than the UE 105, to determine or verify the country in which the UE 105 is located. Moreover, due to signaling and processing overhead, it may be preferred that an NG-RAN (e.g. a gNB, such as sNB 106, sNB 202 or sNB-CU 307) perform the location and country determination/verification rather than a SGCN 110.

The fixed TAs and fixed cells configured as described above may be used within the network architectures 100, 200, 300 as follows. Within an sNB 106/202/307, a radio cell may be mapped to one or more fixed TAs. For example, the mapping may be to one, some or all fixed TAs which at a particular point in time completely or partly overlap with the coverage area of the radio cell. The sNB 106/202/307 may then broadcast within the radio cell (e.g. in a SIB1), the identities of one or more PLMNs supported by the radio cell and, for each supported PLMN, may broadcast the identities of the fixed TA(s) for this PLMN to which the radio cell maps. A UE 105 that is able to receive the radio cell can then know which TA(s) is/are supported for any PLMN supported by the radio cell. When a UE 105 enters a CONNECTED state with a PLMN and sends a first NAS message (e.g. a NAS Registration Request or NAS Service Request) to the PLMN (e.g. to an AMF 122), the serving sNB 106/202/307 can obtain a location for the UE 105 and map the location to a particular fixed TA and fixed cell for the PLMN. The sNB 106/202/307 can then provide the identities of this fixed TA and fixed cell to the PLMN (e.g. to an AMF 122) along with the first NAS message. The PLMN (e.g. AMF 122) can then use the identities of the fixed TA and fixed cell for various location related purposes similarly to usage in a terrestrial network PLMN. For example, the PLMN may use the identities of this fixed TA and fixed cell to decide whether the UE 105 is allowed to access the PLMN, to determine charging, to assist location of the UE 105 (e.g. as information which can be sent to an external client 140 or to an LMF 124 to assist the LMF 124 to locate the UE 105) and to page the UE 105 at a later time, e.g., where the last fixed TA or last fixed cell used by the UE 105 is provided by the PLMN (e.g. the AMF 122) to an sNB 106/202/302/307 to indicate a location area in which to page the UE 105.

Fixed TAs and fixed cells configured by the O&M server 150 in the LMF 124 or SLP 132 may be used by the LMF 124 or SLP 132 to help locate the UE 105. For example, the configured geographic definition of a fixed TA or fixed cell may serve as initial approximate location for the UE 105 and may enable a more accurate location to be obtained based on measurements of downlink (DL) signals from SVs 102/202/302 or GNSS SVs 190 by the UE 105 or measurements of uplink (UL) signals from the UE 105 by sNBs 106/202/302/307 or SVs 102/202/302, where the approximate initial location information enables the LMF 124 or SLP 132 to provide assistance data for the measurements and/or determine which DL signals the UE 105 should measure or which sNBs 106/202/302/307 or SVs 102/202/302 should measure UL signals from the UE 105.

Fixed TAs and fixed cells configured by the O&M server 150 in the CBCF 135 may enable the CBCF 135 to determine fixed TAs and/or fixed cells in which any WEA message should be broadcast. The WEA message may have a target geographic area received by the CBCF 135 from the CBE 133, e.g., the CMSP gateway 133. The CBE 133 may have received this information from the WEA gateway or aggregator 142 which may be external to the PLMN and owned and operated by a government agency for the purpose of providing WEA messages (e.g. concerning an impending hurricane, tornado, wildfire, severe storm or other public danger) to users in an affected area. The CBCF 135 can determine the fixed cells and/or fixed TAs which are within or overlap with the target area (e.g. by using the geographic definitions configured in the CBCF 135) and can forward the WEA message together with the determined fixed cells and fixed TAs to an AMF 122 which can further forward the WEA message to each sNB 106/202/307 which supports one or more of the determined fixed cells and fixed TAs. Each sNB 106/202/307 can then broadcast the WEA message in each radio cell controlled by the sNB 106/202/307 whose coverage includes at least one fixed TA or one fixed cell. This process avoids the CBCF 135 and AMF 122 from knowing details of moving radio cells and aligns with a process used to support WEA in a terrestrial network, which may reduce implementation impacts for supporting WEA in the non-terrestrial network.

Fixed TAs and fixed cells configured by the O&M server 150 in the LRF 125 or GMLC 126 may be used to support routing of an emergency call as described above. In this case, configuration information provided by the O&M server 150 for a fixed cell or fixed TA may include an identity of the fixed TA or fixed cell and an identification of one or more PSAPs or intermediate entities to which an emergency call from a UE 105 located in the fixed cell or fixed TA should be routed.

To enable a UE 105 to know in which fixed cell and/or fixed TA it is located, an sNB 106/202/307 or AMF 122 may provide the fixed TA and/or fixed cell to the UE 105. For example, when a UE 105 is in an IDLE state and then accesses an sNB 106/202/307 supporting a PLMN and enters a CONNECTED state, the sNB 106/202/307 might obtain a location for the UE 105, map the location to a fixed TA and/or fixed cell and provide the identities of the fixed TA and/or fixed cell to an AMF 122 for the PLMN (e.g. along with an initial NAS message sent by the UE 105). The AMF 122 can then return the identities of the fixed TA and/or fixed cell to the UE 105, e.g., in a NAS response message. Alternatively, the sNB 106/202/307 may provide the identities of the fixed TA and/or fixed cell to the UE 105 directly, e.g., in an RRC message conveying a NAS response message from the AMF 122. Alternatively, the AMF 122 or the LMF 124 may locate the UE 105, map the location of the UE 105 to a fixed TA and/or fixed cell and return the identities of one or both of these to the UE 105.

The UE 105 may use the identity of a fixed TA (e.g. received as described above) to support mobility, e.g., where the UE 105 camps on a radio cell indicating support for the fixed TA and only performs a registration to a new TA if unable to find a radio cell supporting the fixed TA. The UE 105 may further use the identity of a fixed cell (e.g. received as described above) to establish an emergency call by including the identity of the fixed cell in a request to establish the emergency call (e.g. a SIP INVITE message) which is then used, as described above, by a GMLC 126 or LRF 125 to route the emergency call to an appropriate PSAP or intermediate entity.

In some implementations, if it is preferred for UEs 105 to remain aware of a current TA and current fixed cell while in an IDLE state (e.g. in order to know ahead of time whether the UE 105 is an area where access is or is not allowed), an AMF 122 may be configured with the identities of fixed TAs and fixed cells and their associated geographic definitions and may provide this information to a UE 105 when the UE 105 registers with the AMF 122 (e.g. may provide the information in a NAS Registration Accept message). With this implementation, an AMF 122 may not need to interpret the configuration information which may reduce AMF 122 implementation, but the configuration information may need to be standardized in order to allow a UE 105 to interpret the information.

Figure 7:
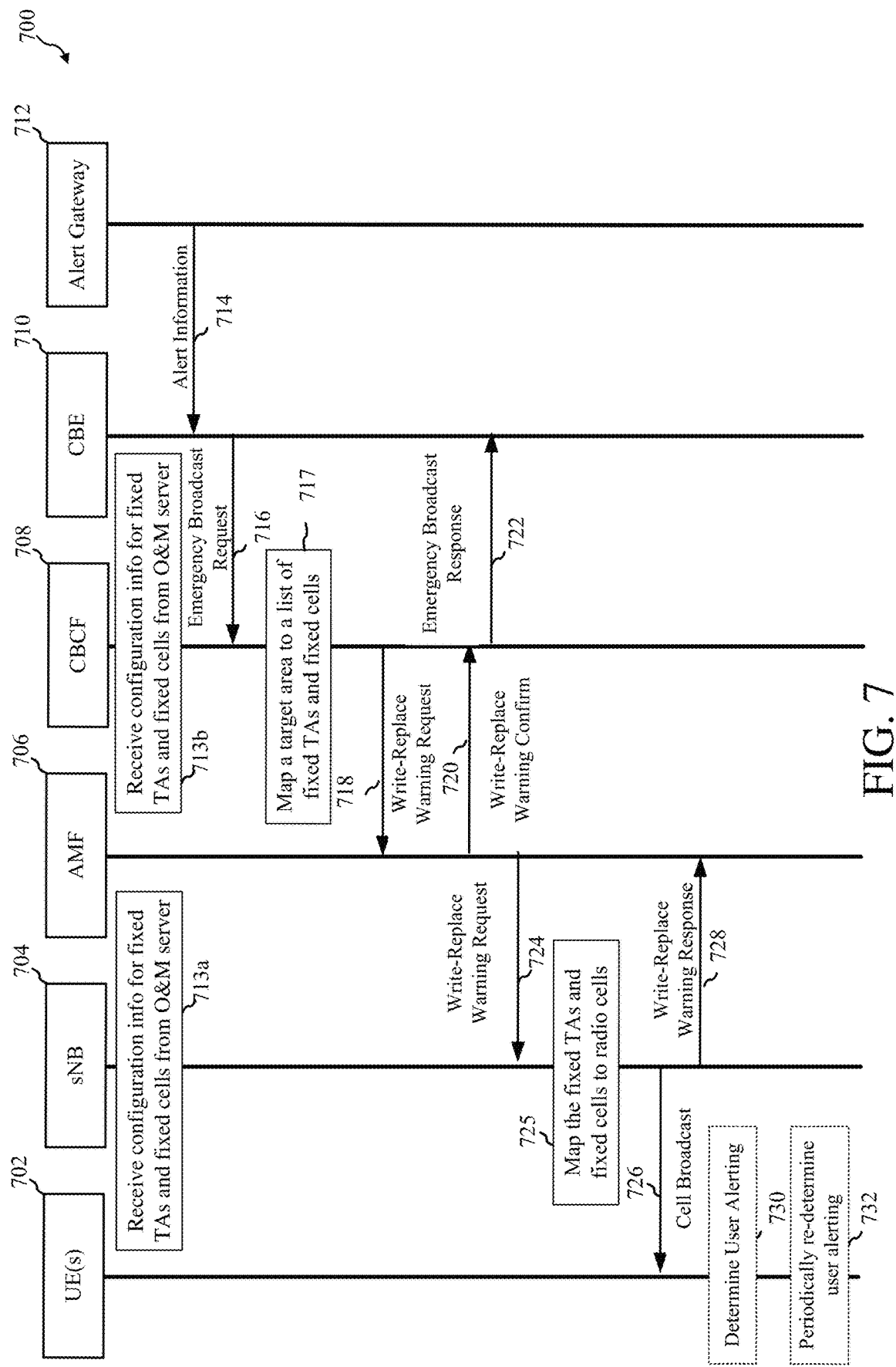
FIG. 7 shows a signaling flow that illustrates various messages sent between components of a communication system for providing a wireless emergency alert.

FIG. 7 shows an example message flow 700 for providing a wireless emergency alert. The message flow 700 may be performed by entities in the network architectures 100, 200, or 300, in which the UE 702 corresponds to UE 105, sNB 704 corresponds to sNB 106/202/307, AMF 706 corresponds to AMF 122, CBCF 708 corresponds to CBCF 135, CBE 710 corresponds to CBE 133, and alert gateway 712 corresponds to WEA Gateway /aggregator 142. The alert gateway 712 provides alert information to providers (i.e., CMSPs) that have elected to provide alert information to their subscribers. Providers may utilize various components (e.g., the CBE 710, the CBCF 708, the AMF 706, and/or the sNB 704) to transmit alert messages to the mobile devices (i.e., UEs 702) in a particular geographic area.

In stages 713*a* and 713*b* in FIG. 7, the sNB 704 and CBCF 708, respectively, receive configuration information for fixed TAs and fixed cells from the O&M server 150. The configuration information for each fixed TA and fixed cell, for example, may include an identity (of the fixed TA or fixed cell) which may include an identity of the sNB 704 and may further include a geographic definition of the fixed TA or fixed cell (e.g. as provided by the operator to the O&M server 150). The fixed TA or fixed cell, for example, may be defined as a polygon by providing coordinates (e.g. latitude, longitude and optionally altitude) for each vertex of the polygon. Alternatively, a fixed cell or fixed TA may be defined using a regular array of grid points in which each grid point defines a fixed TA or fixed TA as comprising all locations closer to that grid point than to any other grid point (e.g. which may result in rectangular or hexagonal fixed TAs or fixed cells).

At stage 714 in FIG. 7, alert information may be transmitted from the alert gateway 712 to CBE 710. For example, the alert information may include general information regarding an emergency event, the type of the alert, a warning or alert message itself, and an impact area associated with the emergency event. In an example, the impact area may be defined as a polygon, circle or ellipse which outlines an area on a map.

At stage 716, in response to receiving the alert information, the CBE 710 may transmit an emergency broadcast request signal (e.g. a message) containing the alert information received at stage 714 to the CBCF 708. The emergency broadcast request signal may include one or more fields to describe a warning type, a warning message, a duration and periodicity for broadcasting, and the impact area. It is noted that while a single impact area is referred to herein, an impact area may comprise two or more non-overlapping areas, in which case a definition for the impact area may comprise the definition of two or more separate geographic shapes (e.g. such as two or more polygons).

At stage 717, the CBCF 708 is configured to process the received emergency broadcast request information to generate a list of impacted fixed cells (and/or impacted fixed tracking areas and/or impacted emergency areas). Fixed TAs and fixed cells configured by the O&M server in the CBCF 708 at stage 713*b* enable the CBCF 708 to determine the impacted fixed TAs and/or fixed cells in which any alert information should be broadcast. The alert information may have a target geographic area. The CBCF 708 determines the fixed cells and/or fixed TAs which are within or overlap with the target area (e.g. by using the geographic definitions configured in the CBCF 708 at stage 713*b*). The impacted fixed cells (or impacted fixed tracking areas or emergency areas) may comprise fixed cells (and/or fixed tracking areas and/or emergency areas) whose coverage areas (e.g. normal coverage area and/or extended coverage area) are totally within the impact area or are at least partially within the impact area. Other factors, such as the warning type, may also be used to help determine the impacted fixed cells (and/or impacted fixed tracking areas and/or impacted emergency areas).

At stage 718, CBCF 708 may be configured to transmit a write-replace warning request message to AMF 706 containing the warning message and the delivery attributes (e.g., one or more of a message identifier, serial number, tracking area ID list, warning area, an Operation and Maintenance Center (OMC) identity (ID), a Concurrent Warning Message (CWM) indicator, a send write-replace-warning indication, and/or a global sNB ID) to the AMF 706. The tracking area ID list may comprise IDs for fixed tracking areas that each include one or more of the impacted fixed cells and/or fixed TAs determined at stage 717, and may be used by AMF 706 to determine sNBs such as sNB 704 to which the warning message should be transferred. The warning area (also referred to as a warning area list) may comprise a list of the impacted fixed cells and/or fixed TAs determined at stage 717. The delivery attributes may also include a duration and/or periodicity of broadcasting, a definition of the impact area.

After AMF 706 receives the write-replace warning request message at stage 718, the AMF 706 may transmit a write-replace warning confirm message back to the CBCF 708 at stage 720. At stage 722, in response to receiving the write-replace warning confirm message, CBCF 708 may transmit an emergency broadcast response message back to the CBE 710.

At stage 724, AMF 706 forwards the write-replace warning request message to sNB 704 after utilizing the tracking area ID list, e.g., the impacted fixed cells and/or fixed TAs, received from the CBCF 708 to determine sNB 704 and other sNBs to which the warning message should be sent. The write-replace warning message may include a description of the impact area (e.g., a polygon shape), a list of the impacted fixed cells and/or fixed TAs (e.g. the warning area received at stage 718).

At stage 725, in response to receiving the write-replace warning response message, sNB 704 may determine in which radio cell or radio cells supported by sNB 704 broadcast of the warning message is needed. Fixed TAs and/or fixed cells configured by the O&M server in the sNB 704 at stage 713a enable the sNB 704 to determine the radio cells that correspond to the impacted fixed TAs and/or fixed cells. sNB 704 may determine the radio cell or radio cells by mapping the list of impacted fixed TAs and/or fixed cells (e.g. contained in a warning area parameter) received from AMF 706 at stage 724 to radio cells based on the configuration information for the fixed TAs and/or fixed cells received from the O&M server at stage 713a.

At stage 726, sNB 704 may then broadcast the warning message in the determined radio cells using one or more SVs 102/202/302 (not shown in FIG. 7), e.g. at a periodicity and for a duration indicated by delivery attributes received at stage 724. In some embodiments, sNB 704 may segment the warning message into two or more message segments, e.g. if the warning message exceeds a maximum broadcast message size (e.g. a maximum SIB size). sNB 704 may then broadcast each message segment as a separate message, e.g. as a separate RRC message such as a SIB12.

During broadcast delivery in a particular radio cell, the sNB 704 may transmit an alert message including a definition or description of the impact area to indicate the impacted area.

At stage 728, the sNB 704 may transmit a write-replace warning response message (or signal) back to the AMF 706. In some configurations, stage 726 and stage 728 may be performed at (or nearly at) the same time. At stage 730, in response to the broadcast of the warning message from the sNB 704, UE 702 determines whether user alerting is needed, based on a definition of the impact area. At stage 732, in response to the broadcast of the warning message from the sNB 704, UE 702 may further periodically redetermine whether user alerting is needed, based on a definition of the impact area.

Figure 8A:
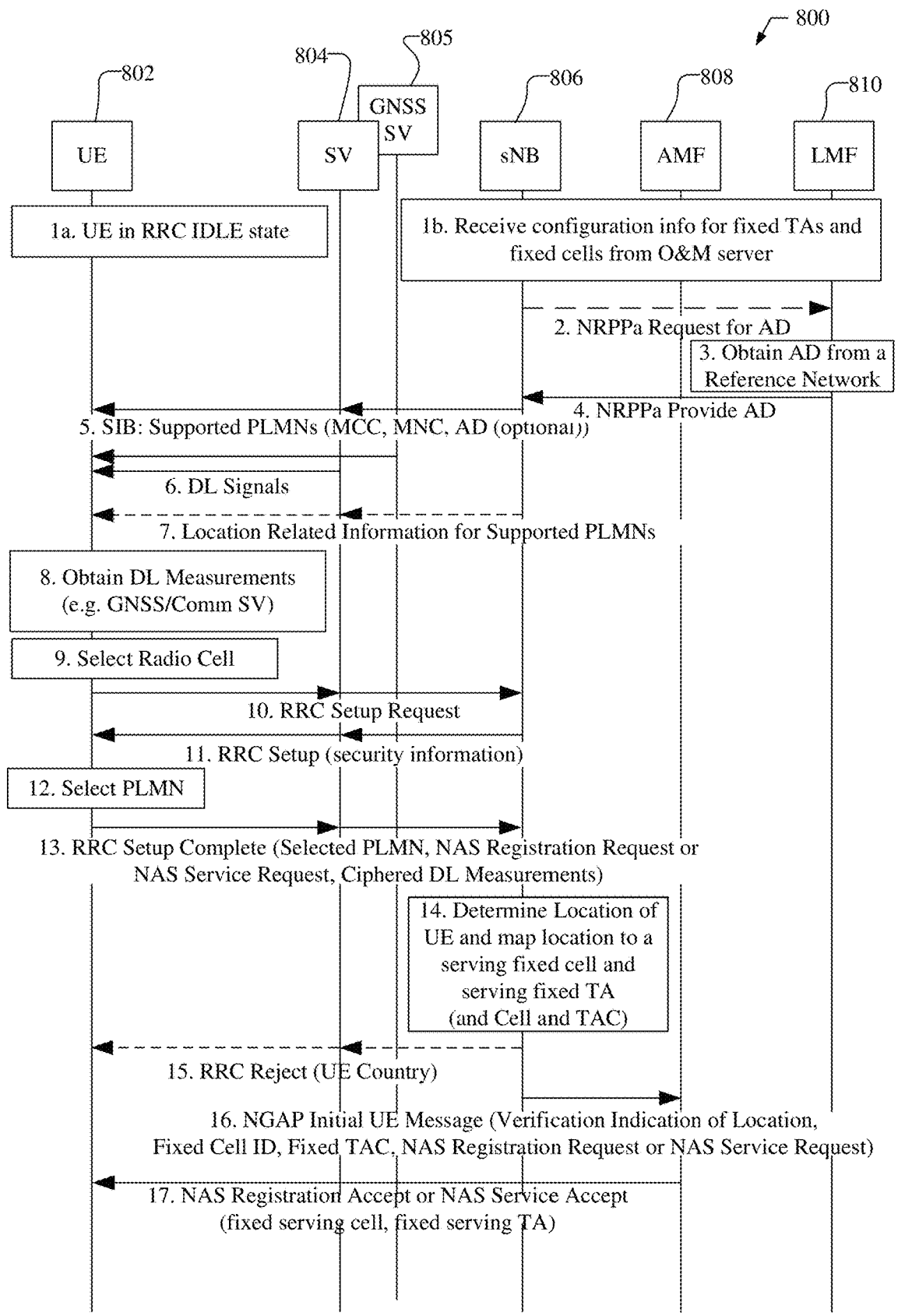
FIG. 8A shows a signaling flow that illustrates various messages sent between components of a communication system to determine whether the UE is located in a country associated with a public land mobile network (PLMN).

FIG. 8A shows a signaling flow 800 that illustrates various messages sent between components of a communication system in a procedure for initial PLMN access by a UE in which an sNB determines or verifies that the UE is in the country associated with the PLMN using configuration information for fixed TAs and fixed cells received from an O&M server. The message flow 800 may be performed by entities in the network architectures 100, 200, or 300, in which the UE 802 corresponds to UE 105, SV 804 corresponds to SV 102, 202 or 302, GNSS SV 805 corresponds to SV 190, sNB 806 corresponds to sNB 106/202/307, AMF 808 corresponds to AMF 122, and LMF 810 corresponds to LMF 124. FIG. 8A illustrates a plurality of positioning techniques that may be used to determine or verify the country in which the UE 802 is located. It should be understood that any one positioning technique or any combination of positioning techniques, may be used to determine or verify the country in which the UE 802 is located by the sNB 806. It should be understood that the sNB 806 or an element of the sNB 806 may be included within the SV 804. For example, with an SV 202, an sNB 202 would be completely included within the SV 202 as described for FIG. 2. Alternatively, with an SV 302, an sNB 307 (also referred to as an sNB-CU 307) would be terrestrial and physically separate from the SV 302, but the SV 302 would include an sNB-DU 302 as described for FIG. 3.

At stage 1a in FIG. 8A, the UE 802 is in a 5G Mobility Management (SGMM) DEREGISTERED state and RRC IDLE state.

At stage 1b, the sNB 806, the AMF 808, and LMF 810 may receive configuration information for fixed TAs and fixed cells from the O&M server 150 (shown in FIGS. 1, 2, and 3). The configuration information for each assigned fixed TA and fixed cell, for example, may include an identity (of the fixed TA or fixed cell) which may include an identity of the sNB 806 associated with the fixed cell or fixed TA and may further include a geographic definition of the fixed TA or fixed cell (e.g. as provided by the operator to the O&M server 150). The fixed TA or fixed cell, for example, may be defined as a polygon by providing coordinates (e.g. latitude, longitude and optionally altitude) for each vertex of the polygon. Alternatively, a fixed cell or fixed TA may be defined using a regular array of grid points in which each grid point defines a fixed TA or fixed TA as comprising all locations closer to that grid point than to any other grid point (e.g. which may result in rectangular or hexagonal fixed TAs or fixed cells).

At stage 2, the sNB 806 may optionally send a request to the LMF 810 for assistance data. The request may be sent using an NR Positioning Protocol A (NRPPa) message. The request may be sent by the sNB 806, e.g., when previous received assistance data is old and requires updating, or may be sent by the sNB 806, e.g., in response to receiving an RRC Setup Request or RRC Setup Complete message from a UE 802, e.g., as illustrated at stages 10 and 13, i.e., stages 2, 3, and 4 may occur at other times in the signaling flow, such as after stage 10.

At stage 3, the LMF 810 may obtain assistance data from a reference network (e.g. a reference network for SPS satellites 190). The LMF 810, for example, may solicit the assistance data or may receive the assistance data unsolicited from the reference network, e.g., periodically or as an update to previously received assistance data.

At stage 4, the LMF 810 sends the assistance data to the sNB 806 with which the sNB 806 may determine a position of a UE, such as UE 802. For example, the assistance data may be received in an NRPPa message. The content and coding for the assistance data may be based on an LTE Positioning Protocol (LPP) message (as defined in 3GPP TS 37.355) or an RRC posSIB (as defined in 3GPP TS 38.331). The assistance data may be received from the LMF 810 in response to the request sent in stage 2 or may be unsolicited. For example, the assistance data may be received from the LMF 810 periodically or, e.g., in response to the LMF 810 receiving an update of the assistance data from the reference network. The assistance data, for example, may be for a plurality of satellites, e.g., including at least one GNSS satellite 805 and/or including at least one communication satellite 804, which may be a serving communication satellite for the UE 802. The assistance data, for example, may include at least one of ephemeris data, timing information, ionosphere corrections, and troposphere corrections, real time integrity, differential corrections, or a combination thereof. Stages 2 to 4 are optional and may not occur in all implementations.

At stage 5, the sNB 806 broadcasts (via an SV 804) indications of supported PLMNs (e.g. an MCC-MNC for each PLMN) in each radio cell. The UE 802 may detect radio cells from one or more radio beams transmitted by one or more SVs, including the SV 804. The sNB 806 may control SV 804 to broadcast system information blocks (SIBs) in one or more radio cells of the sNB 806. The SIBs may indicate one or more PLMNs (referred to as supported PLMNs) supported by the sNB 806 in each radio cell for the sNB 806. The PLMNs may each be identified in a SIB by a mobile country code (MCC) and a mobile network code (MNC), where the MCC indicates a country for each identified PLMN (i.e. a country to which each identified PLMN belongs). The sNB 806 may optionally broadcast assistance data in each radio cell (e.g. may broadcast assistance data in a SIB or posSIB), such as the assistance data received by the sNB 806 at stage 4. The SIBs may include security information described below for stage 11 such as public key(s) and an indication of ciphering algorithm(s).

At stage 6, the UE 802 receives DL signals (e.g. DL PRS signals) from a plurality of satellites, which may include one or more of the communication SVs 804 and/or DL signals from GNSS SVs 805.

At stage 7, which is optional, the UE 802 may receive location related information for the supported PLMNs broadcast (e.g. in one or more SIBs) in the one or more radio cells from the sNB 806 via the SV 804. For example, the location related information for the supported PLMNs may comprise geographic definitions for fixed cells of each supported PLMN, geographic definitions for fixed tracking areas of each supported PLMN, or both.

At stage 8, the UE 802 may obtain DL measurements from the DL signals received from the plurality of satellites at stage 6. The DL measurements, for example, may be GNSS measurements from one or more GNSS SVs 805 and/or measurements of characteristics of the DL signals from one or more communication SVs 804, such as a Reference Signal Received Power (RSRP), Reference Signal Received Quality (RSRQ), Rx-Tx, RTT, AOA. The UE 802 may further measure a Differential AOA (DAOA) or a Reference Signal Time Difference (RSTD) for DL signals received from one or more pairs of SVs 804. In some embodiments, the UE 802 may further determine a location of the UE 802 (referred to herein as a UE 802 location) based on the DL measurements and possibly based in addition on any assistance data received at stage 5.

At stage 9, UE 802 selects a radio cell. In one implementation, the UE 802 may first select a PLMN (referred to as a selected PLMN), where the selected PLMN is a preferred PLMN in the supported PLMNs indicated at stage 5 in the one or more radio cells of the sNB 806. The UE 802 may then select the radio cell at stage 9 based on the radio cell indicating support for the preferred PLMN.

At stage 10, UE 802 may send an RRC Setup Request message to the sNB 806 that supports the selected radio cell via the SV 804 using the selected radio cell (e.g. after having performed a random access procedure to obtain initial access to the selected radio cell from the sNB 806).

At stage 11, the sNB 806 may return an RRC Setup message to the UE 802. The sNB 806 may include security information in the RRC Setup message (e.g. if not provided at stage 5) that includes a public ciphering key and an indication of a ciphering algorithm.

At stage 12, the UE 802 may select a supported PLMN (referred to below as the selected PLMN) if not previously selected at stage 9. The selected PLMN may be one of the supported PLMNs indicated at stage 5 for the radio cell selected at stage 9. The selected PLMN (as selected at stage 9 or stage 12) is also referred to as a serving PLMN below since the selected PLMN acts as a serving PLMN for UE 802 following stage 17.

At stage 13, UE 802 sends an RRC Setup Complete message to the sNB 806 and includes an indication (e.g. MCC and MNC) of the selected PLMN and a Non-Access Stratum (NAS) Registration Request or NAS Service Request message. The UE 802 may also include any DL location measurements or any UE 802 location obtained at stage 8 if stage 8 was performed. The DL location measurements or the UE 802 location may be included in a confidential (or concealed) form by ciphering the DL location measurements or the UE 802 location using a public ciphering key and ciphering algorithm indicated at stage 5 or 11. The determination and encoding of the confidential location measurements or the UE 802 location may reuse some of the functionality used to support a Subscription Concealed Identifier (SUCI) as described in 3GPP Technical Specification (TS) 23.003.

At stage 14, the sNB 806, or an embedded or attached Location Management Component (LMC), may determine a location and country for UE 802 using any DL location measurements or UE 802 location received at stage 13 and any assistance data received at stage 4 and maps the location to a fixed serving TA and fixed serving cell based on the configuration information for fixed TAs and fixed cells received from the O&M server at stage 1b. The sNB 806 (or LMC), for example, may decipher the DL location measurements or the UE 802 location sent at stage 13 based on the ciphering key and the ciphering algorithm indicated at stage 5 or stage 11. For example, the sNB 806 (or LMC) may use a private ciphering key that corresponds to a public ciphering key sent at stage 5 or stage 11, to decipher the ciphered DL location measurements or ciphered UE 802 location based on a public key-private key ciphering algorithm (e.g. the RCA algorithm) indicated at stage 5 or stage 11.

The sNB 806 may use any DL location measurements that the UE 802 sent at stage 13, which may include GNSS measurements and/or characteristics of received signals, e.g., RSRP, RSRQ, Rx-Tx, AOA, RTT, RSTD, or DAOA, measured by the UE 802 at stage 8 and the assistance data received at stage 4, to determine the location of the UE 802, e.g., using A-GNSS, ECID, RTT, TDOA, AOA, or other positioning techniques. The country in which the UE 802 is located may then be determined based on the determined location of the UE 802. The sNB 806 (or LMC) may determine the location and country of the UE 802 using other techniques. In some implementations, measured characteristics of the serving radio cell, e.g. RSRP, RSRQ, Rx-Tx, AOA or some combination thereof, measured by the UE 802 at stage 8, may be used to refine the location of the UE 802. In some implementations, the location determination and location mapping to a country may be performed by a Location Management Component (LMC) which may be part of, attached to, or reachable from sNB 806. In some implementations, sNB 806 and/or SV 804 may obtain uplink (UL) measurements of signals transmitted by UE 802, e.g. UL measurements of RSRP, RSRQ, Rx-Tx and/or AOA which may be used to determine or help determine the location of UE 802 at stage 14. In some implementations, sNB 806 may use knowledge of a coverage area for the radio cell selected at stage 9 or a coverage area of a radio beam for the radio cell selected at stage 9 to determine or help determine the location of UE 802 at stage 14. The sNB 806 may map the location to a country and verify the country is supported by the sNB 806 and matches the country of the selected PLMN indicated at stage 13. In some implementations, the sNB 806 may further determine a fixed serving cell and/or a fixed serving Tracking Area (TA) for UE 802, e.g., by mapping a UE 802 location to a Cell ID and/or TA Code (TAC), for the selected PLMN indicated at stage 12.

At stage 15, if the UE country determined at step 14 is not supported by the sNB 806 or does not match the country for the selected PLMN, the sNB 806 may return an RRC Reject message to UE 802. The RRC Reject message may indicate the country (e.g. using an MCC) that the UE 802 is located in as determined at stage 14 or may simply indicate that the UE 802 is not located in a country for the selected PLMN. If an RRC Reject message is received, the UE 802 may restart the procedure at stage 8 (e.g. to verify the UE country) or stage 9 (e.g. using the country received at stage 15).

At stage 16, if the UE 802 is in the correct country or may be in the correct country, the sNB 806 sends a Next Generation (NG) Application Protocol (NGAP) message (e.g. an NGAP Initial UE message) to an entity in the selected PLMN, e.g., AMF 808. In some implementations, the NGAP message may include an indication that the sNB 806 has verified the UE 802 location and/or country. The NGAP message may further include an identification of the fixed serving cell and/or fixed serving TA if determined at stage 14 (e.g., the Cell ID and TAC) and/or a location of UE 802 of determined at stage 14. In some implementations, the AMF 808 or LMF 810 may perform the fixed cell and/or fixed TA (Cell ID and/or TAC) determination, e.g., using configuration information previously received from the O&M server at stage 1B (and possibly a location of the UE 802 if included in the NGAP message). The NGAP initial UE message may further include, e.g., a NAS Registration Request or a NAS Service Request message sent by UE 802 at stage 13. If the NGAP message indicates that the UE 802 location and country are fully verified by the sNB 806, the AMF 808 may accept the NAS Registration Request or Service Request. Otherwise, the AMF 808 may determine and verify the UE 802 country—e.g. using a location of UE 802 received at stage 16 or by obtaining a location of UE 802 using LMF 810 (not shown in FIG. 8A).

At stage 17, the AMF 808 returns a NAS Registration Accept or NAS Service Accept message to UE 802 via sNB 806. The NAS Registration Accept or NAS Service Accept message to UE 802 may include the fixed serving TA and fixed serving cell, as determined by the sNB 806 in stage 14 or as determined by the AMF 808 or LMF 810 in stage 16. The AMF 808 may include allowed fixed TAs (TACs) for UE 802 (in which UE 802 is allowed to roam) and location information such as geographic definitions of the allowed fixed TAs and constituent fixed cells for the allowed fixed TAs. A Registration flag may also be included in the NAS Registration Accept or NAS Service Accept message to indicate if the UE 802 is or is not required to perform a registration update with the serving PLMN for a change of TA after detecting that the UE 802 is no longer in any of the allowed TAs. For example, if the Registration flag indicates that the UE 802 is not required to perform a registration update with the serving PLMN for a change of TA, the UE 802 may be allowed to access the serving PLMN using any radio cell supporting the serving PLMN which provides (e.g. via a SIB broadcast in the radio cell) an indication of support for at least one TA allowed (e.g. at stage 17) for UE 802. This may apply even when UE 802 is not actually located in any allowed TA. Conversely, if the Registration flag indicates that the UE 802 is required to perform a registration update with the serving PLMN for a change of TA, the UE 802 may be required to register with the serving PLMN when the UE 802 detects that UE 802 is no longer located in any allowed TA.

Figure 8B:
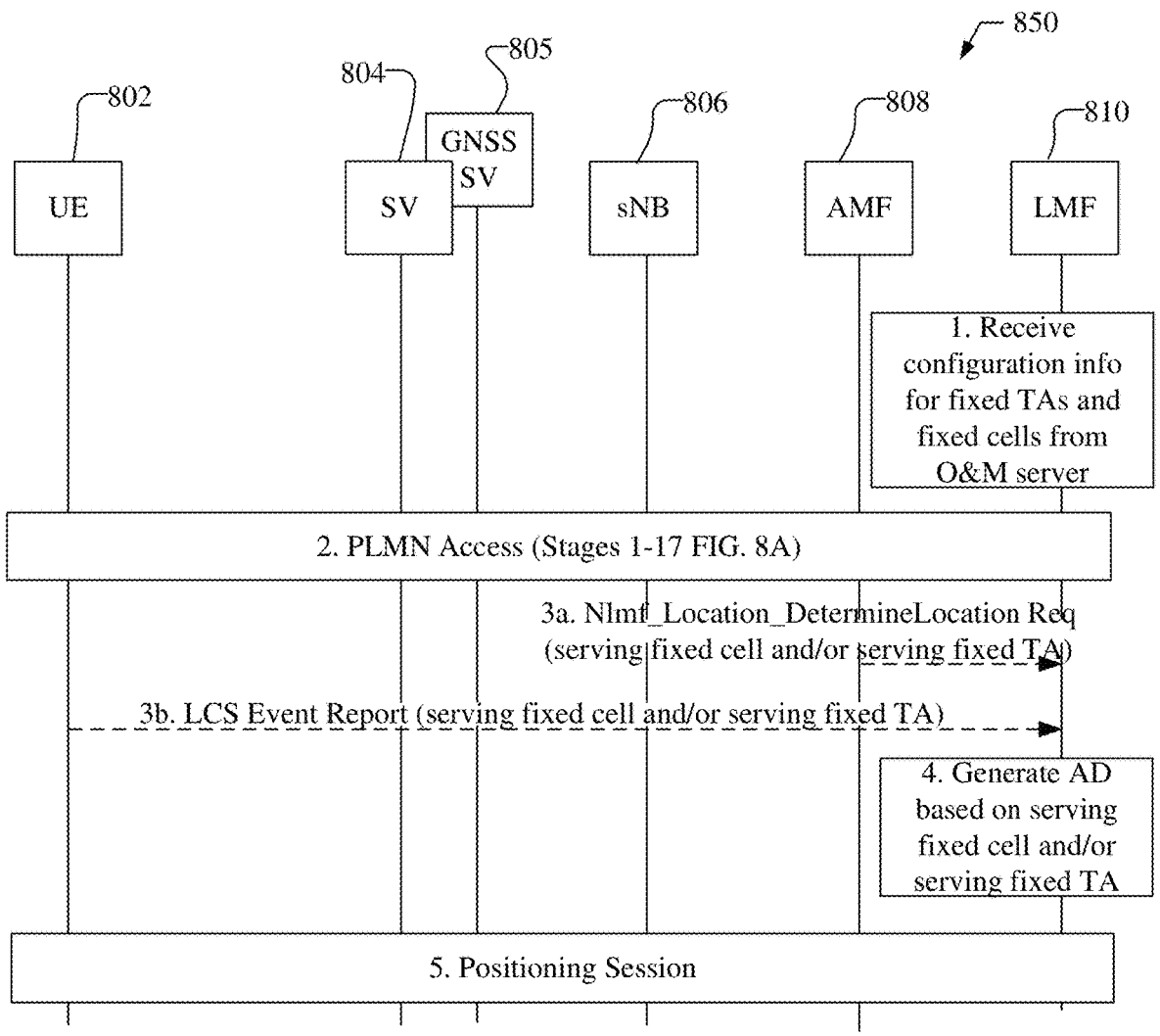
FIG. 8B shows a signaling flow that illustrates various messages sent between components of a communication system in a positioning procedure.

FIG. 8B shows a signaling flow 850 that illustrates various messages sent between components of a communication system in a positioning procedure after initial PLMN access has occurred (e.g. as described for FIG. 8A). The message flow 850 may be performed by entities in the network architectures 100, 200, or 300, in which the UE 802 corresponds to UE 105, SV 804 corresponds to SV 102, 202 or 302, GNSS SV 805 corresponds to SV 190, sNB 806 corresponds to sNB 106/202/307, AMF 808 corresponds to AMF 122, and LMF 810 corresponds to LMF 124. It should be understood that the sNB 806 or an element of the sNB 806 may be included within the SV 804. For example, with an SV 202, an sNB 202 would be completely included within the SV 202 as described for FIG. 2. Alternatively, with an SV 302, an sNB 307 (also referred to as an sNB-CU 307) would be terrestrial and physically separate from the SV 302, but the SV 302 would include an sNB-DU 302 as described for FIG. 3.

At stage 1, the LMF 810 may receive configuration information for fixed TAs and fixed cells from the O&M server 150 (shown in FIGS. 1, 2, and 3). The configuration information for each assigned fixed TA and fixed cell, for example, may include an identity (of the fixed TA or fixed cell) which may include an identity of the sNB 806 and may further include a geographic definition of the fixed TA or fixed cell (e.g. as provided by the operator to the O&M server 150). The fixed TA or fixed cell, for example, may be defined as a polygon by providing coordinates (e.g. latitude, longitude and optionally altitude) for each vertex of the polygon. Alternatively, a fixed cell or fixed TA may be defined using a regular array of grid points in which each grid point defines a fixed TA or fixed cell as comprising all locations closing to that grid point than to any other grid point (e.g. which may result in rectangular or hexagonal fixed TAs or fixed cells).

At stage 2, the initial PLMN access, as discussed in stages 1-17 of FIG. 8A may be performed.

Stages 3a and 3b illustrate different types of messages that may be used to initiate a positioning procedure. For example, stage 3a illustrates a positioning procedure for a single location (e.g. for a Mobile Originating Location Request (MO-LR) or a Mobile Terminating Location Request MT-LR), while stage 3b illustrates part of a periodic or triggered positioning procedure. It will be clear to those of ordinary skill in the art, that additional messages may be included in MO-LR, MT-LR, or periodic or triggered positioning procedures. It should be understood that stages 3a or 3b may be sent, if any, and that both messages may not be transmitted during a positioning procedure.

At stage 3a, the AMF 808 may invoke an Nlmf_Location_DetermineLocation service operation towards the LMF 810 to request the current location of the UE 802. The Nlmf_Location_DetermineLocation message may be sent in, e.g., to support an MT-LR or MO-LR. The Nlmf_Location_DetermineLocation may include the fixed serving cell and/or fixed serving TA for the UE 802, which the AMF 808 may have acquired, e.g., at stage 16 of FIG. 8A or during previous paging of UE 802 (not shown in FIG. 8B).

At stage 3b, if periodic or triggered location is being supported, the UE 802 may send an LCS supplementary services event report message to the LMF 810 which is transferred via the serving AMF 808 and is delivered to the LMF 810 using an Namf_Communication_N1MessageNotify service operation. The event report may indicate the fixed serving cell and/or fixed serving TA for the UE 802, which the UE 802 may have acquired, e.g., at stage 17 of FIG. 8A, and/or the AMF 808 may include the fixed serving cell and/or fixed serving TA for the UE 802 which the AMF 808 may have received from sNB 806. The LMF 810 may provide an acknowledgment to the UE 802 in return.

At stage 4, the LMF 810 may generate assistance data for positioning based on the received fixed serving cell and/or fixed TA for the UE 802. For example, the configured geographic definition of a fixed TA or fixed cell, e.g., received by the LMF 810 at stage 1 may be used to determine an approximate location of the UE 802 based on the fixed serving cell and/or fixed TA for the UE 802 received at stage 3a or 3b. The initial approximate location for the UE 802 be used to generate assistance data, e.g., for measurements of DL signals from SV 804 or GNSS SVs 805 by the UE 802 or measurements of UL signals from the UE 802 by sNB 806 or SV 804. The initial approximate location for the UE 802 may also or instead be used to (i) determine radio cells, SVs 804 and/or sNBs 806 for which the UE 802 can obtain DL location measurements, and/or (ii) SVs 804 and/or sNBs 806 which can obtain UL location measurements of signals transmitted by UE 802.

At stage 5, a positioning session between UE 802, the LMF 810 and possibly sNB 806 and other sNBs (not shown in FIG. 8B) is performed. The positioning session may include providing the assistance data generated by the LMF 810 at stage 4 to the UE 802 for DL measurements and/or to sNB 806/SV 804 for UL measurements. The positioning session may also include indicating to UE 802 the SVs 804 and/or sNBs 806 determined at stage 4 for which the UE 802 can obtain DL location measurements, and/or requesting SVs 804 and/or sNBs 806 determined at stage 4 to obtain UL location measurements of signals transmitted by UE 802. During the positioning session, DL and/or UL positioning measurements for the UE 802 are obtained, e.g., using the assistance data generated by LMF 810 at stage 4, and may be provided to the LMF 810. In some implementations, the UE 802 may generate a position estimate based on positioning measurements, which may be provided to the LMF 810 in addition or alternatively to the positioning measurements. The LMF 810 may determine a more accurate position for the UE 802 based on the received position measurements and/or position estimate.

A procedure similar to that shown in FIG. 8B may be used to locate a UE 105 using an SLP 132 instead of an LMF 124. for example, stages 1, 2, 4 and 5 may be performed the same as or in a similar manner to that described for FIG. 8B and stages 3a and 3b may be replaced by other similar stages. The differences to the procedure in FIG. 8B are well known to those of ordinary expertise in the art.

Figure 8C:
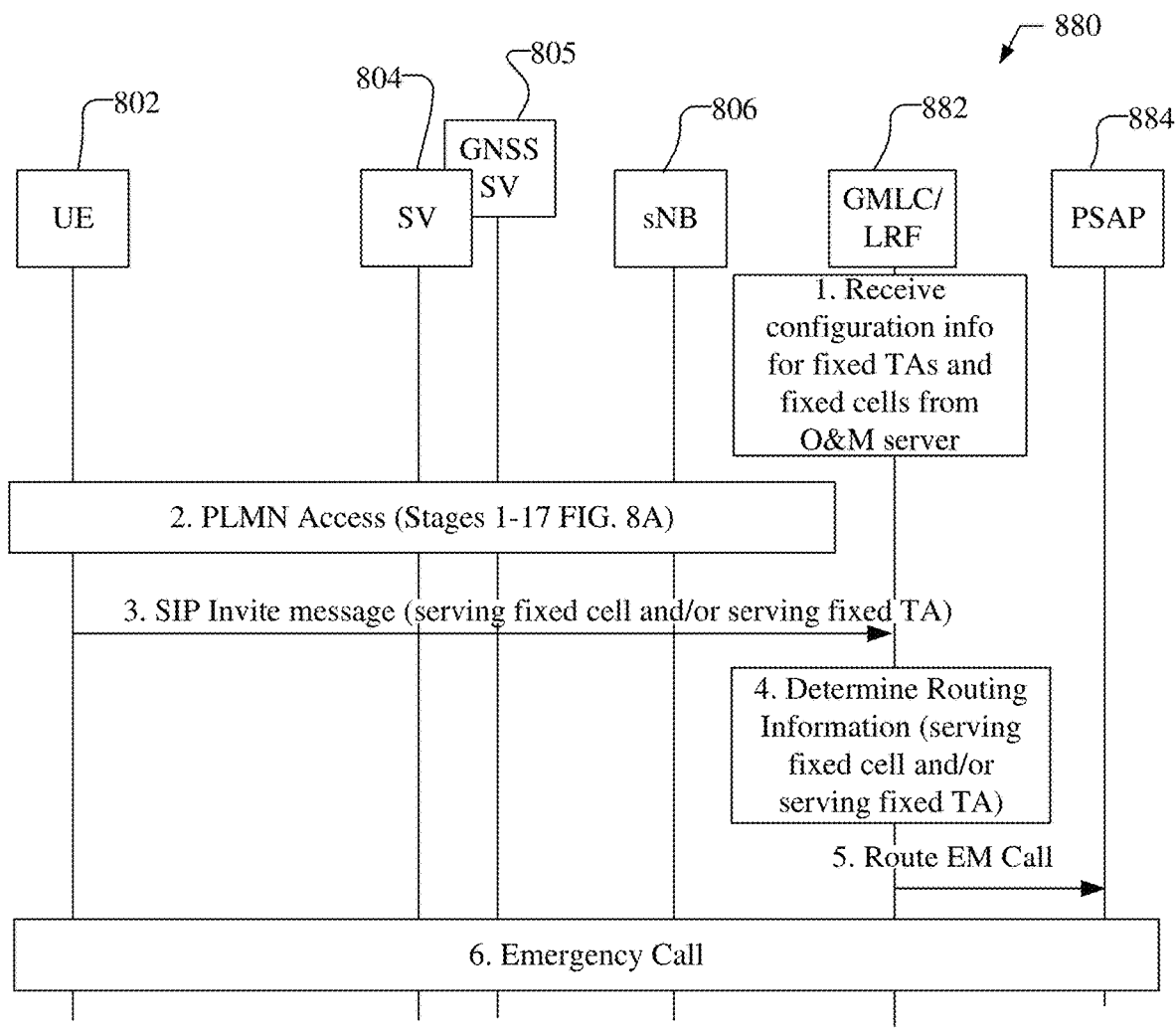
FIG. 8C shows a signaling flow that illustrates various messages sent between components of a communication system in an emergency call procedure.

FIG. 8C shows a signaling flow 880 that illustrates various messages sent between components of a communication system in an emergency call procedure. The message flow 880 may be performed by entities in the network architectures 100, 200, or 300, in which the UE 802 corresponds to UE 105, SV 804 corresponds to SV 102, 202 or 302, GNSS SV 805 corresponds to SV 190, sNB 806 corresponds to sNB 106/202/307, GMLC/LRF 882 corresponds to GMLC 126 or LRF 125, and PSAP 884 corresponds to external client 140. It should be understood that the sNB 806 or an element of the sNB 806 may be included within the SV 804. For example, with an SV 202, an sNB 202 would be completely included within the SV 202 as described for FIG. 2. Alternatively, with an SV 302, an sNB 307 (also referred to as an sNB-CU 307) would be terrestrial and physically separate from the SV 302, but the SV 302 would include an sNB-DU 302 as described for FIG. 3.

At stage 1, the GMLC/LRF 882 may receive configuration information for fixed TAs and fixed cells from the O&M server 150 (shown in FIGS. 1, 2, and 3). The configuration information for each assigned fixed TA and fixed cell, for example, may include an identity (of the fixed TA or fixed cell) which may include an identity of the sNB 806 and may further include a geographic definition of the fixed TA or fixed cell (e.g. as provided by the operator to the O&M server 150 or as derived from this by the O&M server). The fixed TA or fixed cell, for example, may be defined as a polygon by providing coordinates (e.g. latitude, longitude and optionally altitude) for each vertex of the polygon. Alternatively, a fixed cell or fixed TA may be defined using a regular array of grid points in which each grid point defines a fixed cell or fixed TA as comprising all locations closer to that grid point than to any other grid point (e.g. which may result in rectangular or hexagonal grid fixed cells or fixed TAs). In other implementations, the configuration information may include an identification of one or more PSAPs or intermediate entities to which an emergency call from a UE located in the fixed cell or fixed TA should be routed.

At stage 2, the initial PLMN access, as discussed in stages 1-17 of FIG. 8A may be performed. Alternatively or in addition, the UE 802 may obtain an emergency Protocol Data Unit (PDU) session which can include a determination of a fixed cell and/or fixed TA for UE 802 by sNB 806 or an AMF 122 (not shown in FIG. 8C) and provision of the fixed cell and/or fixed TA to UE 802—e.g. by sNB 806 or by AMF 122.

At stage 3, the UE 802 may send via SV 804 and sNB 806 an SIP INVITE message for an emergency call to a serving PLMN (e.g. SGCN 110) that is forwarded to the LRF 882. The SIP INVITE message includes the fixed serving cell and/or fixed TA for the UE 802, i.e., the fixed cell and/or fixed TA in which the UE 802 is located, e.g. as determined at stage 2 or at stage 17 of FIG. 8A.

At stage 4, the LRF 882 (or GMLC component of GMLC/LRF 882) may determine routing information for routing the emergency call based on the fixed TA and fixed cell configuration information received at stage 1 and the received fixed serving cell and/or fixed TA for the UE 802. For example, the configuration information may include one or more PSAPs or intermediate entities to which an emergency call located in the fixed cell or fixed TA should be routed. Alternatively, the configuration information may include a geographic definition of the fixed TA or fixed cell, from which the GMLC/LRF 882 may determine an approximately location of the UE 802, which may be used to determine an appropriate PSAP or intermediate entity for routing the emergency call.

At stage 5, the GMLC/LRF 882 routes, or enables routing of, the emergency call to the PSAP 884 (or to an intermediate entity, based on the routing information determined in stage 4.

At stage 6, the emergency call between the UE 802 and the PSAP 884 may take place.

Figure 9:
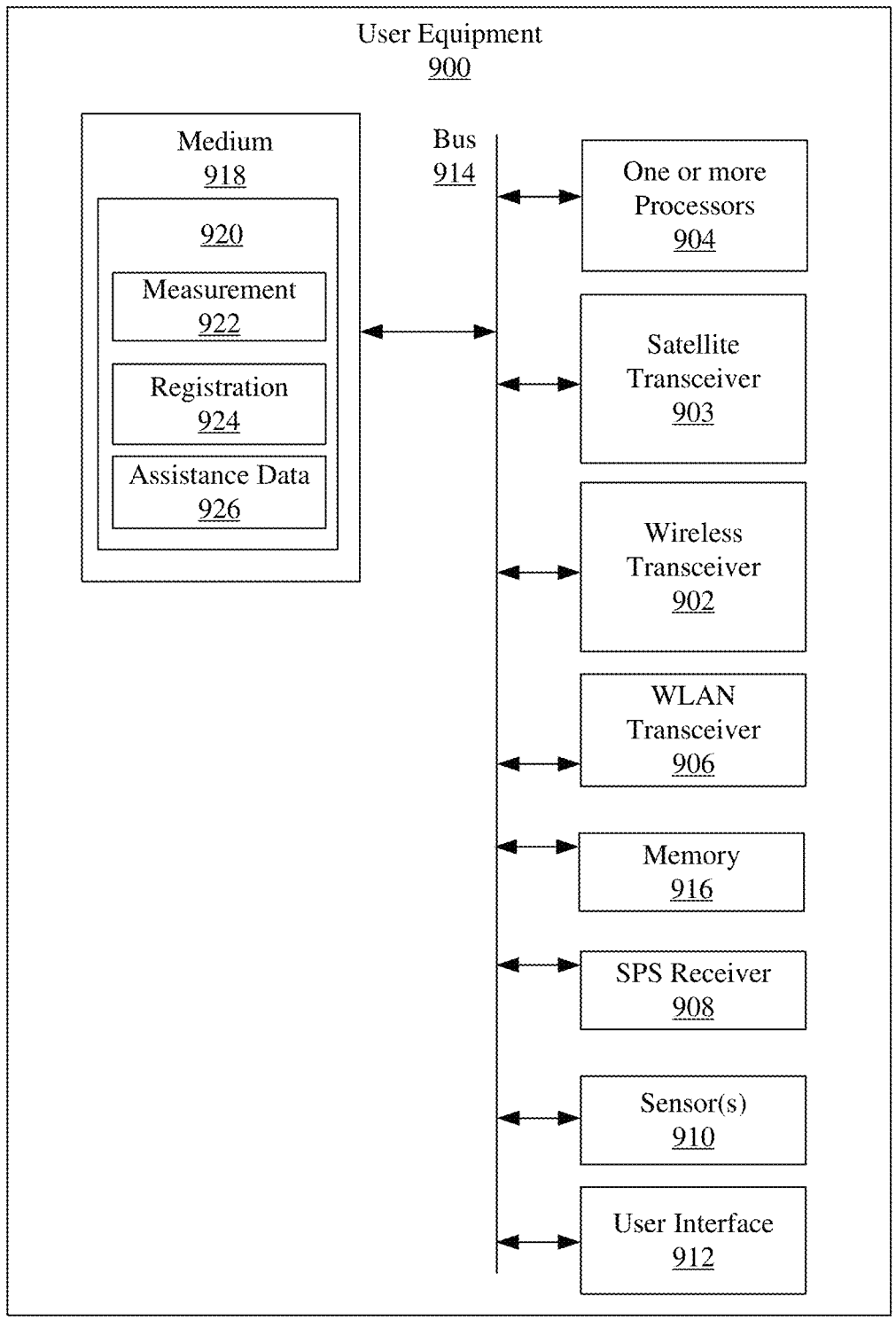
FIG. 9 is a diagram illustrating an example of a hardware implementation of a UE configured to support satellite access using fixed TAs and fixed cells.

FIG. 9 is a diagram illustrating an example of a hardware implementation of UE 900, such as UE 105 shown in FIGS. 1, 2, and 3. The UE 900 may be configured to perform the signal flows in FIGS. 7, 8A, 8B, and 8C. The UE 900 may include, e.g., hardware components such as a satellite transceiver 903 to wirelessly communicate with a SV 102/202/ 302 via a wireless antenna (not shown in FIG. 9), e.g., as shown in FIGS. 1, 2, and 3. The UE 900 may further include wireless transceiver 902 to wirelessly communicate with terrestrial base stations in an NG-RAN 112 via a wireless antenna (not shown in FIG. 9), e.g., base stations such as a gNB or an ng-eNB. The UE 900 may also include additional transceivers, such a wireless local area network (WLAN) transceiver 906, as well as an SPS receiver 908 for receiving and measuring signals from SPS SVs 190 (shown in FIGS. 1, 2, and 3) via a wireless antenna (not shown in FIG. 9). In some implementations, the UE 900 may receive data from a satellite, e.g., via satellite transceiver 903, and may respond to a terrestrial base station, e.g., via wireless transceiver 902, or via WLAN transceiver 906. Thus, UE 900 may include one or more transmitters, one or more receives or both, and these may be integrated, discrete, or a combination of both. The UE 900 may further include one or more sensors 910, such as cameras, accelerometers, gyroscopes, electronic compass, magnetometer, barometer, etc. The UE 900 may further include a user interface 912 that may include e.g., a display, a keypad or other input device, such as virtual keypad on the display, through which a user may interface with the UE 900. The UE 900 further includes one or more processors 904, memory 916, and non-transitory computer readable medium 918, which may be coupled together with bus 914. The one or more processors 904 and other components of the UE 900 may similarly be coupled together with bus 914, a separate bus, or may be directly connected together or coupled using a combination of the foregoing.

The one or more processors 904 may be implemented using a combination of hardware, firmware, and software. For example, the one or more processors 904 may be configured to perform the functions discussed herein by implementing one or more instructions or program code 920 on a non-transitory computer readable medium, such as medium 918 and/or memory 916. In some embodiments, the one or more processors 904 may represent one or more circuits configurable to perform at least a portion of a data signal computing procedure or process related to the operation of UE 900.

The medium 918 and/or memory 916 may store instructions or program code 920 that contain executable code or software instructions that when executed by the one or more processors 904 cause the one or more processors 904 to operate as a special purpose computer programmed to perform the techniques disclosed herein (e.g. such as the signal flows of FIGS. 7, 8A, 8B, and 8C). As illustrated in UE 900, the medium 918 and/or memory 916 may include one or more components or modules that may be implemented by the one or more processors 904 to perform the methodologies described herein. While the components or modules are illustrated as software in medium 918 that is executable by the one or more processors 904, it should be understood that the components or modules may be stored in memory 916 or may be dedicated hardware either in the one or more processors 904 or off the processors.

A number of software modules and data tables may reside in the medium 918 and/or memory 916 and be utilized by the one or more processors 904 in order to manage both communications and the functionality described herein. It should be appreciated that the organization of the contents of the medium 918 and/or memory 916 as shown in UE 900 is merely exemplary, and as such the functionality of the modules and/or data structures may be combined, separated, and/or be structured in different ways depending upon the implementation of the UE 900. While the components or modules are illustrated as software in medium 918 and/or memory 916 that is executable by the one or more processors 904, it should be understood that the components or modules may be firmware or dedicated hardware either in the one or more processors 904 or off the processors.

As illustrated, the program code 920 stored on medium 918 and/or memory 916 may include a measurement module 922 that that when implemented by the one or more processors 904 configures the one or more processors 904 to generate measurements of DL signals received from a plurality of satellites, e.g., via the SPS receiver 908 and/or the satellite transceiver 903. By way of example, the measurements may be GNSS measurements or may include RSRP, RSRQ, Rx-Tx, AoA from one or more SVs, and RSTD or DADA from one or more pairs of SVs. The measurement module 922 may further configure the one or more processors 904 to perform GNSS measurements via SPS receiver 908, for A-GNSS positioning. The one or more processors 904 may be configured to send the measurements to a sNB, e.g., in response to a location request to enable determination of a location and country of the UE. The one or more processors 904 may further be configured to receive an indication of a public key from the sNB and to cipher the measurements based on the public key before sending the measurements to the sNB.

The program code 920 stored on medium 918 and/or memory 916 may include a registration module 924 that when implemented by the one or more processors 904 configures the one or more processors 904 for registration and deregistration with a serving PLMN via the satellite transceiver 903. For example, the one or more processor 904 may be configured to send, via the satellite transceiver 903 measurements to enable determination of a location and country of the UE by an sNB as part of the registration process. The one or more processors 904 may be configured to send, e.g., a NAS request message to the sNB, e.g., in an RRC message. The one or more processors 904 may be configured to receive an indication that the UE is not located in the country associated with the serving PLMN, or to receive a message accepting the registration request.

The program code 920 stored on medium 918 and/or memory 916 may include an assistance data module 926 that when implemented by the one or more processors 904 configures the one or more processors 904 for receive assistance data broadcast by an sNB via the satellite transceiver 903.

The methodologies described herein may be implemented by various means depending upon the application. For example, these methodologies may be implemented in hardware, firmware, software, or any combination thereof. For a hardware implementation, the one or more processors 904 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 900 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 918 or memory 916 and executed by one or more processors 904, causing the one or more processors 904 to operate as a special purpose computer programmed to perform the techniques disclosed herein. Memory may be implemented within the one or processors 904 or external to the one or more processors 904. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 900 may be stored as one or more instructions or code on a non-transitory computer-readable storage medium such as medium 918 or memory 916. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 900 may be provided as signals on transmission media included in a communication apparatus. For example, a communication apparatus comprising part or all of UE 900 may include a transceiver having signals indicative of instructions and data. The instructions and data are stored on non-transitory computer readable medium 918 or memory 916, and are configured to cause the one or more processors 904 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 10:
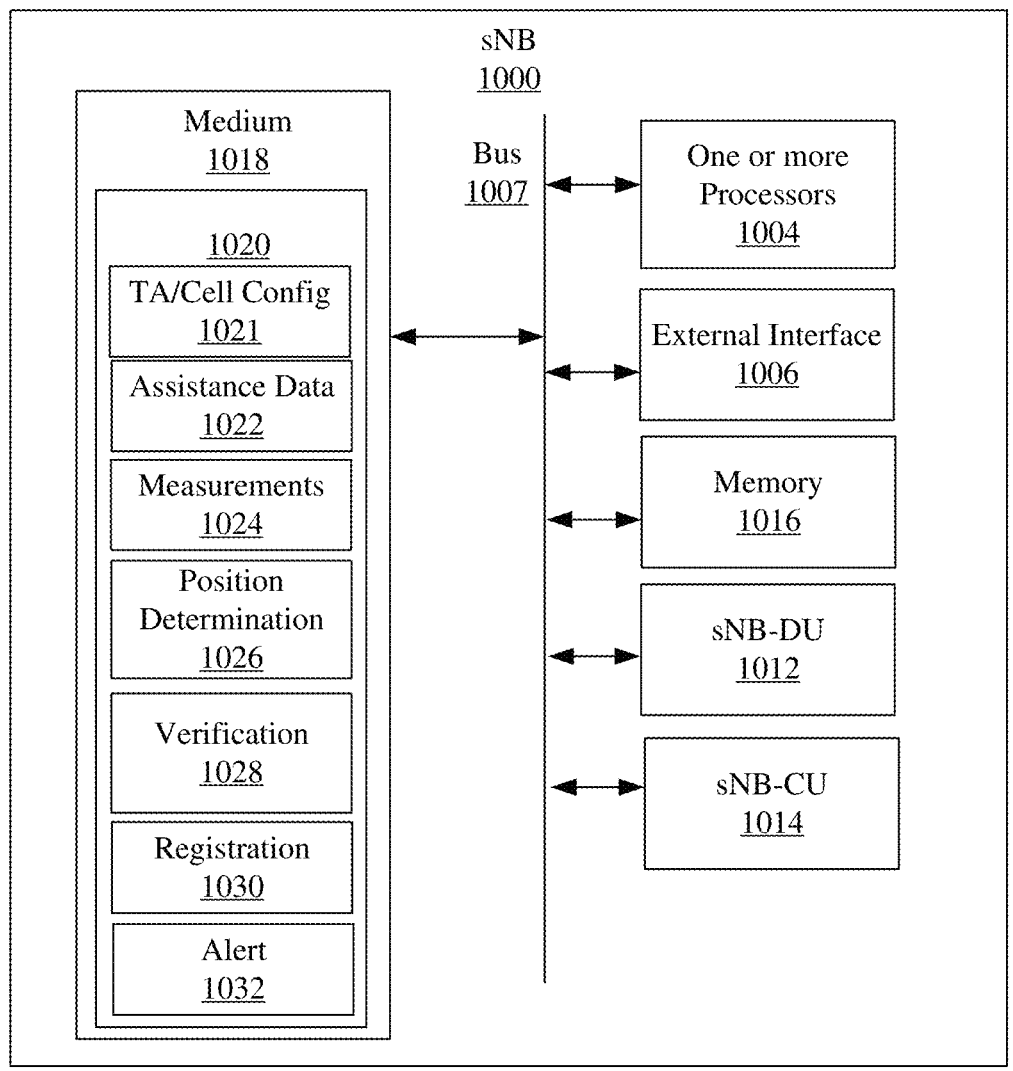
FIG. 10 is a diagram illustrating an example of a hardware implementation of a satellite NodeB (sNB) configured to support UE satellite access using fixed TAs and fixed cells.

FIG. 10 is a diagram illustrating an example of a hardware implementation of a satellite node B (sNB) 1000, which is a network entity in a PLMN. The sNB 1000 may correspond to any of: (i) sNB 106 illustrated in FIG. 1; (ii) sNB 202 in the SV 202 illustrated in FIG. 2; or (iii) sNB-DU 302 in the SV 302 or sNB-CU 307 illustrated in FIG. 3. The sNB 1000 may perform the signal flows of FIGS. 7, 8A, 8B, and 8C and the process flow 1200 of FIG. 12. The sNB 1000 may include, e.g., hardware components such as an external interface 1006, which may comprise one or more wired and/or wireless interfaces capable of connecting to and communicating with one or more entities in a core network in a PLMN, such as AMF 122 or UPF 130 in SGCN 110 shown in FIG. 2, and earth stations 104, as well as other sNBs, UEs 105 (e.g. when sNB 1000 is part of an SV 202 or SV 302) and to other elements in a wireless network directly or through one or more intermediary networks and/or one or more network entities, as shown in FIGS. 1, 2, and 3. The external interface 1006 may include one or more antennas to support a wireless interface and/or a wireless backhaul to elements in the wireless network. The sNB 1000 further includes one or more processors 1004, memory 1016, and non-transitory computer readable medium 1018, which may be coupled together with bus 1007. The sNB 1000 is illustrated as including an sNB-DU 1012 and/or sNB-CU 1014 (e.g. in the case that sNB 1000 corresponds to sNB 106-3 in FIG. 1 or corresponds to sNB 202 in FIG. 2 with sNB 202 comprising an sNB-CU and one or more sNB-DUs), which may be hardware components or implemented by specifically configured one or more processors 1004. sNB-DU 1012 and sNB-CU 1014 may not be present when sNB 1000 itself corresponds to an sNB-DU (e.g. sNB-DU 302) or to an sNB-CU (e.g. sNB-CU 307).

The one or more processors 1004 may be implemented using a combination of hardware, firmware, and software. For example, the one or more processors 1004 may be configured to perform the functions discussed herein by implementing one or more instructions or program code 1020 on a non-transitory computer readable medium, such as medium 1018 and/or memory 1016. In some embodiments, the one or more processors 1004 may represent one or more circuits configurable to perform at least a portion of a data signal computing procedure or process related to the operation of sNB 1000.

Figure 12:
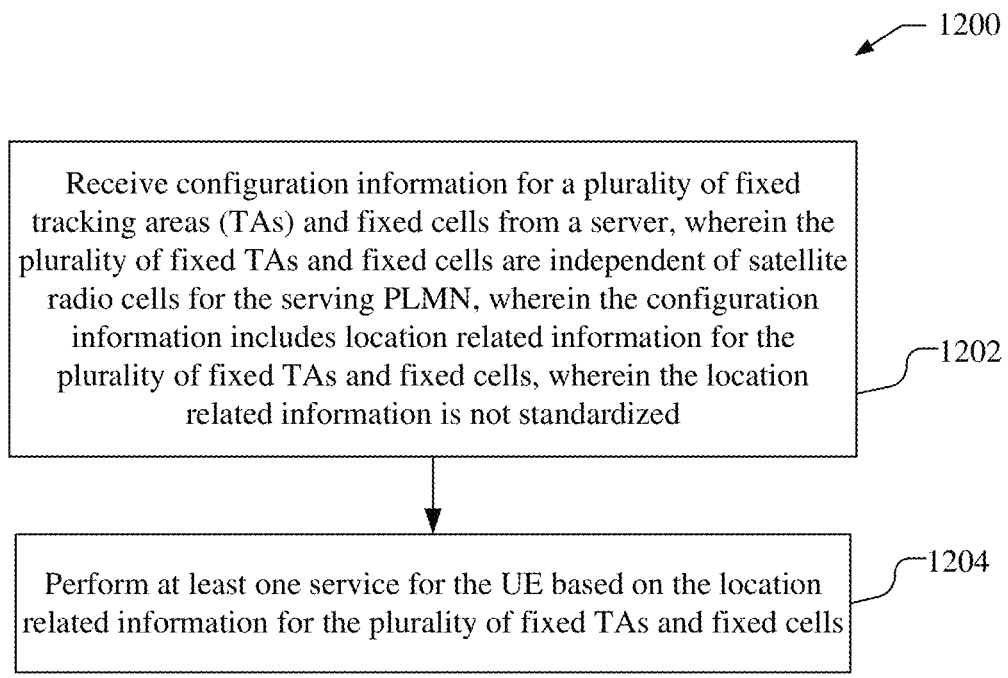
FIG. 12 is a flowchart of an example procedure performed by a network entity in a serving PLMN for UE access to a serving PLMN through SVs.

The medium 1018 and/or memory 1016 may store instructions or program code 1020 that contain executable code or software instructions that when executed by the one or more processors 1004 cause the one or more processors 1004 to operate as a special purpose computer programmed to perform the techniques disclosed herein (e.g. such as signal flows of FIGS. 7, 8A, 8B, and 8C and the process flow 1200 of FIG. 12). As illustrated in sNB 1000, the medium 1018 and/or memory 1016 may include one or more components or modules that may be implemented by the one or more processors 1004 to perform the methodologies described herein. While the components or modules are illustrated as software in medium 1018 that is executable by the one or more processors 1004, it should be understood that the components or modules may be stored in memory 1016 or may be dedicated hardware either in the one or more processors 1004 or off the processors.

A number of software modules and data tables may reside in the medium 1018 and/or memory 1016 and be utilized by the one or more processors 1004 in order to manage both communications and the functionality described herein. It should be appreciated that the organization of the contents of the medium 1018 and/or memory 1016 as shown in sNB 1000 is merely exemplary, and as such the functionality of the modules and/or data structures may be combined, separated, and/or be structured in different ways depending upon the implementation of the sNB 1000. While the components or modules are illustrated as software in medium 1018 and/or memory 1016 that is executable by the one or more processors 1004, it should be understood that the components or modules may be firmware or dedicated hardware either in the one or more processors 1004 or off the processors.

As illustrated, the program code 1020 stored on medium 1018 and/or memory 1016 may include an TA/Cell config module 1021 that when implemented by the one or more processors 1004 configures the one or more processors 1004 to receive configuration information for fixed TAs and fixed cells from an O&M server, via the external interface 1006. The configuration information, for example, is for fixed TAs and fixed cells assigned to the sNB 106 and may define a coverage area for the sNB. The configuration information may include an identity (of the fixed cell or fixed cell) which may include an identity of the sNB (e.g. in leftmost bits of the identity of the fixed TA or fixed cell) and a geographic definition of the fixed TA or fixed cell. The geographic definition for each fixed TA may be, e.g., a geographic definition or routing information for an emergency call for each fixed TA or each fixed cell.

As illustrated, the program code 1020 stored on medium 1018 and/or memory 1016 may include an assistance data module 1022 that when implemented by the one or more processors 1004 configures the one or more processors 1004 to receive assistance data from a location server for determining a position of the UE. The one or more processors 1004 may be configured to request the assistance data, or to receive the assistance data unsolicited, e.g., periodically or based on an update to the assistance data in the location server. The one or more processors 1004 may be configured to broadcast the assistance data to UEs via a communications satellite. The assistance data, for example, may be received in an NRPPa message and the content and coding may be based on LPP or posSIB. The assistance data, for example, may include assistance data for a plurality of satellites, such as GNSS satellites and/or communication satellites. For example, the assistance data may be at least one of ephemeris data, timing information, ionosphere corrections, troposphere corrections, real time integrity, differential corrections, or a combination thereof.

The program code 1020 stored on medium 1018 and/or memory 1016 may include a measurements module 1024 that when implemented by the one or more processors 1004 configures the one or more processors 1004 to receive, via the external interface 1006, measurements produced by the UE from DL signals received by the UE from a plurality of satellites. The measurements, for example, may include GNSS measurements or RSRP, RSRQ, Rx-Tx, AoA for one or more SVs or RSTD or DAOA for one or more pairs of SVs. The one or more processors 1004 may be configured to provide a public key to the UE and an encryption algorithm with which the UE may cipher the measurements, and to decipher the received measurements based on a private key associated with the public key.

As illustrated, the program code 1020 stored on medium 1018 and/or memory 1016 may include a position determination module 1026 that when implemented by the one or more processors 1004 configures the one or more processors 1004 to determine a location and country of the UE based on received measurements and the assistance data. For example, the one or more processors 1004 may be configured to determine a location of the UE using A-GNSS, an E-CID process, TDOA, RTT, etc. The one or more processors 1004 may be configured to determine the country of the UE by mapping a determined location to the country. The one or more processors may be further configured to map the determined location of the UE to a fixed cell and/or fixed TA, e.g., based on the location information received for fixed cells and fixed TAs, e.g., which may the geographic definition of each fixed TA or fixed cell.

As illustrated, the program code 1020 stored on medium 1018 and/or memory 1016 may include a verification module 1028 that when implemented by the one or more processors 1004 configures the one or more processors 1004 to verify whether the UE is in the country associated with the serving PLMN for the UE.

As illustrated, the program code 1020 stored on medium 1018 and/or memory 1016 may include a registration module 1030 that when implemented by the one or more processors 1004 configures the one or more processors 1004 for registration and deregistration of the UE with a serving PLMN via the external interface 1006. For example, the one or more processor 1004 may be configured to transmit and receive registration and deregistration requests with an AMF in the serving PLMN via the external interface 1006. The one or more processor 1004 may be configured to indicate whether the country of the UE has been verified to be the same as the country associated with the PLMN.

As illustrated, the program code 1020 stored on medium 1018 and/or memory 1016 may include an alert module 1032 that when implemented by the one or more processors 1004 configures the one or more processors 1004 for receiving an alert message that includes fixed TAs and fixed cells from an AMF and mapping the fixed TAs and fixed cells to radio cells, based on the configuration information received from the O&M server, and to broadcast the alert message in the radio cells that correspond to the fixed TAs and fixed cells, via the external interface 1006.

The methodologies described herein may be implemented by various means depending upon the application. For example, these methodologies may be implemented in hardware, firmware, software, or any combination thereof. For a hardware implementation, the one or more processors 1004 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of sNB 1000 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1018 or memory 1016 and executed by one or more processors 1004, causing the one or more processors 1004 to operate as a special purpose computer programmed to perform the techniques disclosed herein. Memory may be implemented within the one or processors 1004 or external to the one or more processors 1004. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by sNB 1000 may be stored as one or more instructions or code on a non-transitory computer-readable storage medium such as medium 1018 or memory 1016. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for sNB 1000 may be provided as signals on transmission media included in a communication apparatus. For example, a communication apparatus comprising part or all of sNB 1000 may include a transceiver having signals indicative of instructions and data. The instructions and data are stored on non-transitory computer readable media, e.g., medium 1018 or memory 1016, and are configured to cause the one or more processors 1004 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 11:
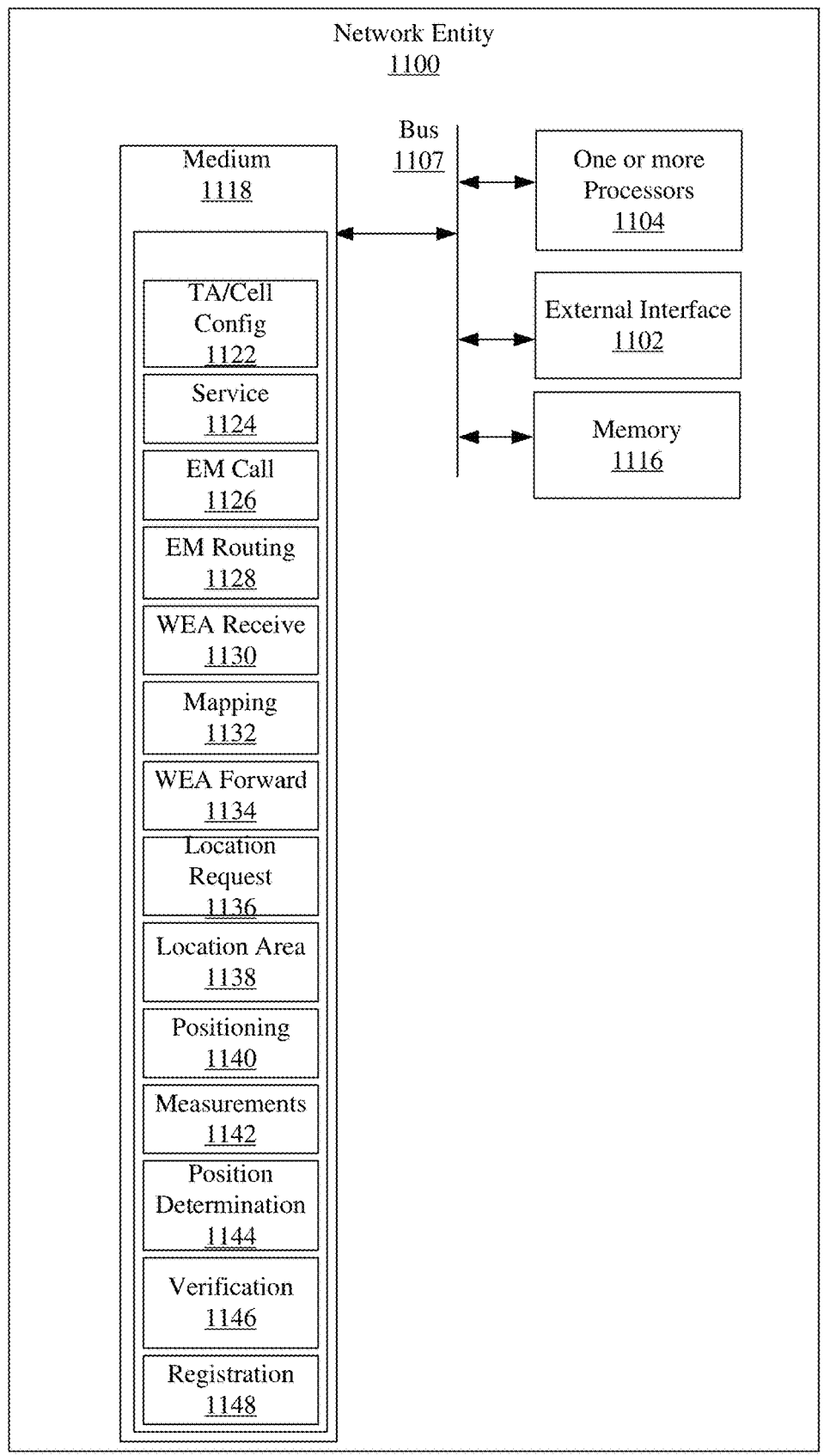
FIG. 11 is a diagram illustrating an example of a hardware implementation of a network entity in a PLMN configured to support UE satellite access using fixed TAs and fixed cells.

FIG. 11 is a diagram illustrating an example of a hardware implementation of a network entity 1100 in a PLMN. The network entity, for example, may be AMF 122, LMF 124, SLP 132, NEF 128, GMLC 126, LRF 125 or CBCF 135 in a serving PLMN, shown in FIGS. 1, 2, and 3. The network entity 1100 may perform the signal flows of FIGS. 7, 8A, 8B, and 8C and the process flow 1200 of FIG. 12. The network entity 1100 includes, e.g., hardware components such as an external interface 1102 configured to be communication with other network components in the PLMN. The network entity 1100 includes one or more processors 1104, memory 1116, and non-transitory computer readable medium 1118, which may be coupled together with bus 1107.

The one or more processors 1104 may be implemented using a combination of hardware, firmware, and software. For example, the one or more processors 1104 may be configured to perform the functions discussed herein by implementing one or more instructions or program code 1120 on a non-transitory computer readable medium, such as medium 1118 and/or memory 1116. In some embodiments, the one or more processors 1104 may represent one or more circuits configurable to perform at least a portion of a data signal computing procedure or process related to the operation of network entity 1100.

The medium 1118 and/or memory 1116 may store instructions or program code 1120 that contain executable code or software instructions that when executed by the one or more processors 1104 cause the one or more processors 1104 to operate as a special purpose computer programmed to perform the techniques disclosed herein (e.g. such as the signal flows of FIGS. 7, 8A, 8B, and 8C and the process flow 1200 of FIG. 12). As illustrated in network entity 1100, the medium 1118 and/or memory 1116 may include one or more components or modules that may be implemented by the one or more processors 1104 to perform the methodologies described herein. While the components or modules are illustrated as software in medium 1118 that is executable by the one or more processors 1104, it should be understood that the components or modules may be stored in memory 1116 or may be dedicated hardware either in the one or more processors 1104 or off the processors.

A number of software modules and data tables may reside in the medium 1118 and/or memory 1116 and be utilized by the one or more processors 1104 in order to manage both communications and the functionality described herein. It should be appreciated that the organization of the contents of the medium 1118 and/or memory 1116 as shown in network entity 1100 is merely exemplary, and as such the functionality of the modules and/or data structures may be combined, separated, and/or be structured in different ways depending upon the implementation of the network entity 1100. While the components or modules are illustrated as software in medium 1118 and/or memory 1116 that is executable by the one or more processors 1104, it should be understood that the components or modules may be firmware or dedicated hardware either in the one or more processors 1104 or off the processors.

As illustrated, the program code 1120 stored on medium 1118 and/or memory 1116 may include an TA/Cell config module 1122 that when implemented by the one or more processors 1104 configures the one or more processors 1104 to receive configuration information for fixed TAs and fixed cells from an O&M server, via the external interface 1102. The configuration information may include an identity (of the fixed cell or fixed cell) which may include an identity of the sNB (e.g. in leftmost bits of the identity of the fixed TA or fixed cell) and a geographic definition of the fixed TA or fixed cell. The geographic definition for each fixed TA may be, e.g., a geographic definition or routing information for an emergency call for each fixed TA or each fixed cell.

As illustrated, the program code 1120 stored on medium 1118 and/or memory 1116 may include a service module 1124 that when implemented by the one or more processors 1104 configures the one or more processors 1104 to perform a service for the UE based on the location related information for the plurality of fixed TAs and fixed cells. The service, for example, may include providing access to a serving PLMN, determining a location of the UE, broadcasting of alert messages, routing of emergency calls, etc., as discussed herein.

As illustrated, the program code 1120 stored on medium 1118 and/or memory 1116 may include an emergency call module 1126 (e.g., when the network entity 1100 is GMLC 126 or LRF 125) that when implemented by the one or more processors 1104 configures the one or more processors 1104 for receive, via the external interface 1102, an indication of an emergency call for a UE along with an identity of a fixed serving cell or fixed TA for the UE.

As illustrated, the program code 1120 stored on medium 1118 and/or memory 1116 may include an emergency routing module 1128 (e.g., when the network entity 1100 is GMLC 126 or LRF 125) that when implemented by the one or more processors 1104 configures the one or more processors 1104 to determine routing information for the emergency call based on the fixed serving cell or fixed TA for the UE and the location related information. For example, the routing information may indicate the identity or the address of a PSAP or the identity of some entity connected to a PSAP to which a request to set up an emergency call (e.g. a SIP INVITE message) from the UE located in the fixed TA or fixed cell should be routed.

As illustrated, the program code 1120 stored on medium 1118 and/or memory 1116 may include a WEA receive module 1130 (e.g., when the network entity 1100 is CBCF 135) that when implemented by the one or more processors 1104 configures the one or more processors 1104 for receive, via the external interface 1102, a WEA message and a target geographic area for the WEA message from a network entity, such as the CBE 133. In an implementation where the network entity 1100 is AMF 122, the one or more processors 1104 may be configured to receive a WEA message along with the fixed cells and/or fixed TAs in which the WEA message is to be broadcast, via the external interface 1102, e.g., from a network entity such as the CBCF 135.

As illustrated, the program code 1120 stored on medium 1118 and/or memory 1116 may include a mapping module 1132 (e.g., when the network entity 1100 is CBCF 135) that when implemented by the one or more processors 1104 configures the one or more processors 1104 to map a target geographic area received with a WEA message to a subset of fixed TAs and fixed cells in the plurality of fixed TAs and fixed cells based on location related information. For example, the one or more processors 1104 may be configured to determine the fixed cells and/or fixed TAs that are within or overlap with the target geographic area, e.g., using the location information may be geographic definitions for the fixed TAs and fixed cells.

As illustrated, the program code 1120 stored on medium 1118 and/or memory 1116 may include a WEA forward module 1134 (e.g., when the network entity 1100 is CBCF 135 or AMF 122) that when implemented by the one or more processors 1104 configures the one or more processors 1104 to forward, via the external interface 1102, the WEA message and an indication of the subset of fixed TAs and fixed cells to another network entity in the serving PLMN, such as AMF 122 if the network entity 1100 is the CBCF 135 or to each sNB that supports the fixed cells and/or fixed TAs if the network entity 1100 is the AMF 122.

As illustrated, the program code 1120 stored on medium 1118 and/or memory 1116 may include a location request module 1136 (e.g., when the network entity 1100 is LMF 124 or SLP 132,) that when implemented by the one or more processors 1104 configures the one or more processors 1104 for receive, via the external interface 1102, a request for a location of the UE and an indication of a fixed serving cell and/or fixed TA for the UE.

As illustrated, the program code 1120 stored on medium 1118 and/or memory 1116 may include an location area module 1138 (e.g., when the network entity 1100 is LMF 124 or SLP 132,) that when implemented by the one or more processors 1104 configures the one or more processors 1104 for determine an approximate location of the UE based on the indication of the fixed serving cell and/or fixed TA for the UE and the location related information for the fixed serving cell and/or fixed TA. For example, the location information may be configured geographic definitions for fixed TAs and fixed cells, and the one or more processors 1104 may be configured determine the geographic area in which the UE is located based on the UE's fixed TA or fixed cell.

As illustrated, the program code 1120 stored on medium 1118 and/or memory 1116 may include a positioning module 1140 (e.g., when the network entity 1100 is LMF 124 or SLP 132,) that when implemented by the one or more processors 1104 configures the one or more processors 1104 to determine a more accurate location for the UE based on the approximate location, e.g., which may include obtaining UL and/or DL measurements for the UE that were generated based on the approximate location. For example, the one or more processors 1104 may be configured to engage in a positioning session with the UE, including generating and forwarding assistance data to the UE using the approximate location determined from the UE's fixed cell and/or fixed TA as initial location for the UE. The one or more processors 1104, for example, may determine assistance data based on the approximate location of the UE for measurements of DL signals from communication SVs or GNSS SVs by the UE or measurements of UL signals from the UE by sNBs or SVs. The one or more processors 1104 may be further configured to receive measurements and/or a location estimate from the UE that was determined by the UE based on DL measurements, and to generate or verify a position estimate for the UE.

The program code 1120 stored on medium 1118 and/or memory 1116 may include a measurements module 1142 (e.g., when the network entity 1100 is AMF 122) that when implemented by the one or more processors 1104 configures the one or more processors 1104 to receive, via the external interface 1102, measurements produced by the UE from DL signals received by the UE from a plurality of satellites, e.g., in a NGAP initial UE message. The measurements, for example, may include GNSS measurements or RSRP, RSRQ, Rx-Tx, AoA for one or more SVs or RSTD or DAOA for one or more pairs of SVs.

As illustrated, the program code 1120 stored on medium 1118 and/or memory 1116 may include a position determination module 1144 (e.g., when the network entity 1100 is AMF 122) that when implemented by the one or more processors 1104 configures the one or more processors 1104 to determine a location and country of the UE based on received measurements and the assistance data. For example, the one or more processors 1104 may be configured to determine a location of the UE using A-GNSS, an E-CID process, TDOA, RTT, etc. The one or more processors 1104 may be configured to determine the country of the UE by mapping a determined location to the country. The one or more processors may be further configured to map the determined location of the UE to a fixed cell and/or fixed TA, e.g., based on the location information received for fixed cells and fixed TAs, e.g., which may the geographic definition of each fixed TA or fixed cell.

As illustrated, the program code 1120 stored on medium 1118 and/or memory 1116 may include a verification module 1146 (e.g., when the network entity 1100 is AMF 122) that when implemented by the one or more processors 1104 configures the one or more processors 1104 to verify whether the UE is in the country associated with the serving PLMN for the UE. For example, the verification may be performed by the one or more processors 1104 or by monitoring an indication received from an sNB in an NGAP initial UE message.

As illustrated, the program code 1120 stored on medium 1118 and/or memory 1116 may include a registration module 1148 that when implemented by the one or more processors 1104 configures the one or more processors 1104 for registration and deregistration of the UE with a serving PLMN via the external interface 1102. For example, the one or more processor 1104 may be configured to accept or reject a registration. The one or more processor 1104 may be configured to provide the fixed cell and/or fixed TA to the UE.

The methodologies described herein may be implemented by various means depending upon the application. For example, these methodologies may be implemented in hardware, firmware, software, or any combination thereof. For a hardware implementation, the one or more processors 1104 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of network entity 1100 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1118 or memory 1116 and executed by one or more processors 1104, causing the one or more processors 1104 to operate as a special purpose computer programmed to perform the techniques disclosed herein. Memory may be implemented within the one or processors 1104 or external to the one or more processors 1104. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by network entity 1100 may be stored as one or more instructions or code on a non-transitory computer-readable storage medium such as medium 1118 or memory 1116. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for network entity 1100 may be provided as signals on transmission media included in a communication apparatus. For example, a communication apparatus comprising part or all of network entity 1100 may include a transceiver having signals indicative of instructions and data. The instructions and data are stored on non-transitory computer readable media, e.g., medium 1118 or memory 1116, and are configured to cause the one or more processors 1104 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

FIG. 12 shows a flowchart of an example procedure 1200 for supporting satellite wireless access by a user equipment (e.g. a UE 105, UE 702 or UE 802) to a serving public land mobile network (PLMN), performed by a network element (NE) of the serving PLMN. The network entity, for example, may be an sNB 106/202/307, AMF 122, LMF 124, SLP 32, NEF 128, GMLC 126, LRF 125, or CBCF 135 shown in FIGS. 1, 2, 3.

As illustrated, at block 1202, the network entity may receive configuration information for a plurality of fixed tracking areas (TAs) and fixed cells from a server, wherein the plurality of fixed TAs and fixed cells are independent of satellite radio cells for the serving PLMN, wherein the configuration information includes location related information for the plurality of fixed TA and fixed cells, wherein the location related information is not standardized, e.g., as discussed at stages 713*a* and 713*b* of FIG. 7, stage 1*b* of FIG. 8A, stage 1 of FIGS. 8B and 8C. For example, the server may be an Operations and Maintenance (O&M). A means for receiving configuration information for a plurality of fixed tracking areas (TAs) and fixed cells from a server, wherein the plurality of fixed TAs and fixed cells are independent of satellite radio cells for the serving PLMN, wherein the configuration information includes location related information for the plurality of fixed TAs and fixed cells, wherein the location related information is not standardized may be, e.g., the external interface 1006 and one or more processors 1004 with dedicated hardware or implementing executable code or software instructions in memory 1016 and/or medium 1018, such as the TA/Cell config module 1021 in sNB 1000 in FIG. 10 or the external interface 1102 and one or more processors 1104 with dedicated hardware or implementing executable code or software instructions in memory 1116 and/or medium 1118, such as the TA/Cell config module 1122 in network entity 1100 in FIG. 11.

At block 1204, the network entity may perform at least one service for the UE based on the location related information for the plurality of fixed TAs and fixed cells, e.g., as discussed at stages 717, 718, 725, 726 of FIG. 7, stages 14 and 16 of FIG. 8A, stages 3*a*-5 of FIG. 8B, and stages 3-6 of FIG. 8C. A means for performing at least one service for the UE based on the location related information for the plurality of fixed TAs and fixed cells may be, e.g., the external interface 1006 and one or more processors 1004 with dedicated hardware or implementing executable code or software instructions in memory 1016 and/or medium 1018, such as the verification module 1028, registration module 1030, alert module 1032 in sNB 1000 in FIG. 10 or the external interface 1102 and one or more processors 1104 with dedicated hardware or implementing executable code or software instructions in memory 1116 and/or medium 1118, such as the service module 1124 in network entity 1100 in FIG. 11.

In one implementation, the configuration information includes an identity for each fixed TA and each fixed cell in the plurality of fixed TAs and fixed cells. In one implementation, the location related information includes at least one of: a geographic definition for each fixed TA of the plurality of fixed TAs and fixed cells; a geographic definition for each fixed cell of the plurality of fixed TAs and fixed cells; routing information for an emergency call for each fixed TA of the plurality of fixed TAs and fixed cells; routing information for an emergency call for each fixed cell of the plurality of fixed TAs and fixed cells; or any combination of these.

In one implementation, the network entity may be configured to perform the at least one service by determining a location for the UE; mapping the location to a fixed TA and fixed cell for the plurality of fixed TAs and fixed cells based on the location related information; and providing the fixed TA and fixed cell to an other entity, e.g., as discussed at stages 14, 16, and 17 of FIG. 8A. A means for determining a location for the UE; a means for mapping the location to a fixed TA and fixed cell for the plurality of fixed TAs and fixed cells based on the location related information; and a means for providing the fixed TA and fixed cell to an other entity may be, e.g., the external interface 1006 and one or more processors 1004 with dedicated hardware or implementing executable code or software instructions in memory 1016 and/or medium 1018, such as the verification module 1028, registration module 1030 in sNB 1000 in FIG. 10 or the external interface 1102 and one or more processors 1104 with dedicated hardware or implementing executable code or software instructions in memory 1116 and/or medium 1118, such as the measurements module 1142, position determination module 1144, and registration module 1148 in network entity 1100 in FIG. 11. For example, the network entity may be a serving sNB for the UE, wherein the other entity is a serving AMF for the UE or the UE. In another example, the other entity is the serving AMF for the UE, wherein the other entity provides at least one of the fixed TA and the fixed cell to the UE.

In one implementation, the network entity may be configured to perform the at least one service by receiving an indication of an emergency call and an identity of a fixed serving cell for the UE; and determining routing information for the emergency call based on the fixed serving cell for the UE and the location related information, e.g., as discussed at stages 3 and 4 of FIG. 8C. A means for receiving an indication of an emergency call and an identity of a fixed serving cell for the UE; and a means for determining routing information for the emergency call based on the fixed serving cell for the UE and the location related information may be, e.g., the external interface 1102 and one or more processors 1104 with dedicated hardware or implementing executable code or software instructions in memory 1116 and/or medium 1118, such as the emergency call module 1126 and emergency routing module 1128 in network entity 1100 in FIG. 11. For example, the network entity may be a GMLC or LRF, wherein the routing information comprises the identity or the address of a PSAP or of an intermediate entity for an emergency call.

In one implementation, the network entity may be configured to perform the at least one service by receiving a WEA message and a target geographic area for the WEA message from a first NE; mapping the target geographic area to a subset of fixed TAs and fixed cells in the plurality of fixed TAs and fixed cells based on the location related information; and forwarding the WEA message and an indication of the subset of fixed TAs and fixed cells to a second NE in the serving PLMN, e.g., as discussed at stages 716, 717, and 718 of FIG. 7. A means for receiving a WEA message and a target geographic area for the WEA message from a first NE; mapping the target geographic area to a subset of fixed TAs and fixed cells in the plurality of fixed TAs and fixed cells based on the location related information; and a means for forwarding the WEA message and an indication of the subset of fixed TAs and fixed cells to a second NE in the serving PLMN may be, e.g., the external interface 1102 and one or more processors 1104 with dedicated hardware or implementing executable code or software instructions in memory 1116 and/or medium 1118, such as the WEA receive module 1130, the mapping module 1132, and the WEA forward module 1134 in network entity 1100 in FIG. 11. For example, the network entity may be a CBCF, the first NE comprises a CBE and the second NE comprises an AMF.

In one implementation, the network entity may be configured to perform the at least one service by receiving a WEA message and indication of a subset of fixed TAs and fixed cells in the plurality of fixed TAs and fixed cells; mapping the indication of the subset of fixed TAs and fixed cells to a plurality of radio cells based on the location related information; and broadcasting the WEA message in the plurality of radio cells, wherein the UE receives the WEA message in one of the plurality of radio cells, e.g., as discussed at stages 724, 725, and 726 of FIG. 7. A means for receiving a WEA message and indication of a subset of fixed TAs and fixed cells in the plurality of fixed TAs and fixed cells; a means for mapping the indication of the subset of fixed TAs and fixed cells to a plurality of radio cells based on the location related information; and a means for broadcasting the WEA message in the plurality of radio cells, wherein the UE receives the WEA message in one of the plurality of radio cells may be, e.g., the external interface 1006 and one or more processors 1004 with dedicated hardware or implementing executable code or software instructions in memory 1016 and/or medium 1018, such as the alert module 1032 in sNB 1000 in FIG. 10. For example, the network entity may be an sNB, wherein the sNB controls the plurality of radio cells.

In one implementation, the network entity may be configured to perform the at least one service by receiving a request for a location of the UE and an indication of a fixed serving cell for the UE; determining an approximate location for the UE based on the fixed serving cell and the location related information; and determining a more accurate location for the UE based on the approximate location, e.g., as discussed at stages 3a, 3b, 4, and 5 of FIG. 8B. A means for receiving a request for a location of the UE and an indication of a fixed serving cell for the UE; a means for determining an approximate location for the UE based on the fixed serving cell and the location related information; and a means for determining a more accurate location for the UE based on the approximate location may be, e.g., the external interface 1102 and one or more processors 1104 with dedicated hardware or implementing executable code or software instructions in memory 1116 and/or medium 1118, such as the location request module 1136, the location area module 1138, and the positioning module 1140 in network entity 1100 in FIG. 11. For example, the network entity may be an LMF or SLP, wherein determining the more accurate location for the UE includes obtaining UL or DL location measurements for the UE based on the approximate location.

In one variant of the example procedure 1200, radio cells may be fixed for short periods (e.g. a few minutes) and may then move to a new coverage area as the host SV moves. A radio cell RC1 with coverage area Al may then be replaced by another radio cell RC2 from another SV with the same coverage area Al. This may allow fixed cells to be equated with radio cells (e.g. a fixed cell with coverage area Al equated first with RC1 and then with RC2). A PLMN operator may then decide whether to support fixed cells using radio cells or using geographic areas defined by an O&M server. Network elements in a SGCN need not be aware of which type of fixed cell is being used as the IDs for fixed cells and other configuration information received from an O&M server may be or appear the same. This variant offers more flexibility for support of fixed cells.

Abbreviations used herein may be identified in Table 1 as follows:

TABLE 1

| | |
|---|---|
| EM | Emergency |
| ES | Earth Station |
| GEO | Geostationary Earth Orbit |
| ISL | Inter-Satellite Links |

TABLE 1-continued

| | |
|---|---|
| LEO | Low Earth Orbit |
| LI | Lawful Interception |
| MEO | Medium Earth Orbit |
| MNO | Mobile Network Operator |
| NGEO | Non-Geostationary Earth Orbiting |
| NTN | Non-Terrestrial Network |
| sNB | satellite Node B |
| SV | Space Vehicle |
| SVO | SV Operator |
| TA | Tracking Area |
| TAC | Tracking Area Code |
| TAI | Tracking Area Identity |
| WEA | Wireless Emergency Alerting |

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

Implementation examples are described in the following numbered clauses:

1. A method for supporting satellite wireless access by a user equipment (UE) to a serving public land mobile network (PLMN), performed by a network element (NE) of the serving PLMN, the method comprising:

receiving configuration information for a plurality of fixed tracking areas (TAs) and fixed cells from a server, wherein the plurality of fixed TAs and fixed cells are independent of satellite radio cells for the serving PLMN, wherein the configuration information includes location related information for the plurality of fixed TAs and fixed cells, wherein the location related information is not standardized; and performing at least one service for the UE based on the location related information for the plurality of fixed TAs and fixed cells.

2. The method of clause 1, wherein the NE comprises a satellite nodeB (sNB), Access and Mobility Management Function (AMF), Location Management Function (LMF), Secure User Plane Location (SUPL) Location Platform (SLP), Network Exposure Function (NEF), Gateway Mobile Location Center (GMLC), Location Retrieval Function (LRF), or Cell Broadcast Center Function (CBCF), and wherein the server is an Operations and Maintenance (O&M) server.

3. The method of either of clauses 1 or 2, wherein the configuration information includes an identity for each fixed TA and each fixed cell in the plurality of fixed TAs and fixed cells.

4. The method of any of clauses 1-3, wherein the location related information includes at least one of:

a geographic definition for each fixed TA of the plurality of fixed TAs and fixed cells;

a geographic definition for each fixed cell of the plurality of fixed TAs and fixed cells;
routing information for an emergency call for each fixed TA of the plurality of fixed TAs and fixed cells;
routing information for an emergency call for each fixed cell of the plurality of fixed TAs and fixed cells; or
any combination of these.

5. The method of any of clauses 1-4 wherein performing the at least one service comprises:
determining a location for the UE;
mapping the location to a fixed TA and fixed cell for the plurality of fixed TAs and fixed cells based on the location related information; and
providing the fixed TA and fixed cell to an other entity.

6. The method of clause 5, wherein the NE is a serving satellite nodeB (sNB) for the UE, wherein the other entity is a serving Access and Mobility Management Function (AMF) for the UE or the UE.

7. The method of clause 6, wherein the other entity is the serving AMF for the UE, wherein the other entity provides at least one of the fixed TA and the fixed cell to the UE.

8. The method of any of clauses 1-7, wherein performing the at least one service comprises:
receiving an indication of an emergency call and an identity of a fixed serving cell for the UE; and
determining routing information for the emergency call based on the fixed serving cell for the UE and the location related information.

9. The method of clause 8, wherein the NE comprises a Gateway Mobile Location Center (GMLC) or Location Retrieval Function (LRF), wherein the routing information comprises an identity or an address of a Public Safety Answering Point (PSAP) or of an intermediate entity for an emergency call.

10. The method of any of clauses 1-9, wherein performing the at least one service comprises:
receiving a Wireless Emergency Alerting (WEA) message and a target geographic area for the WEA message from a first NE;
mapping the target geographic area to a subset of fixed TAs and fixed cells in the plurality of fixed TAs and fixed cells based on the location related information; and
forwarding the WEA message and an indication of the subset of fixed TAs and fixed cells to a second NE in the serving PLMN.

11. The method of clause 10, wherein the NE comprises a Cell Broadcast Center Function (CBCF), the first NE comprises a Cell Broadcast Entity (CBE) and the second NE comprises an Access and Mobility Management Function (AMF).

12. The method of any of clauses 1-11, wherein performing the at least one service comprises:
receiving a Wireless Emergency Alerting (WEA) message and indication of a subset of fixed TAs and fixed cells in the plurality of fixed TAs and fixed cells;
mapping the indication of the subset of fixed TAs and fixed cells to a plurality of radio cells based on the location related information; and
broadcasting the WEA message in the plurality of radio cells, wherein the UE receives the WEA message in one of the plurality of radio cells.

13. The method of clause 12, wherein the NE comprises a satellite nodeB (sNB), wherein the sNB controls the plurality of radio cells.

14. The method of any of clauses 1-13, wherein performing the at least one service comprises:

receiving a request for a location of the UE and an indication of a fixed serving cell for the UE;
determining an approximate location for the UE based on the fixed serving cell and the location related information; and
determining a more accurate location for the UE based on the approximate location.

15. The method of clause 14, wherein the NE is an Location Management Function (LMF) or Secure User Plane Location (SUPL) Location Platform (SLP), wherein determining the more accurate location for the UE includes obtaining uplink or downlink location measurements for the UE based on the approximate location.

16. A network element (NE) configured for supporting satellite wireless access by a user equipment (UE) to a serving public land mobile network (PLMN), the NE being in the serving PLMN, comprising:
an external interface configured to communicate with network entities;
at least one memory;
at least one processor coupled to the external interface and the at least one memory, wherein the at least one processor is configured to:
receive, via the external interface, configuration information for a plurality of fixed tracking areas (TAs) and fixed cells from a server, wherein the plurality of fixed TAs and fixed cells are independent of satellite radio cells for the serving PLMN, wherein the configuration information includes location related information for the plurality of fixed TAs and fixed cells, wherein the location related information is not standardized; and
perform at least one service for the UE based on the location related information for the plurality of fixed TAs and fixed cells.

17. The NE of clause 16, wherein the NE comprises a satellite nodeB (sNB), Access and Mobility Management Function (AMF), Location Management Function (LMF), Secure User Plane Location (SUPL) Location Platform (SLP), Network Exposure Function (NEF), Gateway Mobile Location Center (GMLC), Location Retrieval Function (LRF), or Cell Broadcast Center Function (CBCF), and wherein the server is an Operations and Maintenance (O&M) server.

18. The NE of either of clauses 16 or 17, wherein the configuration information includes an identity for each fixed TA and each fixed cell in the plurality of fixed TAs and fixed cells.

19. The NE of any of clauses 16-18, wherein the location related information includes at least one of:
a geographic definition for each fixed TA of the plurality of fixed TAs and fixed cells;
a geographic definition for each fixed cell of the plurality of fixed TAs and fixed cells;
routing information for an emergency call for each fixed TA of the plurality of fixed TAs and fixed cells;
routing information for an emergency call for each fixed cell of the plurality of fixed TAs and fixed cells; or
any combination of these.

20. The NE of any of clauses 16-19, wherein the at least one processor is configured to perform the at least one service by being configured to:
determine a location for the UE;
map the location to a fixed TA and fixed cell for the plurality of fixed TAs and fixed cells based on the location related information; and
provide, via the external interface, the fixed TA and fixed cell to an other entity.

21. The NE of clause 20, wherein the NE is a serving satellite nodeB (sNB) for the UE, wherein the other entity is a serving Access and Mobility Management Function (AMF) for the UE or the UE.

22. The NE of clause 21, wherein the other entity is the serving AMF for the UE, wherein the other entity provides at least one of the fixed TA and the fixed cell to the UE.

23. The NE of any of clauses 16-22, wherein the at least one processor is configured to perform the at least one service by being configured to:
receive, via the external interface, an indication of an emergency call and an identity of a fixed serving cell for the UE; and
determine routing information for the emergency call based on the fixed serving cell for the UE and the location related information.

24. The NE of clause 23, wherein the NE comprises a Gateway Mobile Location Center (GMLC) or Location Retrieval Function (LRF), wherein the routing information comprises an identity or an address of a Public Safety Answering Point (PSAP) or of an intermediate entity for an emergency call.

25. The NE of any of clauses 16-24, wherein the at least one processor is configured to perform the at least one service by being configured to:
receive, via the external interface, a Wireless Emergency Alerting (WEA) message and a target geographic area for the WEA message from a first NE;
map the target geographic area to a subset of fixed TAs and fixed cells in the plurality of fixed TAs and fixed cells based on the location related information; and
forward, via the external interface, the WEA message and an indication of the subset of fixed TAs and fixed cells to a second NE in the serving PLMN.

26. The NE of clause 25, wherein the NE comprises a Cell Broadcast Center Function (CBCF), the first NE comprises a Cell Broadcast Entity (CBE) and the second NE comprises an Access and Mobility Management Function (AMF).

27. The NE of any of clauses 16-26, wherein the at least one processor is configured to perform the at least one service by being configured to:
receive, via the external interface, a Wireless Emergency Alerting (WEA) message and indication of a subset of fixed TAs and fixed cells in the plurality of fixed TAs and fixed cells;
map the indication of the subset of fixed TAs and fixed cells to a plurality of radio cells based on the location related information; and
broadcast, via the external interface, the WEA message in the plurality of radio cells, wherein the UE receives the WEA message in one of the plurality of radio cells.

28. The NE of clause 27, wherein the NE comprises a satellite nodeB (sNB), wherein the sNB controls the plurality of radio cells.

29. The NE of any of clauses 16-28, wherein the at least one processor is configured to perform the at least one service by being configured to:
receive, via the external interface, a request for a location of the UE and an indication of a fixed serving cell for the UE;
determine an approximate location for the UE based on the fixed serving cell and the location related information; and
determine, via the external interface, a more accurate location for the UE based on the approximate location.

30. The NE of clause 29, wherein the NE is an Location Management Function (LMF) or Secure User Plane Location (SUPL) Location Platform (SLP), wherein determining the more accurate location for the UE includes obtaining uplink or downlink location measurements for the UE based on the approximate location.

31. A network element (NE) configured for supporting satellite wireless access by a user equipment (UE) to a serving public land mobile network (PLMN), the network element (NE) being in the serving PLMN, comprising:
means for receiving configuration information for a plurality of fixed tracking areas (TAs) and fixed cells from a server, wherein the plurality of fixed TAs and fixed cells are independent of satellite radio cells for the serving PLMN, wherein the configuration information includes location related information for the plurality of fixed TAs and fixed cells, wherein the location related information is not standardized; and
means for performing at least one service for the UE based on the location related information for the plurality of fixed TAs and fixed cells.

32. The NE of clause 31, wherein the NE comprises a satellite nodeB (sNB), Access and Mobility Management Function (AMF), Location Management Function (LMF), Secure User Plane Location (SUPL) Location Platform (SLP), Network Exposure Function (NEF), Gateway Mobile Location Center (GMLC), Location Retrieval Function (LRF), or Cell Broadcast Center Function (CBCF), and wherein the server is an Operations and Maintenance (O&M) server.

33. The NE of either of clauses 31 or 32, wherein the configuration information includes an identity for each fixed TA and each fixed cell in the plurality of fixed TAs and fixed cells.

34. The NE of any of clauses 31-33, wherein the location related information includes at least one of:
a geographic definition for each fixed TA of the plurality of fixed TAs and fixed cells;
a geographic definition for each fixed cell of the plurality of fixed TAs and fixed cells;
routing information for an emergency call for each fixed TA of the plurality of fixed TAs and fixed cells;
routing information for an emergency call for each fixed cell of the plurality of fixed TAs and fixed cells; or
any combination of these.

35. The NE of any of clauses 31-34, wherein the means for performing the at least one service comprises:
means for determining a location for the UE;
means for mapping the location to a fixed TA and fixed cell for the plurality of fixed TAs and fixed cells based on the location related information; and
means for providing the fixed TA and fixed cell to an other entity.

36. The NE of clause 35, wherein the NE is a serving satellite nodeB (sNB) for the UE, wherein the other entity is a serving Access and Mobility Management Function (AMF) for the UE or the UE.

37. The NE of clause 36, wherein the other entity is the serving AMF for the UE, wherein the other entity provides at least one of the fixed TA and the fixed cell to the UE.

38. The NE of any of clauses 31-37, wherein the means for performing the at least one service comprises:
means for receiving an indication of an emergency call and an identity of a fixed serving cell for the UE; and
means for determining routing information for the emergency call based on the fixed serving cell for the UE and the location related information.

39. The NE of clause 38, wherein the NE comprises a Gateway Mobile Location Center (GMLC) or Location Retrieval Function (LRF), wherein the routing information comprises an identity or an address of a Public Safety Answering Point (PSAP) or of an intermediate entity for an emergency call.

40. The NE of any of clauses 31-39, wherein the means for performing the at least one service comprises:
means for receiving a Wireless Emergency Alerting (WEA) message and a target geographic area for the WEA message from a first NE;
means for mapping the target geographic area to a subset of fixed TAs and fixed cells in the plurality of fixed TAs and fixed cells based on the location related information; and
means for forwarding the WEA message and an indication of the subset of fixed TAs and fixed cells to a second NE in the serving PLMN.

41. The NE of clause 40, wherein the NE comprises a Cell Broadcast Center Function (CBCF), the first NE comprises a Cell Broadcast Entity (CBE) and the second NE comprises an Access and Mobility Management Function (AMF).

42. The NE of any of clauses 31-41, wherein the means for performing the at least one service comprises:
means for receiving a Wireless Emergency Alerting (WEA) message and indication of a subset of fixed TAs and fixed cells in the plurality of fixed TAs and fixed cells;
means for mapping the indication of the subset of fixed TAs and fixed cells to a plurality of radio cells based on the location related information; and
means for broadcasting the WEA message in the plurality of radio cells, wherein the UE receives the WEA message in one of the plurality of radio cells.

43. The NE of clause 42, wherein the NE comprises a satellite nodeB (sNB), wherein the sNB controls the plurality of radio cells.

44. The NE of any of clauses 31-43, wherein the means for performing the at least one service comprises:
means for receiving a request for a location of the UE and an indication of a fixed serving cell for the UE;
means for determining an approximate location for the UE based on the fixed serving cell and the location related information; and
means for determining a more accurate location for the UE based on the approximate location.

45. The NE of clause 44, wherein the NE is an Location Management Function (LMF) or Secure User Plane Location (SUPL) Location Platform (SLP), wherein determining the more accurate location for the UE includes obtaining uplink or downlink location measurements for the UE based on the approximate location.

46. A non-transitory storage medium including program code stored thereon, the program code is operable to configure at least one processor in a network element (NE) for supporting satellite wireless access by a user equipment (UE) to a serving public land mobile network (PLMN), the network element (NE) being in the serving PLMN, comprising:
program code to receive configuration information for a plurality of fixed tracking areas (TAs) and fixed cells from a server, wherein the plurality of fixed TAs and fixed cells are independent of satellite radio cells for the serving PLMN, wherein the configuration information includes location related information for the plurality of fixed TAs and fixed cells, wherein the location related information is not standardized; and
program code to perform at least one service for the UE based on the location related information for the plurality of fixed TAs and fixed cells.

47. The non-transitory storage medium of clause 46, wherein the NE comprises a satellite nodeB (sNB), Access and Mobility Management Function (AMF), Location Management Function (LMF), Secure User Plane Location (SUPL) Location Platform (SLP), Network Exposure Function (NEF), Gateway Mobile Location Center (GMLC), Location Retrieval Function (LRF), or Cell Broadcast Center Function (CBCF), and wherein the server is an Operations and Maintenance (O&M) server.

48. The non-transitory storage medium of either of clauses 46 or 47, wherein the configuration information includes an identity for each fixed TA and each fixed cell in the plurality of fixed TAs and fixed cells.

49. The non-transitory storage medium of any of clauses 46-48, wherein the location related information includes at least one of:
a geographic definition for each fixed TA of the plurality of fixed TAs and fixed cells;
a geographic definition for each fixed cell of the plurality of fixed TAs and fixed cells;
routing information for an emergency call for each fixed TA of the plurality of fixed TAs and fixed cells;
routing information for an emergency call for each fixed cell of the plurality of fixed TAs and fixed cells; or
any combination of these.

50. The non-transitory storage medium of any of clauses 46-49, wherein the program code to perform the at least one service comprises:
program code to determine a location for the UE;
program code to map the location to a fixed TA and fixed cell for the plurality of fixed TAs and fixed cells based on the location related information; and
program code to provide the fixed TA and fixed cell to an other entity.

51. The non-transitory storage medium of clause 50, wherein the NE is a serving satellite nodeB (sNB) for the UE, wherein the other entity is a serving Access and Mobility Management Function (AMF) for the UE or the UE.

52. The non-transitory storage medium of clause 51, wherein the other entity is the serving AMF for the UE, wherein the other entity provides at least one of the fixed TA and the fixed cell to the UE.

53. The non-transitory storage medium of any of clauses 46-52, wherein the program code to perform the at least one service comprises:
program code to receive an indication of an emergency call and an identity of a fixed serving cell for the UE; and
program code to determine routing information for the emergency call based on the fixed serving cell for the UE and the location related information.

54. The non-transitory storage medium of clause 53, wherein the NE comprises a Gateway Mobile Location Center (GMLC) or Location Retrieval Function (LRF), wherein the routing information comprises an identity or an address of a Public Safety Answering Point (PSAP) or of an intermediate entity for an emergency call.

55. The non-transitory storage medium of any of clauses 46-54, wherein the program code to perform the at least one service comprises:
program code to receive a Wireless Emergency Alerting (WEA) message and a target geographic area for the WEA message from a first NE;
program code to map the target geographic area to a subset of fixed TAs and fixed cells in the plurality of fixed TAs and fixed cells based on the location related information; and program code to forward the WEA message and an indication of the subset of fixed TAs and fixed cells to a second NE in the serving PLMN.

56. The non-transitory storage medium of clause 55, wherein the NE comprises a Cell Broadcast Center Function (CBCF), the first NE comprises a Cell Broadcast Entity (CBE) and the second NE comprises an Access and Mobility Management Function (AMF).

57. The non-transitory storage medium of any of clauses 46-56, wherein the program code to perform the at least one service comprises:
program code to receive a Wireless Emergency Alerting (WEA) message and indication of a subset of fixed TAs and fixed cells in the plurality of fixed TAs and fixed cells;
program code to map the indication of the subset of fixed TAs and fixed cells to a plurality of radio cells based on the location related information; and
program code to broadcast the WEA message in the plurality of radio cells, wherein the UE receives the WEA message in one of the plurality of radio cells.

58. The non-transitory storage medium of clause 57, wherein the NE comprises a satellite nodeB (sNB), wherein the sNB controls the plurality of radio cells.

59. The non-transitory storage medium of any of clauses 46-58, wherein the program code to perform the at least one service comprises:
program code to receive a request for a location of the UE and an indication of a fixed serving cell for the UE;
program code to determine an approximate location for the UE based on the fixed serving cell and the location related information; and
program code to determine a more accurate location for the UE based on the approximate location.

60. The non-transitory storage medium of clause 59, wherein the NE is an Location Management Function (LMF) or Secure User Plane Location (SUPL) Location Platform (SLP), wherein determining the more accurate location for the UE includes obtaining uplink or downlink location measurements for the UE based on the approximate location.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for supporting satellite wireless access by a user equipment (UE) to a serving public land mobile network (PLMN), performed by a network element (NE) of the serving PLMN, the method comprising:
receiving configuration information for a plurality of fixed tracking areas (TAs) and fixed cells from a server, wherein the plurality of fixed TAs and fixed cells are independent of satellite radio cells for the serving PLMN, wherein the configuration information includes location related information for the plurality of fixed TAs and fixed cells, wherein the location related information is not standardized; and
performing at least one service for the UE based on the location related information for the plurality of fixed TAs and fixed cells.

2. The method of claim 1, wherein the NE comprises a satellite nodeB (sNB), Access and Mobility Management Function (AMF), Location Management Function (LMF), Secure User Plane Location (SUPL) Location Platform (SLP), Network Exposure Function (NEF), Gateway Mobile Location Center (GMLC), Location Retrieval Function (LRF), or Cell Broadcast Center Function (CBCF), and wherein the server is an Operations and Maintenance (O&M) server.

3. The method of claim 1, wherein the configuration information includes an identity for each fixed TA and each fixed cell in the plurality of fixed TAs and fixed cells.

4. The method of claim 1, wherein the location related information includes at least one of:
a geographic definition for each fixed TA of the plurality of fixed TAs and fixed cells;
a geographic definition for each fixed cell of the plurality of fixed TAs and fixed cells;
routing information for an emergency call for each fixed TA of the plurality of fixed TAs and fixed cells;
routing information for an emergency call for each fixed cell of the plurality of fixed TAs and fixed cells; or
any combination of these.

5. The method of claim 1 wherein performing the at least one service comprises:
determining a location for the UE;
mapping the location to a fixed TA and fixed cell for the plurality of fixed TAs and fixed cells based on the location related information; and
providing the fixed TA and fixed cell to an other entity.

6. The method of claim 5, wherein the NE is a serving satellite nodeB (sNB) for the UE, wherein the other entity is a serving Access and Mobility Management Function (AMF) for the UE or the UE, and wherein the other entity is the serving AMF for the UE, wherein the other entity provides at least one of the fixed TA and the fixed cell to the UE.

7. The method of claim 1, wherein performing the at least one service comprises:
receiving an indication of an emergency call and an identity of a fixed serving cell for the UE; and
determining routing information for the emergency call based on the fixed serving cell for the UE and the location related information.

8. The method of claim 7, wherein the NE comprises a Gateway Mobile Location Center (GMLC) or Location Retrieval Function (LRF), wherein the routing information comprises an identity or an address of a Public Safety Answering Point (PSAP) or of an intermediate entity for an emergency call.

9. The method of claim 1, wherein performing the at least one service comprises:
receiving a Wireless Emergency Alerting (WEA) message and a target geographic area for the WEA message from a first NE;
mapping the target geographic area to a subset of fixed TAs and fixed cells in the plurality of fixed TAs and fixed cells based on the location related information; and
forwarding the WEA message and an indication of the subset of fixed TAs and fixed cells to a second NE in the serving PLMN.

10. The method of claim 9, wherein the NE comprises a Cell Broadcast Center Function (CBCF), the first NE comprises a Cell Broadcast Entity (CBE) and the second NE comprises an Access and Mobility Management Function (AMF).

11. The method of claim 1, wherein performing the at least one service comprises:
   receiving a Wireless Emergency Alerting (WEA) message and indication of a subset of fixed TAs and fixed cells in the plurality of fixed TAs and fixed cells;
   mapping the indication of the subset of fixed TAs and fixed cells to a plurality of radio cells based on the location related information; and
   broadcasting the WEA message in the plurality of radio cells, wherein the UE receives the WEA message in one of the plurality of radio cells.

12. The method of claim 11, wherein the NE comprises a satellite nodeB (sNB), wherein the sNB controls the plurality of radio cells.

13. The method of claim 1, wherein performing the at least one service comprises:
   receiving a request for a location of the UE and an indication of a fixed serving cell for the UE;
   determining an approximate location for the UE based on the fixed serving cell and the location related information; and
   determining a more accurate location for the UE based on the approximate location.

14. The method of claim 13, wherein the NE is an Location Management Function (LMF) or Secure User Plane Location (SUPL) Location Platform (SLP), wherein determining the more accurate location for the UE includes obtaining uplink or downlink location measurements for the UE based on the approximate location.

15. A network element (NE) configured for supporting satellite wireless access by a user equipment (UE) to a serving public land mobile network (PLMN), the NE being in the serving PLMN, comprising:
   an external interface configured to communicate with network entities;
   at least one memory;
   at least one processor coupled to the external interface and the at least one memory, wherein the at least one processor is configured to:
      receive, via the external interface, configuration information for a plurality of fixed tracking areas (TAs) and fixed cells from a server, wherein the plurality of fixed TAs and fixed cells are independent of satellite radio cells for the serving PLMN, wherein the configuration information includes location related information for the plurality of fixed TAs and fixed cells, wherein the location related information is not standardized; and
      perform at least one service for the UE based on the location related information for the plurality of fixed TAs and fixed cells.

16. The NE of claim 15, wherein the NE comprises a satellite nodeB (sNB), Access and Mobility Management Function (AMF), Location Management Function (LMF), Secure User Plane Location (SUPL) Location Platform (SLP), Network Exposure Function (NEF), Gateway Mobile Location Center (GMLC), Location Retrieval Function (LRF), or Cell Broadcast Center Function (CBCF), and wherein the server is an Operations and Maintenance (O&M) server.

17. The NE of claim 15, wherein the configuration information includes an identity for each fixed TA and each fixed cell in the plurality of fixed TAs and fixed cells.

18. The NE of claim 15, wherein the location related information includes at least one of:
   a geographic definition for each fixed TA of the plurality of fixed TAs and fixed cell s;
   a geographic definition for each fixed cell of the plurality of fixed TAs and fixed cells;
   routing information for an emergency call for each fixed TA of the plurality of fixed TAs and fixed cells;
   routing information for an emergency call for each fixed cell of the plurality of fixed TAs and fixed cells; or
   any combination of these.

19. The NE of claim 15, wherein the at least one processor is configured to perform the at least one service by being configured to:
   determine a location for the UE;
   map the location to a fixed TA and fixed cell for the plurality of fixed TAs and fixed cells based on the location related information; and
   provide, via the external interface, the fixed TA and fixed cell to an other entity.

20. The NE of claim 19, wherein the NE is a serving satellite nodeB (sNB) for the UE, wherein the other entity is a serving Access and Mobility Management Function (AMF) for the UE or the UE and wherein the other entity is the serving AMF for the UE, wherein the other entity provides at least one of the fixed TA and the fixed cell to the UE.

21. The NE of claim 15, wherein the at least one processor is configured to perform the at least one service by being configured to:
   receive, via the external interface, an indication of an emergency call and an identity of a fixed serving cell for the UE; and
   determine routing information for the emergency call based on the fixed serving cell for the UE and the location related information.

22. The NE of claim 21, wherein the NE comprises a Gateway Mobile Location Center (GMLC) or Location Retrieval Function (LRF), wherein the routing information comprises an identity or an address of a Public Safety Answering Point (PSAP) or of an intermediate entity for an emergency call.

23. The NE of claim 15, wherein the at least one processor is configured to perform the at least one service by being configured to:
   receive, via the external interface, a Wireless Emergency Alerting (WEA) message and a target geographic area for the WEA message from a first NE;
   map the target geographic area to a subset of fixed TAs and fixed cells in the plurality of fixed TAs and fixed cells based on the location related information; and
   forward, via the external interface, the WEA message and an indication of the subset of fixed TAs and fixed cells to a second NE in the serving PLMN.

24. The NE of claim 23, wherein the NE comprises a Cell Broadcast Center Function (CBCF), the first NE comprises a Cell Broadcast Entity (CBE) and the second NE comprises an Access and Mobility Management Function (AMF).

25. The NE of claim 15, wherein the at least one processor is configured to perform the at least one service by being configured to:
   receive, via the external interface, a Wireless Emergency Alerting (WEA) message and indication of a subset of fixed TAs and fixed cells in the plurality of fixed TAs and fixed cells;

map the indication of the subset of fixed TAs and fixed cells to a plurality of radio cells based on the location related information; and broadcast, via the external interface, the WEA message in the plurality of radio cells, wherein the UE receives the WEA message in one of the plurality of radio cells.

26. The NE of claim 25, wherein the NE comprises a satellite nodeB (sNB), wherein the sNB controls the plurality of radio cells.

27. The NE of claim 15, wherein the at least one processor is configured to perform the at least one service by being configured to:

receive, via the external interface, a request for a location of the UE and an indication of a fixed serving cell for the UE;

determine an approximate location for the UE based on the fixed serving cell and the location related information; and determine, via the external interface, a more accurate location for the UE based on the approximate location.

28. The NE of claim 27, wherein the NE is an Location Management Function (LMF) or Secure User Plane Location (SUPL) Location Platform (SLP), wherein determining the more accurate location for the UE includes obtaining uplink or downlink location measurements for the UE based on the approximate location.

29. A network element (NE) configured for supporting satellite wireless access by a user equipment (UE) to a serving public land mobile network (PLMN), the network element (NE) being in the serving PLMN, comprising:

means for receiving configuration information for a plurality of fixed tracking areas (TAs) and fixed cells from a server, wherein the plurality of fixed TAs and fixed cells are independent of satellite radio cells for the serving PLMN, wherein the configuration information includes location related information for the plurality of fixed TAs and fixed cells, wherein the location related information is not standardized; and means for performing at least one service for the UE based on the location related information for the plurality of fixed TAs and fixed cells.

30. A non-transitory storage medium including program code stored thereon, the program code is operable to configure at least one processor in a network element (NE) for supporting satellite wireless access by a user equipment (UE) to a serving public land mobile network (PLMN), the network element (NE) being in the serving PLMN, comprising:

program code to receive configuration information for a plurality of fixed tracking areas (TAs) and fixed cells from a server, wherein the plurality of fixed TAs and fixed cells are independent of satellite radio cells for the serving PLMN, wherein the configuration information includes location related information for the plurality of fixed TAs and fixed cells, wherein the location related information is not standardized; and program code to perform at least one service for the UE based on the location related information for the plurality of fixed TAs and fixed cells.

* * * * *